United States Patent
Hinze et al.

(10) Patent No.: US 8,911,807 B2
(45) Date of Patent: Dec. 16, 2014

(54) CONTAINER FOR SLICED AND FLUFFED FOOD PRODUCTS

(75) Inventors: Bonita M. Hinze, Sun Prairie, WI (US); James F. Schmitt, DeForest, WI (US); David W. Wiseman, Newberry, SC (US); Daniel R. Feldmeier, Waunakee, WI (US)

(73) Assignee: Kraft Foods Group Brands LLC, Northfield, IL (US)

( * ) Notice: Subject to any disclaimer, the term of this patent is extended or adjusted under 35 U.S.C. 154(b) by 595 days.

(21) Appl. No.: 12/613,949

(22) Filed: Nov. 6, 2009

(65) Prior Publication Data

US 2011/0111099 A1 May 12, 2011

(51) Int. Cl.
| | | |
|---|---|---|
| B65D 75/58 | (2006.01) | |
| B65D 85/62 | (2006.01) | |
| B65D 77/20 | (2006.01) | |
| B29C 51/00 | (2006.01) | |
| B29L 31/00 | (2006.01) | |

(52) U.S. Cl.
CPC ............ B65D 85/62 (2013.01); B65D 77/2072 (2013.01); *B29C 51/00* (2013.01); *B29L 2031/712* (2013.01); *B29L 2031/7162* (2013.01)
USPC ........... 426/123; 426/122; 426/396; 220/784; 220/787

(58) Field of Classification Search
USPC ......... 426/123, 396, 129, 418, 419, 395, 404; 220/656, 657, 4.21, 4.22, 4.23, 4.24; 53/433, 511, 453, 559
See application file for complete search history.

(56) References Cited

U.S. PATENT DOCUMENTS

| | | | |
|---|---|---|---|
| 1,319,082 | A | 10/1919 | Hulbert |
| 1,709,196 | A | 4/1929 | Vernon |
| 2,536,055 | A | 1/1951 | Heinle |
| 3,154,215 | A | 10/1964 | LeVesconte |

(Continued)

FOREIGN PATENT DOCUMENTS

| | | |
|---|---|---|
| CA | 2434721 | 3/2004 |
| DE | 7911699 | 7/1979 |

(Continued)

OTHER PUBLICATIONS

"John Morrell Introduces Deli Delivered!TM," The National Provisioner, Sep. 2002, p. 42.

(Continued)

*Primary Examiner* — Rena L Dye
*Assistant Examiner* — C Smith
(74) *Attorney, Agent, or Firm* — Fitch, Even, Tabin & Flannery LLP

(57) ABSTRACT

A food package for sliced food products to be maintained with a fluffed appearance, the package including a base member forming a compartment for receiving the food product and a lid sealed to the compartment. The base member has a gripping portion and the lid has a tab which overlies the gripping portion when the lid is connected to the base member. In one form, the gripping portion of the base member has a plurality of edges that define an outer profile of the gripping portion and expose a portion of a lower surface of the tab. The outer profile limits tacking of the tab to the gripping portion when the lid and base member are cut from respective webs of material. Additionally, a method is provided for assembling a food container.

38 Claims, 30 Drawing Sheets

(56) References Cited

U.S. PATENT DOCUMENTS

| | | | |
|---|---|---|---|
| 3,217,867 A | 11/1965 | Harris | |
| 3,338,723 A | 8/1967 | Lundquist | |
| 3,344,974 A | 10/1967 | Bostrom | |
| 3,371,848 A | 3/1968 | Ward et al. | |
| 3,467,244 A | 9/1969 | Hamilton et al. | |
| 3,469,682 A | 9/1969 | Cline | |
| 3,498,018 A | 3/1970 | Seiferth et al. | |
| 3,584,430 A | 6/1971 | Shearer | |
| D227,083 S | 6/1973 | Anderson et al. | |
| 3,780,856 A * | 12/1973 | Braverman | 206/534 |
| 3,782,586 A | 1/1974 | Brown | |
| 3,803,332 A | 4/1974 | Seiferth et al. | |
| D232,302 S | 8/1974 | Lazure et al. | |
| 3,833,742 A | 9/1974 | Wetmore et al. | |
| 3,861,433 A | 1/1975 | Schier et al. | |
| 3,972,155 A | 8/1976 | Mahaffy et al. | |
| 4,268,530 A | 5/1981 | Wyslotsky | |
| D276,026 S | 10/1984 | Hexamer | |
| RE31,762 E | 12/1984 | Vosti et al. | |
| 4,498,589 A | 2/1985 | Scott et al. | |
| 4,531,668 A | 7/1985 | Forbes, Jr. | |
| 4,538,651 A | 9/1985 | Lykins | |
| 4,574,174 A | 3/1986 | McGonigle | |
| D296,191 S | 6/1988 | Yoshida et al. | |
| RE32,739 E | 8/1988 | Terauds | |
| 4,866,911 A | 9/1989 | Grindrod et al. | |
| 4,935,252 A | 6/1990 | Huang et al. | |
| 4,944,409 A | 7/1990 | Busche et al. | |
| 4,946,038 A | 8/1990 | Eaton | |
| 4,955,530 A | 9/1990 | Rigby et al. | |
| 4,964,515 A | 10/1990 | Heyden | |
| 5,010,714 A | 4/1991 | Medwed et al. | |
| 5,042,681 A | 8/1991 | Bolte et al. | |
| 5,046,659 A | 9/1991 | Warburton | |
| 5,082,112 A | 1/1992 | Dunklee | |
| 5,116,651 A | 5/1992 | Katsura et al. | |
| 5,118,002 A | 6/1992 | Sugiyama et al. | |
| 5,123,527 A | 6/1992 | Hustad | |
| 5,129,517 A | 7/1992 | Hustad | |
| 5,167,973 A | 12/1992 | Snyder | |
| D334,141 S | 3/1993 | Gottofredi | |
| D334,536 S | 4/1993 | Long et al. | |
| D336,850 S | 6/1993 | Guillen | |
| 5,220,999 A | 6/1993 | Goulette | |
| D337,268 S | 7/1993 | Detert et al. | |
| 5,236,119 A | 8/1993 | Chu | |
| D339,744 S * | 9/1993 | Seppala | D9/425 |
| 5,293,997 A | 3/1994 | Hustad et al. | |
| D348,394 S | 7/1994 | Dreyer | |
| D349,456 S | 8/1994 | Wilson | |
| 5,353,943 A | 10/1994 | Hayward | |
| 5,366,295 A | 11/1994 | Montesissa et al. | |
| 5,421,510 A | 6/1995 | Calvert | |
| 5,421,512 A | 6/1995 | Poole | |
| D360,336 S | 7/1995 | Bitel, Jr. | |
| D368,030 S | 3/1996 | Elbaz | |
| 5,512,337 A | 4/1996 | Littmann et al. | |
| 5,520,939 A | 5/1996 | Wells | |
| D372,170 S | 7/1996 | Ahern, Jr. | |
| 5,533,228 A | 7/1996 | Jarecki et al. | |
| D372,397 S | 8/1996 | Littmann et al. | |
| 5,545,420 A | 8/1996 | Lipinski et al. | |
| 5,553,701 A | 9/1996 | Jarecki et al. | |
| 5,558,891 A | 9/1996 | Lawless et al. | |
| D375,259 S | 11/1996 | Whitehead | |
| 5,582,853 A | 12/1996 | Marnocha et al. | |
| 5,592,775 A | 1/1997 | Dew | |
| D381,264 S | 7/1997 | Lippincott | |
| 5,655,661 A | 8/1997 | Rigby | |
| 5,688,544 A | 11/1997 | Bolton et al. | |
| 5,692,635 A | 12/1997 | Farrell et al. | |
| 5,695,798 A | 12/1997 | Rozzano | |
| 5,747,084 A | 5/1998 | Cochran et al. | |
| 5,795,604 A | 8/1998 | Wells et al. | |
| 5,804,237 A | 9/1998 | Diamond et al. | |
| 5,874,155 A | 2/1999 | Gehrke et al. | |
| 5,878,549 A | 3/1999 | Littmann et al. | |
| 5,882,789 A | 3/1999 | Jones et al. | |
| 5,904,263 A | 5/1999 | St. Pierre et al. | |
| 5,913,425 A | 6/1999 | Thomas et al. | |
| 5,919,501 A | 7/1999 | Rozzano | |
| 5,922,376 A | 7/1999 | Privert | |
| 5,950,959 A | 9/1999 | Milliorn | |
| D416,751 S | 11/1999 | Sawyer | |
| 5,992,674 A | 11/1999 | Schulz | |
| D417,366 S | 12/1999 | Obra | |
| D418,371 S | 1/2000 | Whitehead | |
| 6,044,622 A * | 4/2000 | Brady et al. | 53/412 |
| 6,048,558 A | 4/2000 | Feldmeier et al. | |
| 6,050,027 A | 4/2000 | Pavelka et al. | |
| 6,092,664 A | 7/2000 | Bartosek | |
| D430,023 S | 8/2000 | Shurtleff et al. | |
| RE36,867 E | 9/2000 | Rozzano | |
| D432,409 S | 10/2000 | Feldmeier | |
| D433,592 S | 11/2000 | Hopkins | |
| D434,276 S | 11/2000 | Obra | |
| 6,220,422 B1 | 4/2001 | Lee et al. | |
| RE37,171 E | 5/2001 | Busche et al. | |
| D443,510 S | 6/2001 | Doucette | |
| 6,248,442 B1 | 6/2001 | Kong et al. | |
| D446,719 S | 8/2001 | Garraway | |
| D448,130 S | 9/2001 | Wagner | |
| D450,240 S | 11/2001 | Haag et al. | |
| 6,358,622 B1 | 3/2002 | Shida et al. | |
| 6,360,885 B1 | 3/2002 | Krueger et al. | |
| 6,467,647 B1 | 10/2002 | Tucker et al. | |
| D474,687 S | 5/2003 | Jones et al. | |
| D478,282 S | 8/2003 | Hayes et al. | |
| D482,277 S | 11/2003 | Castellanos et al. | |
| 6,648,140 B2 | 11/2003 | Petricca | |
| D490,309 S | 5/2004 | Hayes | |
| D495,249 S | 8/2004 | Martinson et al. | |
| D500,676 S | 1/2005 | Jackson et al. | |
| 6,843,042 B2 | 1/2005 | Nakabayashi et al. | |
| 6,923,338 B2 | 8/2005 | Dees et al. | |
| D522,355 S | 6/2006 | Castellanos et al. | |
| D528,014 S | 9/2006 | Cutts et al. | |
| 7,172,779 B2 * | 2/2007 | Castellanos et al. | 426/106 |
| 7,205,016 B2 * | 4/2007 | Garwood | 426/108 |
| D553,010 S | 10/2007 | Cutts et al. | |
| 7,475,780 B2 | 1/2009 | Hinze et al. | |
| 7,731,997 B2 | 6/2010 | Castellanos et al. | |
| 7,810,302 B2 | 10/2010 | Hinze et al. | |
| 7,908,829 B2 * | 3/2011 | Ligon et al. | 53/511 |
| 2003/0136790 A1 | 7/2003 | McNeeley et al. | |
| 2003/0230582 A1 * | 12/2003 | Whitmore et al. | 220/507 |
| 2004/0159080 A1 | 8/2004 | Stewart et al. | |
| 2004/0202750 A1 | 10/2004 | Versulys | |
| 2005/0233036 A1 * | 10/2005 | Feldmeier et al. | 426/121 |
| 2006/0151339 A1 | 7/2006 | Bradley et al. | |
| 2007/0012708 A1 | 1/2007 | Send et al. | |
| 2007/0034538 A1 | 2/2007 | Landis | |
| 2007/0092611 A1 | 4/2007 | Hinze et al. | |
| 2007/0116805 A1 | 5/2007 | Castellanos et al. | |
| 2007/0138192 A1 | 6/2007 | Send et al. | |
| 2008/0118609 A1 * | 5/2008 | Harlfinger | 426/106 |
| 2008/0128424 A1 | 6/2008 | Castellanos et al. | |
| 2008/0160143 A1 | 7/2008 | Edwards et al. | |
| 2010/0237088 A1 | 9/2010 | Castellanos et al. | |
| 2010/0258569 A1 | 10/2010 | Hinze et al. | |
| 2011/0024439 A1 | 2/2011 | Send et al. | |

FOREIGN PATENT DOCUMENTS

| | | |
|---|---|---|
| EP | 0368713 | 5/1990 |
| EP | 0454339 | 10/1991 |
| EP | 0506295 | 9/1992 |

(56) References Cited

FOREIGN PATENT DOCUMENTS

| | | |
|---|---|---|
| EP | 0752374 | 1/1997 |
| EP | 0767106 | 4/1997 |
| EP | 0791538 | 8/1997 |
| EP | 0900743 | 3/1999 |
| JP | 05016957 | 1/1993 |
| JP | 08244810 | 9/1996 |
| JP | 10278952 | 10/1998 |
| JP | 10278953 | 10/1998 |
| JP | 11171260 | 6/1999 |
| JP | 2002166951 | 6/2002 |
| JP | 2002362598 | 12/2002 |
| WO | 0246042 | 6/2002 |

OTHER PUBLICATIONS

Shaved Meat Package Photograph, International Sial Food Show, Oct. 2002, Paris, France, (as described in e-mail from Wilcox, Cindee L., to inventor Carolina Castellanos, May 2, 2003), two pages.
"Hillshire Farm's Ultra-Thin Deli Select® Lunchmeats," The National Provisioner, Jul. 2002, p. 65.
"With Ultra-Thin Deli Select, Package Is Part of the Product," FoodEngineering, Jun. 2002, p. 22.
Lunchmeats Launch in Reusable PP Containers, Packworld.com, http://www.packworld.com, (Published Jun. 2002 Packaging World, p. 11), pp. 1 and 2.
"Hillshire Farm Slices into GladWare," Packaging Digest, Jun. 2002, p. 10.

\* cited by examiner

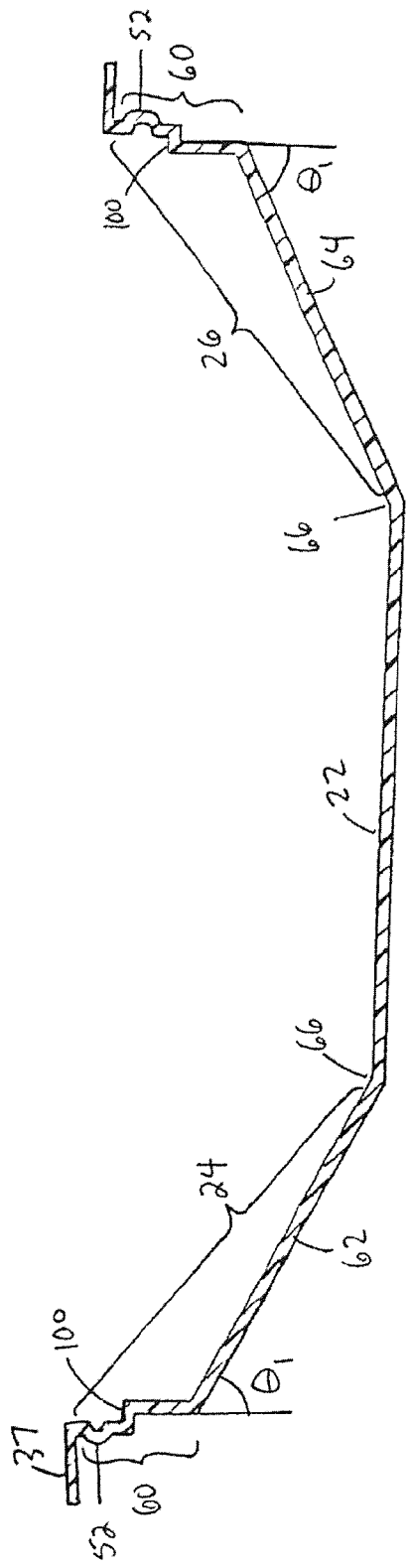
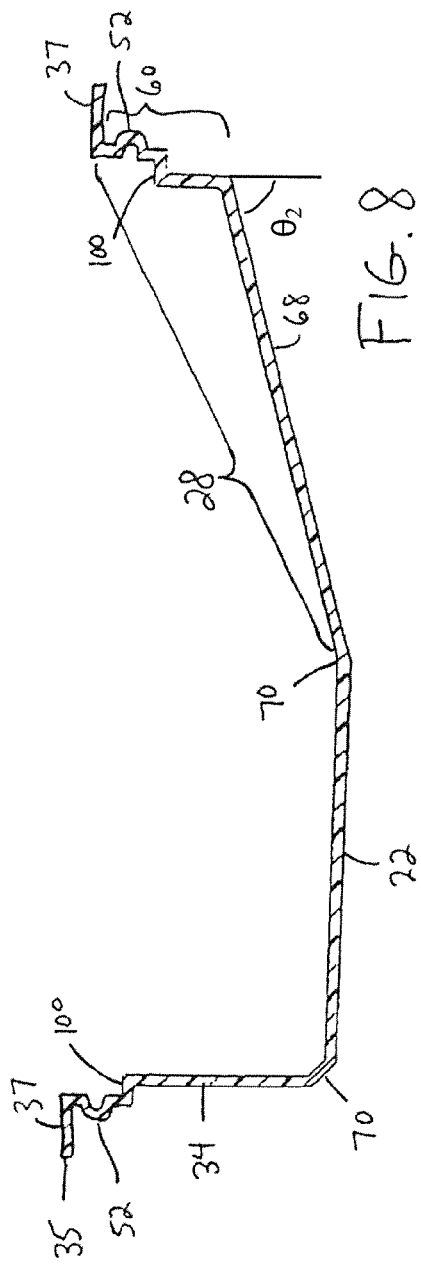

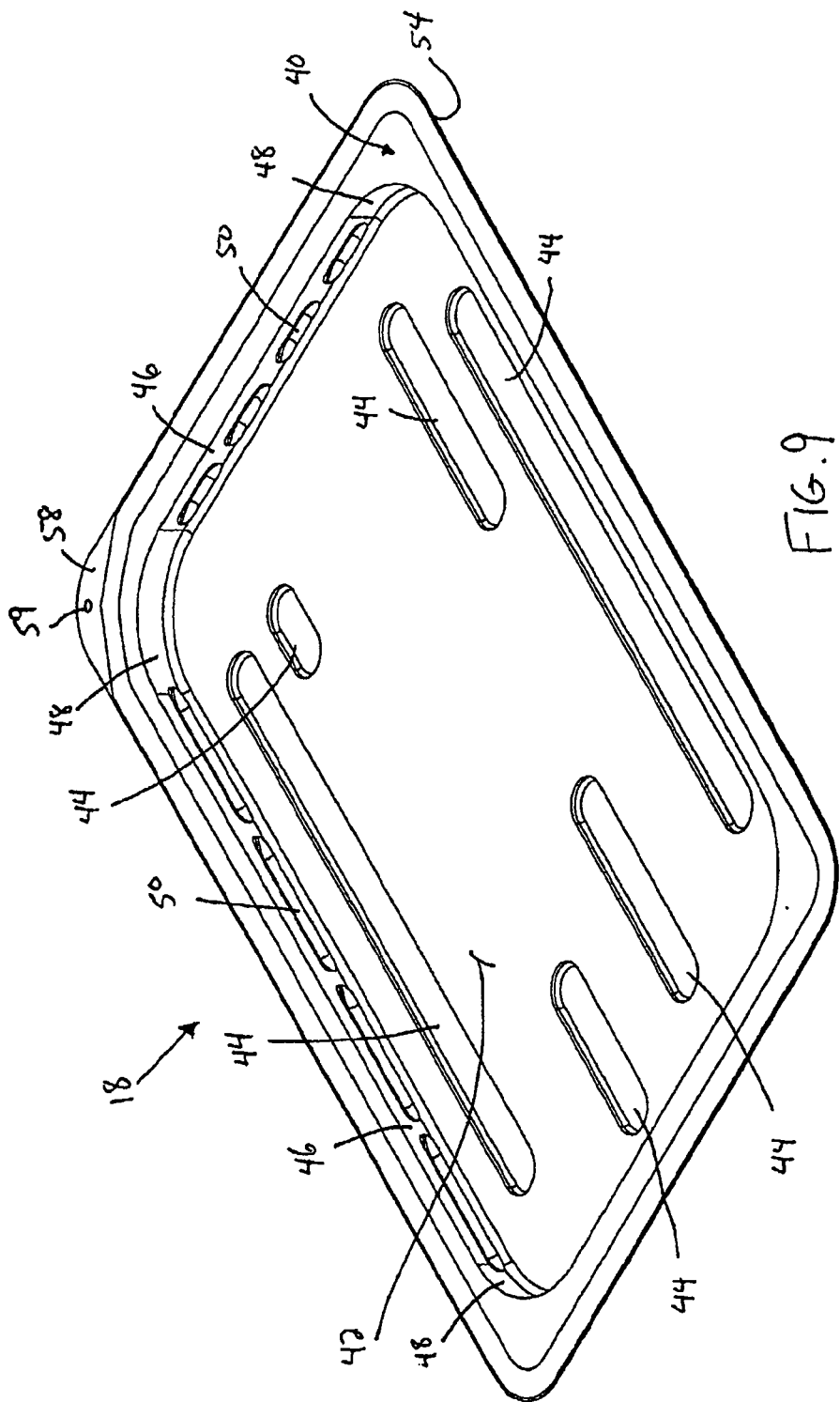

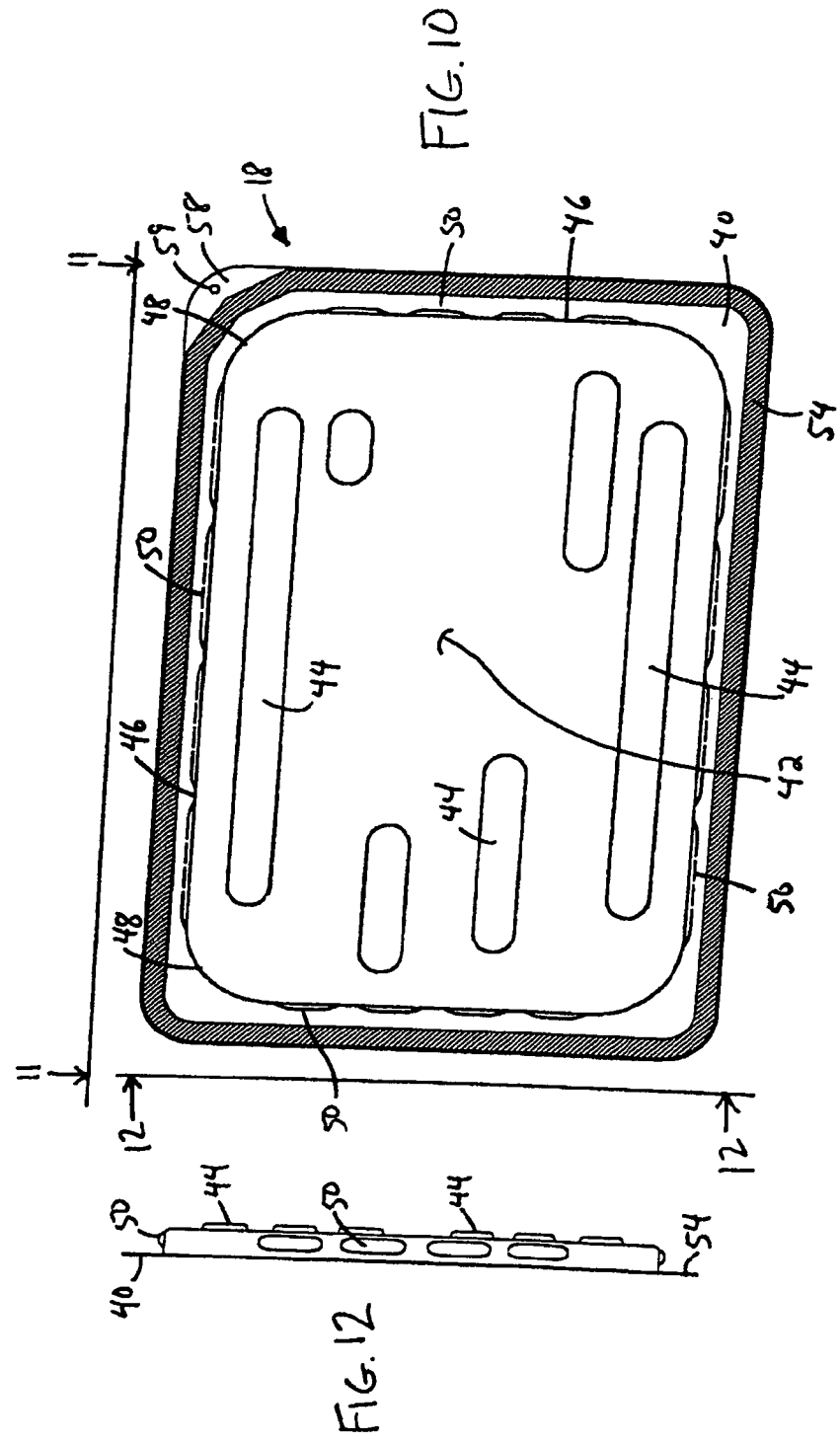

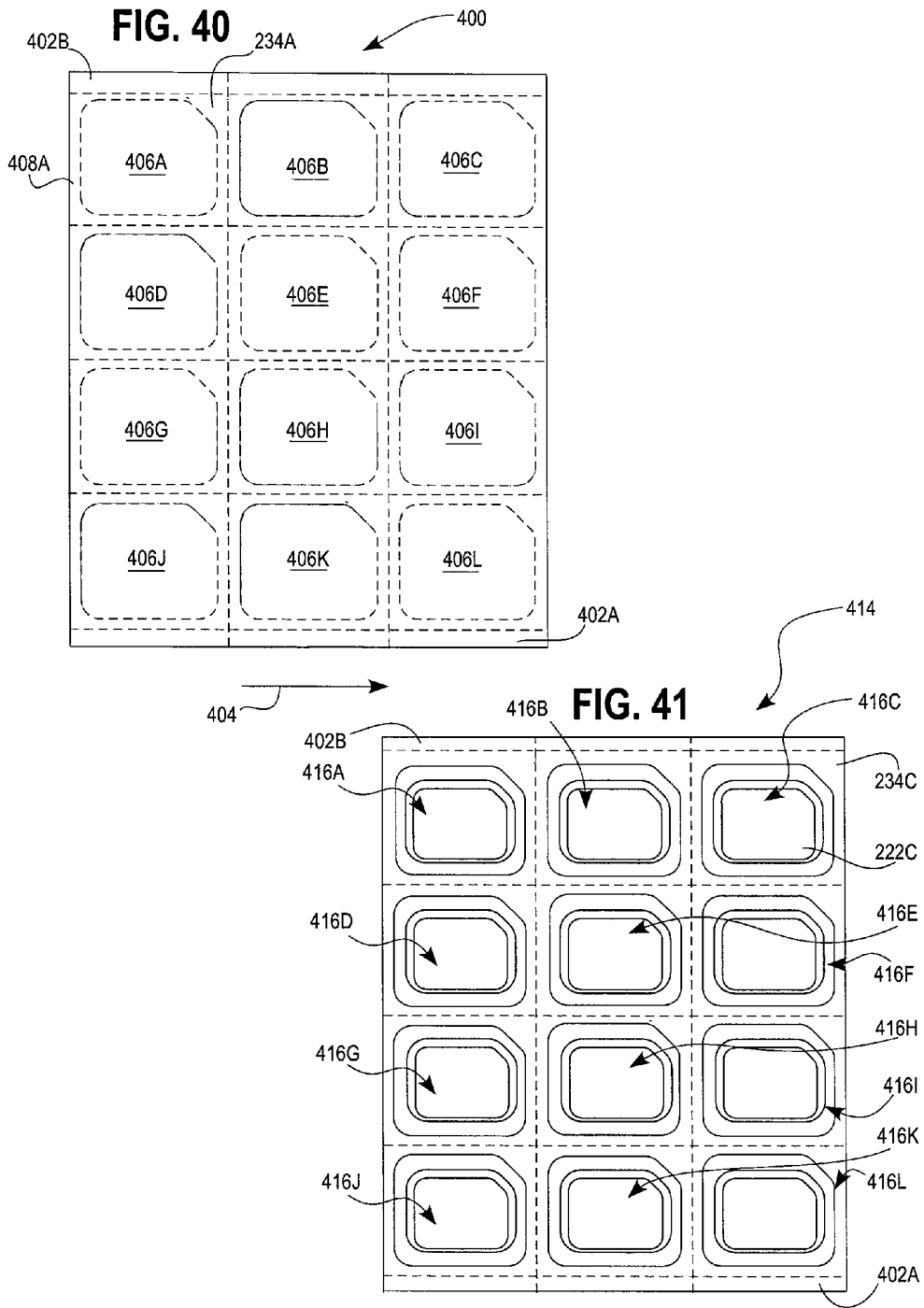

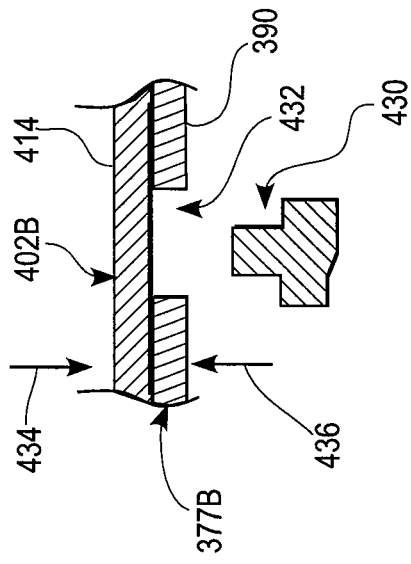
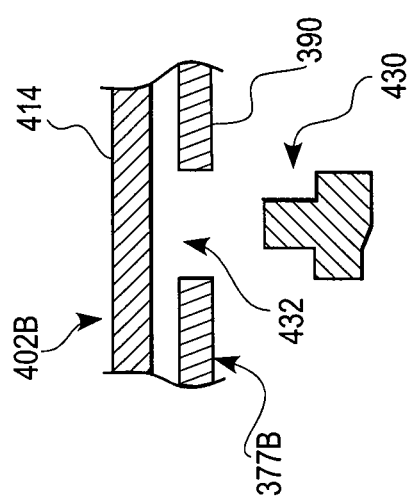
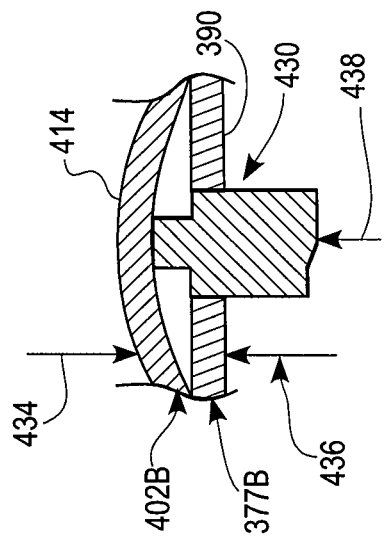

CONTAINER FOR SLICED AND FLUFFED FOOD PRODUCTS

FIELD

The present invention relates generally to food packaging, and more specifically, to food packages having easy-open features.

BACKGROUND

Many food products are often presliced and packaged for sale to consumers. For example, thinly sliced food products, such as luncheon meats, are often presliced and packaged in an ordered stack wherein only the first or top slice is viewed from the package exterior. In one known example, the presliced stack is vacuum-sealed within a flexible bag or pouch that is either labeled or is contained within a labeled rigid container, such as a cardboard container. It is also known that such flexible packages may be made reclosable once unsealed by the consumer, such as described in U.S. Pat. No. 5,582,853 issued Dec. 10, 1996, entitled MULTI-SEAL RECLOSABLE FLEXIBLE PACKAGE FOR DISPLAYING THINLY SLICED FOOD PRODUCTS. In another example, the ordered stack is held within a rigid package formed to conform to the dimensions of the sliced and ordered stack and a lid covering the package, such as a plastic package of bologna having a cylindrical rigid base conforming to the ordered stack and a lid that covers the base.

Alternatively, thinly sliced food products are packaged such that the slices are randomly arranged or jumbled within the package. The jumbled slices, rather than lying flat on each other in an orderly stack form, lie ruffled such that there are bends and curves in the meat slices with space or air gaps present in between some of the adjacent slices. This gives the sliced food product a "freshly-sliced deli" appearance or a "fluffed" look. Many consumers prefer the fluffed look since it resembles the look of food products that are freshly sliced at the deli in comparison to the pressed meat look of traditional ordered stack packaging where the slices lie flush engagement with adjacent upper and lower slices. Such fluffed food products are typically sealed in a random arrangement within a flexible bag or pouch. Typically, the packages for containing such food products do not conform to the shape of the individual slices, as in many ordered stack packages, since the food product is not intended to look as though it has been stacked.

However, presliced and fluffed food products often do not retain their fluffed look in these conventional packages. In particular, the food products tend to move, shift and settle within the package during manufacturing, distribution and storage of the packages. Additionally, flexible packages allow externally applied forces of the exterior surfaces of the packages due to handling and storage to compress portions of the fluffed product. Such action causes much of the space or air gaps present between adjacent slices to be removed. Accordingly, once on display for the consumer, these products have unfortunately lost much of their "fluff", reducing the freshly sliced appearance that is sought to be achieved by the manufacturer.

Further, one prior food package comprises a tray having a food storage compartment and a lid for closing the compartment. The periphery of the tray has a flange that abuts a corresponding flange on the lid when the compartment is closed. The food package may be formed from two webs: a web of trays and a web of lids. Each tray is joined to its respective lid at sealing portions of the tray and lid flanges. In one approach, the flanges are heated to a point that melts the sealing portions of the flanges together. Alternatively, the flanges may be joined together using glue or adhesive, which may also be heated. After the compartment has been filled with food product, the tray and the lid aligned with one another, and the tray and lid glued or bonded together, the packages are then separated from the webs, such as with a cutting tool. This separation process may result in tacking of the edges of the tray and lid flanges. If this tacking occurs where a consumer is to initiate pulling the adjacent flanges apart, the consumer may experience difficulty in separating the lid from the tray to gain access to the food product stored in the compartment.

SUMMARY

The present invention advantageously addresses the needs above as well as other needs by providing a food package for containing a sliced food product and that better retains a freshly-sliced or fluffed look in the food product. Preferably, the present package includes a stand-up feature that allows the fluffed sliced food product to be better displayed to the consumer than if it were lying flat on its bottom wall of its base member. In addition, the preferred package herein has a rigid-rigid construction so that additional support sleeves or the like into which the flexible packages are deposited are not needed for display purposes.

The preferred package is specifically adapted to maintain the ruffling of thin meat slices by the configuration of the compartment. Generally, the size or volume of the compartment will be carefully tailored to that of the size or volume of meat slices to be contained therein so that shifting of the packaged, fluffed or ruffled meat slices is minimized during movements of the package. To this end, the walls of the compartment are configured to engage and bias the meat in a predetermined manner for keeping the bends or ruffles in the deli-meat slices despite package handling and the like.

More particularly, the compartment has sidewalls extending between the bottom and top of the package in an other than vertical orientation. At least one, and preferably several of the sidewalls can be provided with an inward taper toward each other as they progress toward the bottom of the compartment. In other words, one or more of the side walls include taper sections or ramp sections. Accordingly, only some of the meat slices are funneled downwardly to take up the smaller space or volume present toward the bottom of the compartment with the majority of the volume of meat slices kept held or propped up toward the upper end of the compartment which presents the meat slices with progressively greater volume in which to fit. Thus, only the relatively few meat slices at the container bottom will be subject to significant compression forces from above that can eliminate the fluffing therein, while the great majority of the slices supported on these bottom slices will retain their fluffy look.

The taper of the compartment side walls is at a relatively large angle to the vertical such that the bottom wall is of small size relative to the upper compartment opening. Accordingly, the space in the compartment widens or increases fairly quickly from the bottom up. Because of this taper of the sidewalls, there will only be a relatively small amount of meat funneled to the bottom of the compartment in the confined space thereat. As such, most of the meat in the compartment will be provided with enough space so that the slices are not compressed. In particular, since the preferred package herein is constructed to provide a viewing window through the cover to the contents of the compartment as described hereinafter, it is the meat slices at or adjacent to the top of the compartment in which the fluffy look thereof is most important. Thus, the tapered compartment as described above enables meat slices to retain their fluffed look at locations in the compartment that are most important from a point-of-sale perspective. Additionally, the preferred package is also configured such that the meat slices retain the fluffed appearance along the edges of the compartment since the meat slices are viewable through the sides of the tapered compartment, i.e., the sides of the preferred compartment are also important from a point-of-sale perspective.

At the same time, this progressively increasing space is sized to closely match that of the volume of meat to be received therein so that the meat will be held between the sidewalls and the cover against shifting which can cause the meat slices to lose their fluffiness. As mentioned, the tapered sidewalls provide the meat slices with a slight upward bias toward the cover so that they are lightly held therebetween. This retains the fluffed slices substantially stationary in the compartment so that they do not move and push against each other such as when the package is being handled. In the preferred form, three compartment sidewalls are tapered as described and the fourth side wall extends substantially vertically between the bottom wall and the upper opening at the forward side of the compartment, for reasons described hereinafter.

In another aspect of the invention, the package is adapted to be self-standing in a generally vertical, display orientation with the bottom wall of the meat compartment extending upwardly from a surface on which the package is supported. As previously mentioned, the preferred package has the front side wall portion of the compartment configured to extend substantially normal to the compartment bottom wall. This side wall extends for a predetermined distance so as to space the juncture between it and the bottom wall, and the front portion of a transverse upper lip of the base member by a distance sufficient to allow them to cooperate to keep the package in its display orientation. Herein, the display orientation is typically referred to as being vertical although it will be understood that this can include a slight rearward incline of the self-standing package herein. This vertical display orientation provides the benefit that the package may be displayed on the retailer's shelf such that consumers can easily view the product through the viewing window(s) of the cover or lid. Advantageously, special merchandisers are not required for display since the packages may simply be turned in a vertical orientation and placed on a shelf for display.

The compartment is positioned toward the front of the base member so that when the package is pivoted up approximately ninety degrees from the horizontal orientation thereof to the vertical orientation, the center of gravity of the package loaded with relatively heavy, fluffed sliced meat, e.g. deli ham or turkey slices, is shifted downwardly to provide the package with stability in it self-standing, display orientation. To this end, the geometric center of the rectangular bottom wall can be displaced toward the front of the package relative to the center of the rectangular upper end thereof. With the previously-described preferred small size of the bottom wall for meat fluffing purposes, the rear edge of the compartment bottom wall can be displaced forwardly of the package center, as well.

The tapered opposite side wall portions of the compartment on either side (or rectangular ends) of the base member also act to push the meat slices inward from the sides toward the vertical center line of the package. The taper of the rear side wall portion generally cooperates with the normal front side wall portion to push the meat slices forwardly toward alignment with the center of the bottom wall. As mentioned, this positioning of the compartment as well as the tapered configuration of the compartment rear side wall shifts the weight of the meat forwardly in the compartment so that the center-of-gravity of the package is lower when the package is pivoted to stand on its forward side for display.

Another effect that the tapered configuration of the side wall portions provides is to push or bias the meat slices upwardly in the compartment as the volume of the compartment progressively enlarges toward the upper end thereof, as has been mentioned. Again, when pivoted for display, this lifting action on the meat slices will cause the weight of the meat to be shifted forwardly in the vertically oriented package. Since in its generally vertical orientation, the package preferably is slightly tilted rearward to rest on the corner juncture of the front and bottom compartment walls, this forward weighting of the package further assists in stabilizing it for display. Thus, the forward position of the compartment and the taper of the compartment side walls cause the center-of-gravity of the vertically oriented package to be lowered and shifted toward the front of the package, so that the package is more resistant to tipping and falling over when pivoted to its display position.

The taper of the compartment rear side wall and the lack of such a taper on the forward side wall are such that the center of the bottom wall is shifted forwardly in the package, as previously discussed. The rear side wall portion can be tapered such that not only is the bottom wall off-center, but so that its rear edge is also disposed forwardly of the base center. In one form, the rear side wall can be more gradually tapered than the tapered opposite side wall portions, and it can be provided with a longer length in its tapering direction so as to position and shift the bottom wall forwardly in the package, as has been described.

The package, and specifically the base member thereof is also adapted to shift the center-of-gravity of its contents as described above for being oriented vertically for display purposes, while maintaining the stability of the packages in their horizontal orientation. More particularly, the base member has wells or foot portions formed at either rear corner that serve as feet for the base when horizontally disposed, e.g., stored in a distribution truck, retailer storage shelf or a consumer refrigerator. The space in the wells is significantly less than that in the main compartment in which the meat slices are received. Thus, any meat that may be located in the wells is also kept to a minimum.

When the package is pivoted to its display orientation, the wells will be toward the top of the package. Because the weight of the material used for the well walls is small relative to the weight of the meat slices, the wells do not cause the package to be top heavy in the vertical position which otherwise can cause undesired instability and tipping problems. At the same time, the wells are formed to approximately the same depth as the main compartment so that their bottom walls are aligned (preferably coplanar with) with that of the main compartment to provide stable support for the base member in its horizontal orientation.

The taper of the opposite side wall portions of the main compartment spaces the opposite side or end edges of the rectangular compartment bottom wall inwardly from the corresponding side or ends of the base member at the upper periphery thereof. Further, the tapered rear side wall portion spaces the compartment bottom wall forwardly in the base member. Accordingly, the bottom wall of the food compartment is disposed intermediate the bottom walls of the rear corner wells and forwardly therefrom so that the three bottom walls are arranged in a triangular orientation relative to each other. This triangular spacing or arrangement of the bottom walls provides a secure tripod support for the base in its horizontal position. Additionally, the rear wells are shaped to nest within the lid of adjacent packages in a horizontal stack for reducing side-to-side movement of packages within a stack, while the front wall nests into the lid of adjacent packages in the horizontal stack together with the rear wells for reducing front-to-back movement of the packages within the stack.

In accordance with the present invention, a food package for sliced food products is provided that includes a rigid tray or base member forming a compartment for containing the food product and a rigid cover or rigid lid sealing the compartment. Advantageously, the base member includes a bottom wall and side wall portions upstanding therefrom that are configured to engage and hold the food product within the compartment such that it will minimize shifting and movement of the product within the compartment; thus, better retaining the fluffed looked upon display for the consumer. Preferably, the food package is generally rectangularly shaped in a plan view.

Additionally, in another feature, the rigid lid hermetically seals against the rigid base member at sealing surfaces extending about the opening of the compartment. Advantageously, due to this hermetic seal, the food product is not required to be sealed within a flexible bag or pouch within the rigid tray/rigid lid. This feature also reduces packaging costs, saves packaging material and eliminates steps in the assembly process. Additionally, according to one embodiment, once the lid is unsealed by the consumer, the lid may be re-closed into the compartment to provide easy storage of the food package in the consumer's refrigerator. Thus, the consumer is not required to provide another container or bag to store the food product.

Furthermore, since the base member and lid are generally rigid, normal externally applied forces on the surfaces of package do not affect or compress the product within. All of this helps to maintain a fluffed look to the consumer.

In one embodiment, the invention can be characterized as a food package for containing sliced food products, the food package comprising: a rigid base member; a compartment of the base member in which slices of a food product are received; a bottom wall of the compartment; side wall portions of the compartment upstanding from the bottom wall and having a predetermined configuration for engaging the food product to hold the slices in a fluffed arrangement thereof; an opening to the compartment above the bottom wall; and a rigid lid covering the opening to contain the sliced food product within the compartment for providing a rigid-rigid packaging of the sliced food product with the rigid base member.

In another embodiment, the invention can be characterized as a food package for sliced food products, the food package comprising: a base member having a compartment for receiving the slices of food product therein; an upper opening of the compartment through which the slices are inserted into the compartment; a bottom wall of the compartment having a predetermined size smaller than that of the compartment upper opening; a cover sized to fit over the upper opening for retaining the food slices in the compartment; and at least one tapered wall extending between the bottom wall to bias the food slices toward the cover for holding the slices against shifting.

In another embodiment, the invention can be characterized as a food package having a horizontal orientation and slightly inclined or vertical display orientation, the food package comprising: a base member having an upper periphery with the package in the horizontal orientation thereof, there being a center of the upper periphery; a main compartment of the base member for receiving a food product therein; a bottom wall of the main compartment having a predetermined configuration including a center that is offset from the center of the base member upper periphery to shift the weight of the food product downwardly with the package in the display orientation thereof; a tapered side wall portion upstanding from the bottom wall along one side thereof that generally lifts the food product away from the bottom wall to shift the weight of the food product forwardly with the package in the display orientation thereof; and a side wall portion opposite the tapered side wall portion that extends generally perpendicular to the bottom wall for being positioned adjacent to a support surface with the package in the display orientation thereof.

In another embodiment, the invention can be characterized as a food package for containing sliced food products, the food package comprising: a rigid base member; a compartment of the base member in which slices of a food product are received, the sliced food product arranged to have a fluffed appearance within the compartment; a bottom wall of the compartment; side wall portions of the compartment upstanding from the bottom wall; an opening to the compartment above the bottom wall; and a rigid lid covering the opening to contain the sliced food product within the compartment for providing a rigid-rigid packaging of the sliced food product with the rigid base member.

With respect to another aspect of the invention, a food package for containing a food product is provided that includes a base member having a ridge which defines an outer periphery of the base member. The food package further includes a lid with a tab, the tab having a lower surface that overlaps a gripping portion of the base member ridge when the lid is connected to the base member. A user may readily remove the lid from the base member by grasping and separating the tab and the gripping portion. Advantageously, a portion of the tab lower surface is uncovered by the gripping portion of the base member when the lid is connected to the base member. More specifically, the gripping portion of the base member has a plurality of edges which define an outer profile of the gripping portion such that the uncovered portion of the tab lower surface is disposed outward from the outer profile of the gripping portion. In this manner, a user may readily grasp the tab and separate it from the gripping portion. Further, if the food package is cut from a web, the gripping portion avoids being tacked to the tab during cutting because the outer profile of the gripping portion is disposed inward of an outer edge of the tab.

A method of assembling a package is also provided, the method being suitable for use with different shapes of packages and different types of packaging production including those of the form-fill-seal variety. The method includes forming a cutout in a web of material for a base member, the cutout partially defining an outer profile of a gripping portion of the base member. The base member web is shaped to include a compartment having a bottom wall, an opening opposite the bottom wall, and side walls upstanding from the bottom wall. Similarly, a web of material for a lid is shaped to include a cover wall and a tab of the lid with upper and lower surfaces. The base member web and the lid web are brought together so that the cover wall of the lid closes the opening of the compartment of the base member and the tab of the lid overlaps the gripping portion of the base member. The outer profile of the gripping portion uncovers a portion of the tab lower surface with the uncovered portion being disposed outward from the outer profile of the gripping portion. In this manner, the method provides a tab that may be readily grasped and separated from the gripping portion to open the package. The method may also include trimming material from the lid and base member webs by forming a substantially straight edge of the base member and a substantially straight edge of the lid. The straight edges are aligned when the cover wall of the lid closes the opening of the compartment of the base member. This way, the straight edges combine to form an uninterrupted portion of the outer perimeter of the assembled package. Further, the straight edge of the lid may be longer than the straight edge of the base member. This configuration positions a portion of the edge of the lid outward from the outer profile of the gripping portion of the base member. The separation between these two edges limits the opportunity for the edges to tack together during trimming.

BRIEF DESCRIPTION OF THE DRAWINGS

The above and other aspects, features and advantages of the present invention will be more apparent from the following more particular description thereof, presented in conjunction with the following drawings wherein:

FIG. 7 is a cross sectional view of the base member taken along line 7-7 of FIG. 4A illustrating the configuration of upper sections and ramp sections of the side wall portions relative to a bottom wall;

FIG. 8 is a cross sectional view of the base member taken along line 8-8 of FIG. 4A illustrating the configuration of an upper section and a ramp section of the rear side wall portion relative to the bottom wall;

FIG. 9 is a perspective view of the rigid lid of FIG. 2 illustrating a ridge portion, vertically extending lid walls, a lid cover wall, lugs adapted to fit into the base member for a snap fit and flat channels for structural stability;

FIG. 10 is a top plan view of the lid of FIG. 9;

FIG. 11 is an elevational view taken along line 11-11 of FIG. 10 illustrating the lugs for reclosing the lid once unsealed;

FIG. 12 is an end elevational view taken along line 12-12 of FIG. 10;

FIG. 40 is a plan view of a web of material for a number of lids;

FIG. 41 is a plan view of the lid web of FIG. 40 after the lids have been formed in the web;

FIGS. 43A-43C are a series of enlarged cross-sectional views taken across the line 43-43 of FIG. 42 showing steps of a process to gas flush the assembly of FIG. 42.

Corresponding reference characters indicate corresponding components throughout the several views of the drawings.

DETAILED DESCRIPTION OF THE DRAWINGS

The following description is not to be taken in a limiting sense, but is made merely for the purpose of describing the general principles of the invention. The scope of the invention should be determined with reference to the claims.

Figure 1A:
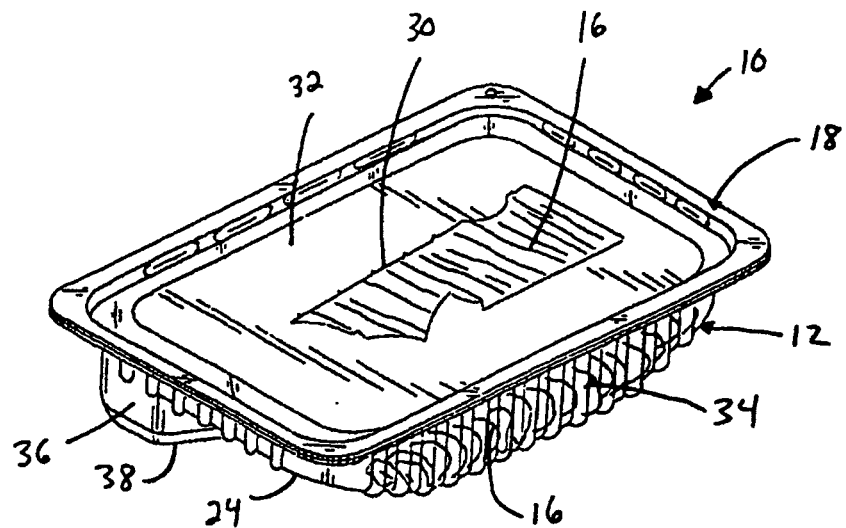
FIG. 1A is a perspective view of a food package in accordance with the present invention showing the package in its horizontal orientation.
Figure 1B:
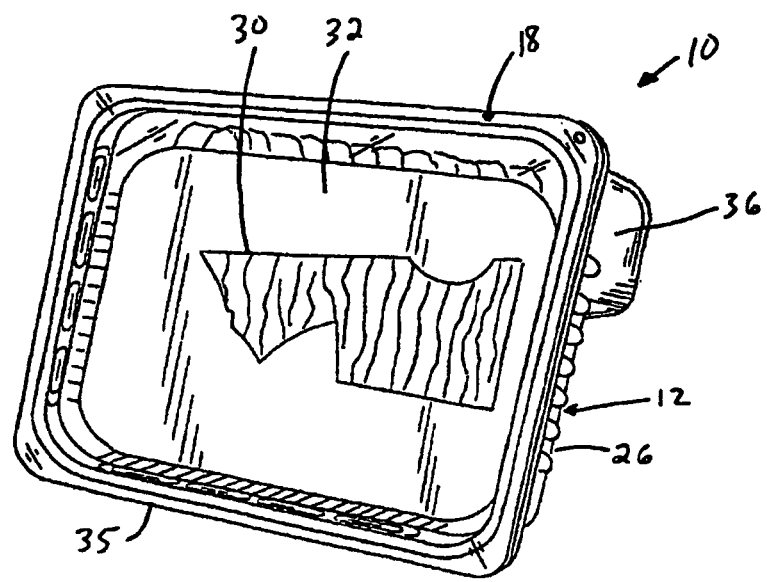
FIG. 1B is a perspective view of the food package of FIG. 1A shown in a vertical standup orientation for displaying the food product, for example, on a display shelf.
Figure 2:
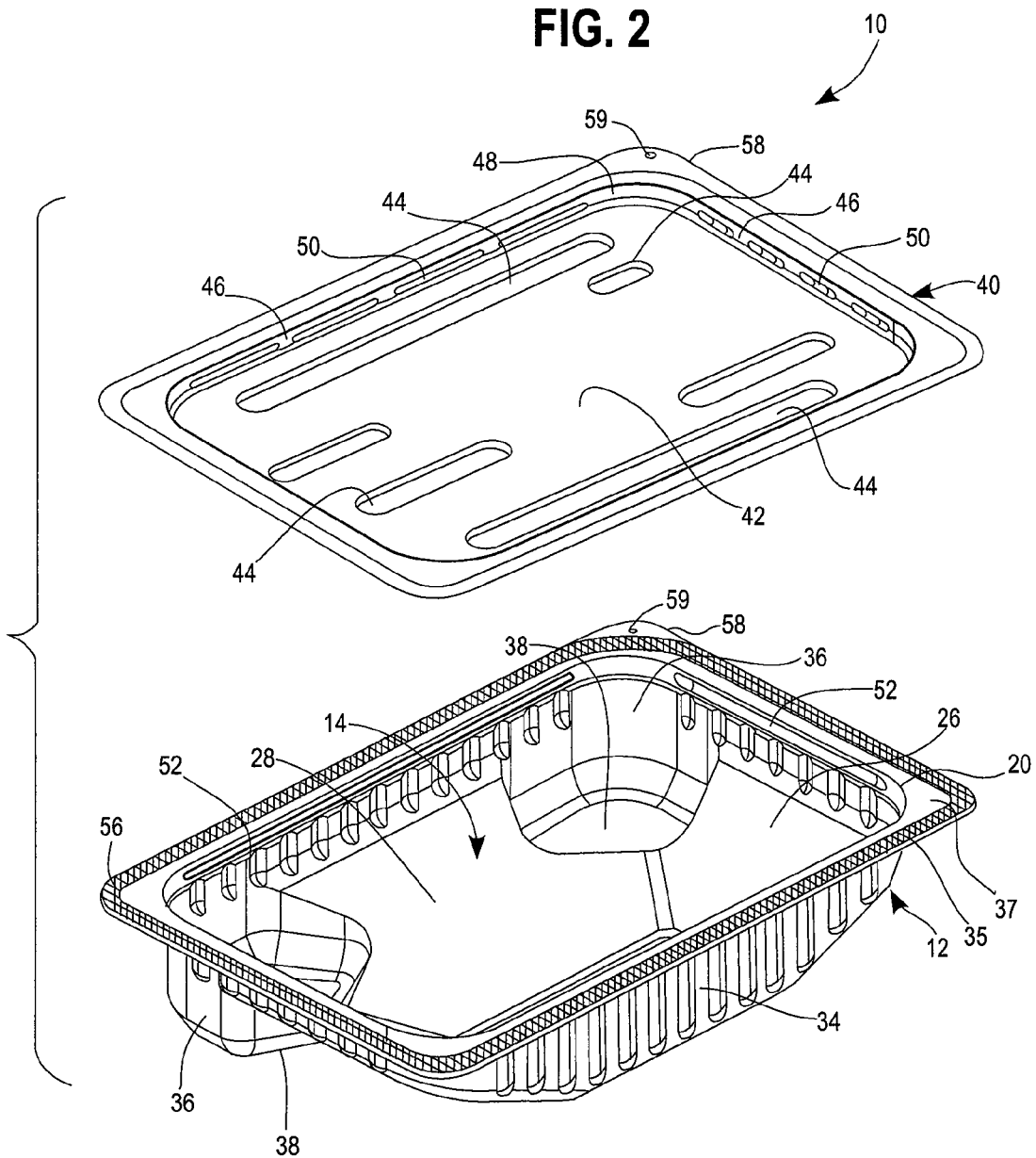
FIG. 2 is an exploded perspective view of the food package of FIGS. 1A and 1B, illustrating a rigid base member and a rigid lid for closing the base member.

The present invention is generally directed to food packages 10 in which there is a molded tray or base member 12 having a compartment 14 formed therein as by thermoforming for receipt of food products 16 such as sliced food products, preferably arranged to have a "fluffed" appearance, such as sliced luncheon meats, as shown in FIGS. 1A, 1B and 2. As used throughout this specification, the term fluffed refers to the seemingly disorganized or random arrangement of a sliced food product, such as it may appear as it "falls off of a slicer" into a pile. Thus, a fluffed sliced food product includes food product that is piled, jumbled or stacked in a random or stacked-to-look-random arrangement. Additionally, the sliced food product may be sliced at a variety of thicknesses depending on the specific type of product, e.g., preferably, the food product is a meat product that is thinly sliced or "shaved" between about 0.035 to 0.055 inches thick, most preferably, about 0.045 inches thick. However, in other forms the slices may be thicker depending on the type of food product and fluffed look to be achieved, for example, up to 0.8 inches thick. The food package further includes a cover or lid 18 formed by thermoforming for example, that covers and is hermetically sealed to an opening 20 of the compartment 14 of the base member 12. The lid 18 is designed to be opened (thus, unsealed) by the consumer and is then reclosable into the opening 20. Preferably, the lid 18 and the base member 12 are made of a clear or at least partially transparent material such that the food product 16 is visible through the food package 10.

As can be seen in FIGS. 1A, 1B, 2 and 3, the base member 12 includes a base or bottom wall 22 and side wall portions 24, 26 and 28 that have a predetermined configuration to engage and hold the food product within the compartment 14 such that it will minimize shifting and movement of the product within the compartment 14; thus, better retaining the fluffed looked of the food product 16 upon display for the consumer. In many embodiments, the side wall portions 24, 26 and 28 extend vertically downwardly from a ridge of the opening of the compartment a distance, then extend downwardly and inwardly toward the bottom wall 22 at an oblique angle. Thus, the side wall portions have angled or inclined taper or ramp sections and are best seen as ramp sections 62, 64 and 68 of FIGS. 7-8. These ramp sections function to push or hold the food product 16 contained within the compartment 14 upward toward the lid 18 and inward toward the center of the compartment 14. Advantageously, this provides better viewing of the food product 16 through a window 30 of a label 32 adhered or otherwise placed over the lid 18. Furthermore, these side wall portions also function to further retain the fluffed food product within the tapered compartment 14 formed by the bottom wall 22 and the various side wall portions 24, 26, 28, minimizing shifting or movement of the food product 16 during distribution, storage and display. The angled side wall portions 24, 26, 28 are best viewed in FIGS. 4A-6.

Herein, the orientation of the package surfaces and components will normally be referenced to the FIG. 1A in a horizontal position of the package 10. The horizontal orientation is typically used in the storage of the food package 10, such as in a retailer's, distributor's or consumer's refrigerator. However, as is illustrated in FIG. 1B, the package 10 is adapted to be rotated ninety degrees to stand on end or edge for display. Thus, the orientation of FIG. 1B is referred to as a stand-up orientation or a display orientation. As described herein, the horizontal orientation of FIG. 1A will generally be used as reference for the description of the package surfaces or walls and its components or contents.

It is also noted that while the construction of the food package 10 herein is the preferred form, it is manifest that the package 10 can take on other configurations from those illustrated and described herein. For example, in various forms, the base member 12 may have multiple compartments. Taper or ramp sections of the side wall portions may extend a portion of the length of the side wall portion, or extend a full length of a side wall portion. Likewise, the ramp sections of the respective side wall portions may extend toward and transition to the bottom wall 22 or may extend toward the bottom wall but separated from the bottom wall by an intermediate side wall section, such as a bottom ledge or similar section extending upward from the bottom wall. Additionally, although the food package 10 is illustrated in a generally rectangular geometry, the food package 10 may take on other geometries consistent with the present invention. Furthermore, one or more of the lid 18 and base member 12 may not be made of a clear material. In another alternative, the cover or lid can be in the form of a thin, flexible film sealing the compartment 14 of the base member 12, although the rigid lid 18 is preferred for being re-closable onto the base member 12, as described hereinafter.

In contrast to known containers for sliced food products, the package described herein is a generally rigid base member 12 and a generally rigid lid 18 design, for example, constructed of a thermoformed plastic material. Thus, the food package is a rigid-rigid design. Since the lid 18 is hermetically sealed into the opening 20 of the compartment 14, the sliced food product 16 is not required to be further contained and sealed within a flexible bag or pouch within the compartment 14. This feature reduces packaging costs, saves packaging material and eliminates steps in the assembly process. Additionally, this feature allows for easier access to the food product by the consumer, i.e., the consumer only has to open the lid 18 and does not have to open or unseal a further container or pouch within the package. Thus, in many embodiments, the food product 16 contacts and is retained within the compartment 14 by the interior surfaces of the base member 12 and the lid 18. Furthermore, since the base member 12 and the lid 18 are generally rigid, normal externally applied forces to the surfaces of the package do not act to compress the product 16 within; thus, better preserving the desired fluffed look of the food product 16 for the consumer.

Figure 3:
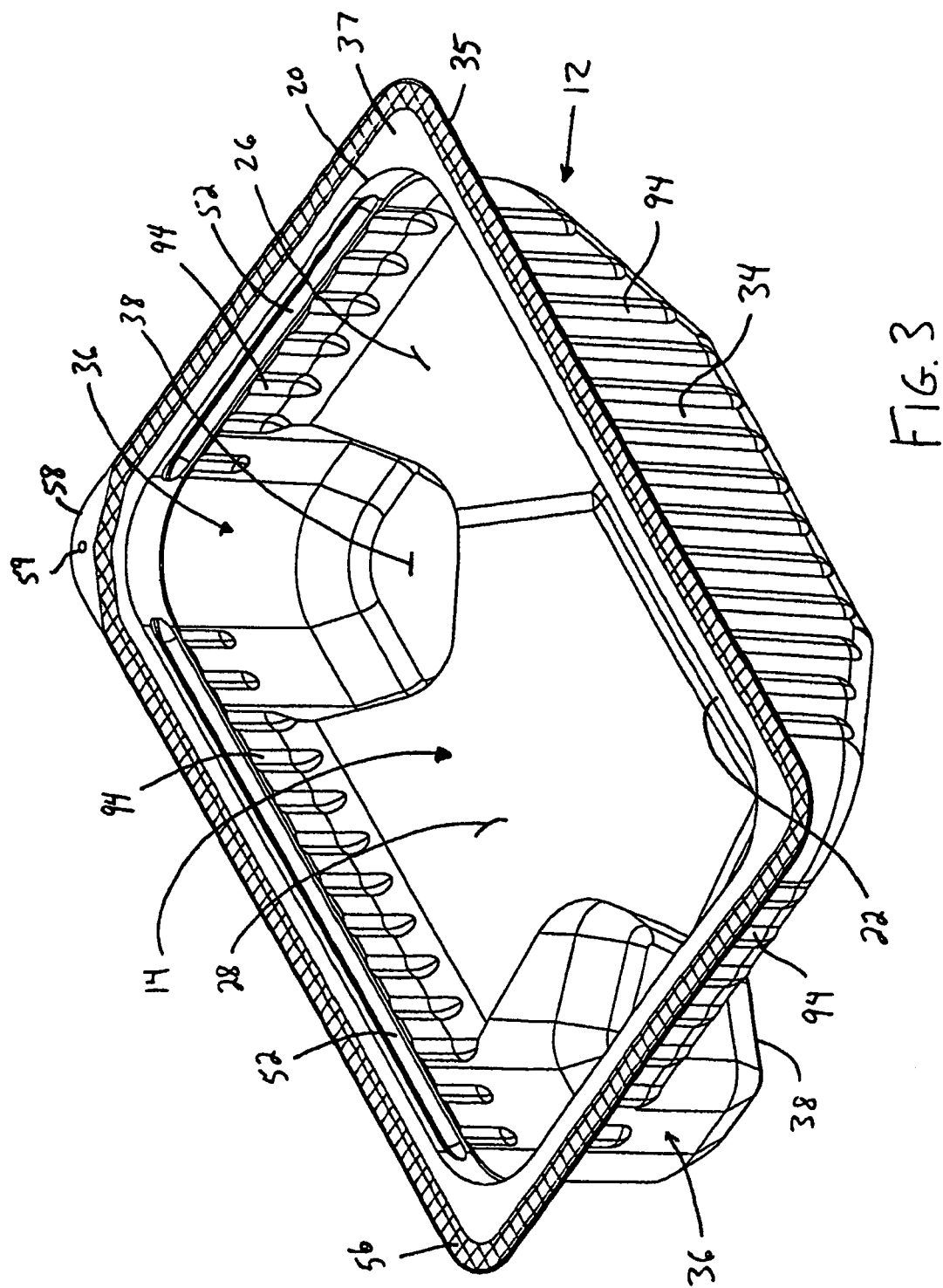
FIG. 3 is a perspective view of the base member of the food package of FIG. 1 illustrating angled side wall portions, a vertically extending front side wall portion, and wells or foot portions for stabilizing the food package in its horizontal orientation.

Also, as illustrated in FIGS. 1A, 2 and 3 for example, a front side wall portion 34 of the rigid base member 12 forming a front side of the compartment 14 extends generally vertically from the opening 20 to the bottom wall 22, i.e., the front side wall portion 34 is generally normal to the bottom wall 22. Accordingly, the package 10 is designed to be stoodup or tipped on the edge on the front side wall portion 34. Thus, the package 10 rests on a front edge 35 of the package 10 and a support surface 108 (see FIG. 15) of the front side wall portion 34 in the vertical or stand-up orientation illustrated in FIG. 1B. In the preferred form, the support surface 108 is the portion of the front side wall portion 34 at the junction of the front side wall portion and the bottom wall 22, such that the bottom wall 22 extends substantially vertically while in the display orientation. This provides the benefit that the package 10 may be displayed on the retailer's shelf in a display orientation such that consumers will advantageously view the product 16 through the viewing windows 30 through the rigid lid 18. Advantageously, special merchandisers are not required for display since the package 10 may simply be turned in a vertical orientation and placed on a shelf for display. It is noted that the front side wall portion may also extend downward and inward (or outward) at a slight angle toward the bottom wall 22 in some embodiments (i.e., the front side wall portion 34 may be other than normal with the bottom wall 22) and still be adapted to stand up.

Also illustrated, the rear side wall portion 28 opposite the front side wall portion 34 includes a ramp section that extends vertically downward and inward to the bottom wall 22 at an oblique angle. Thus, the ramp section of the rear side wall portion 28 extends downward and tapers inward toward the bottom wall 22. This inwardly tapering or ramping rear side wall portion not only functions to lift and hold the food product upwardly in the horizontal orientation, it also serves to hold or push the food product toward the center of the compartment 14 in the horizontal orientation, preferably in alignment over the bottom wall 22. In this embodiment, since the front side wall portion 34 extends generally vertically from the opening 20, the food product is pushed toward the center of the bottom wall 22 by the angled rear side wall portion. This effectively lowers the center of gravity of the package 10 when in the standup display orientation of FIG. 1B (i.e., the center of gravity is moved towards the front side wall portion 34, see also FIG. 15). Additionally, since the product is lifted, the center of gravity of the food package is also shifted slightly toward the lid in the vertical display orientation. These functions help to stabilize the food package 10 during the display orientation minimizing the risk that the package 10 will topple over.

Figure 16:
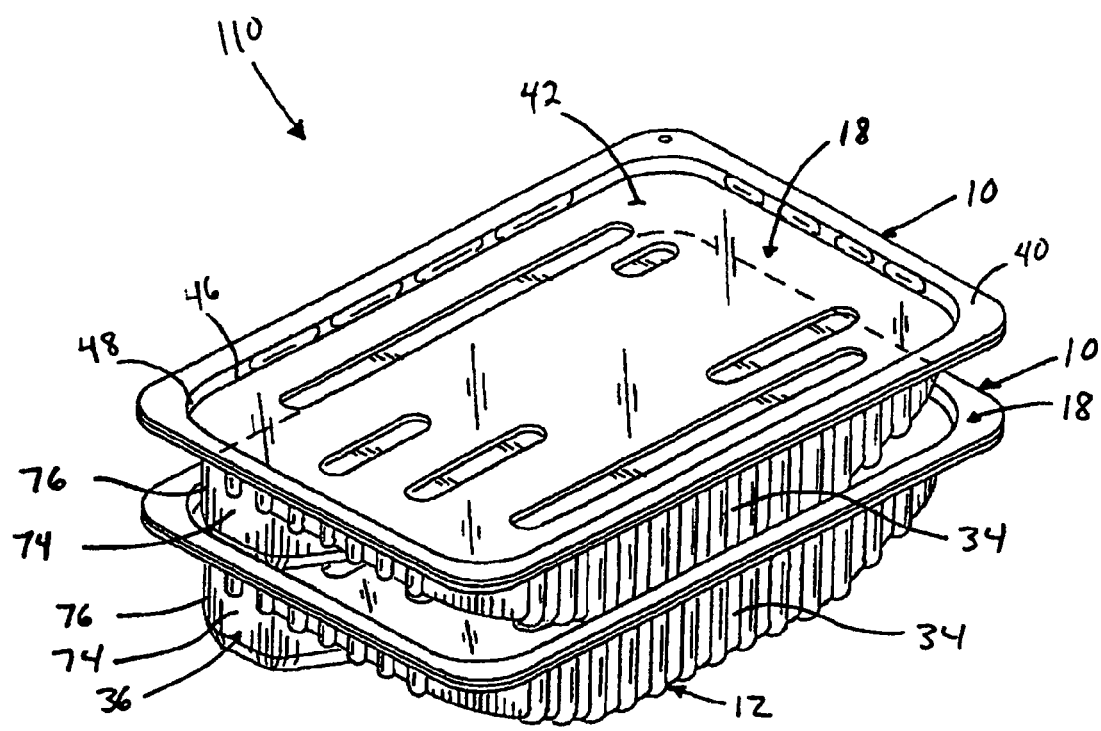
FIG. 16 is a perspective view of two food packages described herein stacked in the horizontal storage orientation illustrating the nesting of the foot portions and the front side wall portion within the lids within a stack of food packages to enhance stability and reduce lateral movement of individual packages within the stack.

Further illustrated, an additional feature provides a well-like foot portion 36 (also referred to as wells or well portions) formed at the junction of the rear side wall portion 28 and a respective adjacent side wall portion 24, 26 of the rigid base member 12. Each foot portion 36 extends vertically from the opening 20 to a respective base portion 38, which is generally horizontally coplanar with the bottom wall 22. Advantageously, the foot portion(s) 36 provide stability to the food package 10 when the stacked in the horizontal or storage orientation of FIG. 1A, e.g., stored in a distribution truck, retailer storage shelf or a consumer refrigerator. Such foot portions 36 are especially useful since the angled rear side wall portion 28 functions to shift the center of gravity of the food package 10 toward the lid 18 and the front side wall portion 34, without the foot portions 36, the package is less stable. In particular, multiply stacked food packages 10 in the horizontal orientation, such as would be during distribution and storage, are considerably less stable and will topple over. The foot portions 36 minimize such toppling but do not take away from the functionality that the angled rear side wall portion 28 provides by pushing the product 16 toward the center of the bottom wall 22 and upward toward the lid 18 of the food package 10. Additionally, as illustrated in FIG. 16, the feet portions 36 and the front side wall portion 34 are shaped to nest within the lid 18 of adjacent packages 10 in a horizontal stack; thus, reducing lateral or horizontal movement (e.g., side-to-side and front-to-back movement) of packages 10 within a stack.

Referring next to FIGS. 4A-8 as they relate to FIGS. 1A-3, more details surrounding the design of the base member and the compartment 14 formed therein are described. For example, in FIG. 4A, the orientation of the bottom wall 22 in relation to the center of the base member 12 is illustrated. As can be seen, due to the side wall portions 24, 26 and 28 extending downward and inward toward the bottom wall 22 at an oblique angle, a center 99 of the rectangularly shaped bottom wall 22 is positioned closer to the front of the package, and more particularly closer to the front edge 35 of the transverse upper ridge portion 37 extending about the perimeter of the upper end of the package 10. In the illustrated form, the rear edge 96 of the bottom wall 22 is located on the front side of the center 98 of the profile of the base member 12.

The preferred base member 12 of FIGS. 4A-8 is specifically adapted to maintain the ruffling of thin meat slices by the configuration of the compartment 14. Generally, the size or volume of the compartment 14 is carefully tailored to that of the size or volume of meat slices to be contained therein so that shifting of the packaged, fluffed or ruffled meat slices is minimized during movements of the package. To this end, the side wall portions 24, 26, 28, 34 of the compartment 14 are configured to engage and bias the meat in a predetermined manner for keeping the bends or ruffles in the deli-meat slices despite package handling and the like.

The side wall portions 24, 26, 28 of the compartment 14 are upstanding from the bottom wall 22 and extend between the bottom and top of the package 10 in an other than vertical orientation. At least one, and preferably several of the side wall portions are provided with an inward taper toward each other as they progress toward the bottom wall 22 of the compartment 14. Accordingly, only some of the meat slices are funneled downwardly to take up the smaller space or volume present toward the bottom of the compartment 14 with the majority of the volume of meat slices kept held or propped up toward the upper end of the compartment 14 which presents the meat slices with progressively greater volume in which to fit. Thus, only the relatively few meat slices at the container bottom will be subject to significant compression forces due to gravity from above that can eliminate the fluffing therein, while the great majority of the slices supported on these bottom slices will retain their fluffy look.

Figure 4A:
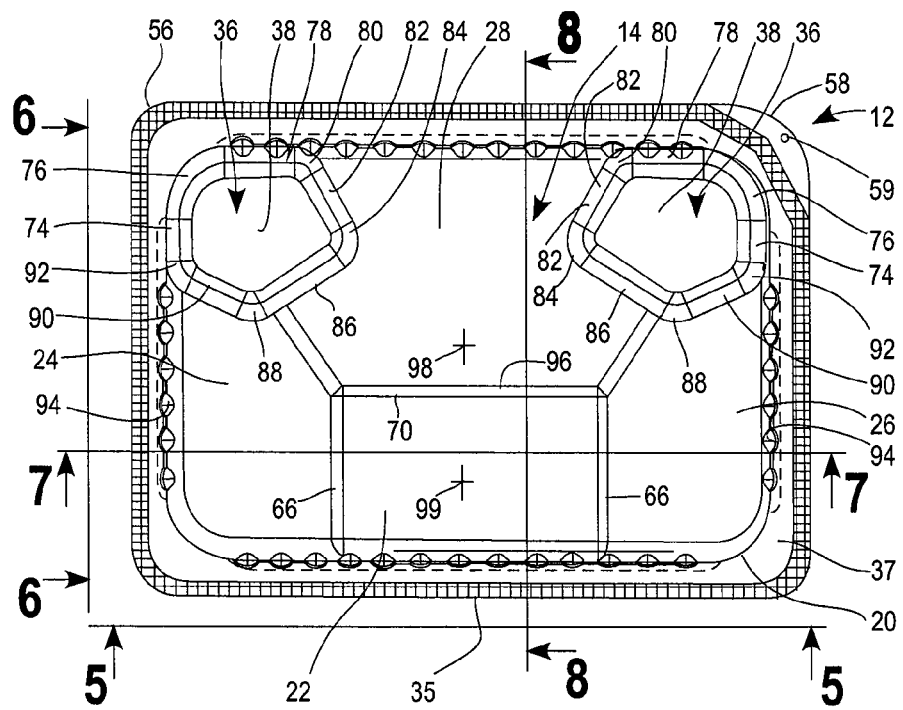
FIG. 4A is a plan view of the base member of FIG. 3 illustrating a bottom wall from which the angled side wall portions extend upwardly and the foot portions at adjacent corners of the base member spaced apart from the front side wall portion.

The taper of the compartment side walls 24, 26, 28 is at a relatively large angle to the vertical such that the bottom wall 22 is of small size relative to the upper compartment opening, which is best illustrated in FIG. 4A. Accordingly, the space in the compartment 14 widens or increases fairly quickly from the bottom up (see the perspective view of FIG. 3). Because of this taper of the side wall portions 24, 26, 28, there will only be a relatively small amount of meat funneled to the bottom of the compartment 14 in the confined space thereat. As such, most of the meat in the compartment 14 will be provided with enough space so that the slices are not compressed. In particular, since the preferred package herein is constructed to provide a viewing window through the cover or lid to the contents of the compartment 14, it is the meat slices at or adjacent to the top of the compartment 14 in which the fluffy look thereof is most important. Thus, this tapered compartment 14 as described above enables meat slices to retain their fluffed look at locations in the compartment 14 that are most important from a point-of-sale perspective.

At the same time, this progressively increasing space of the compartment 14 is sized to closely match that of the volume of meat to be received therein so that the meat will be held between the side wall portions 24; 26, 28, 34 and the lid 18 against shifting which can cause the meat slices to lose their fluffiness. As mentioned, the tapered side wall portions 24, 26, 28 provide the meat slices with a slight upward bias toward the lid 18 so that they are lightly held therebetween. This retains the fluffed slices substantially stationary in the compartment 14 so that they do not move and push against each other such as when the package is being handled. In the preferred form, three compartment side wall portions 24, 26, 28 are tapered as illustrated (e.g., include ramp sections as described below) and the front side wall portion 34 extends substantially vertically between the bottom wall 22 and the upper opening at the forward side of the compartment.

Figure 15:
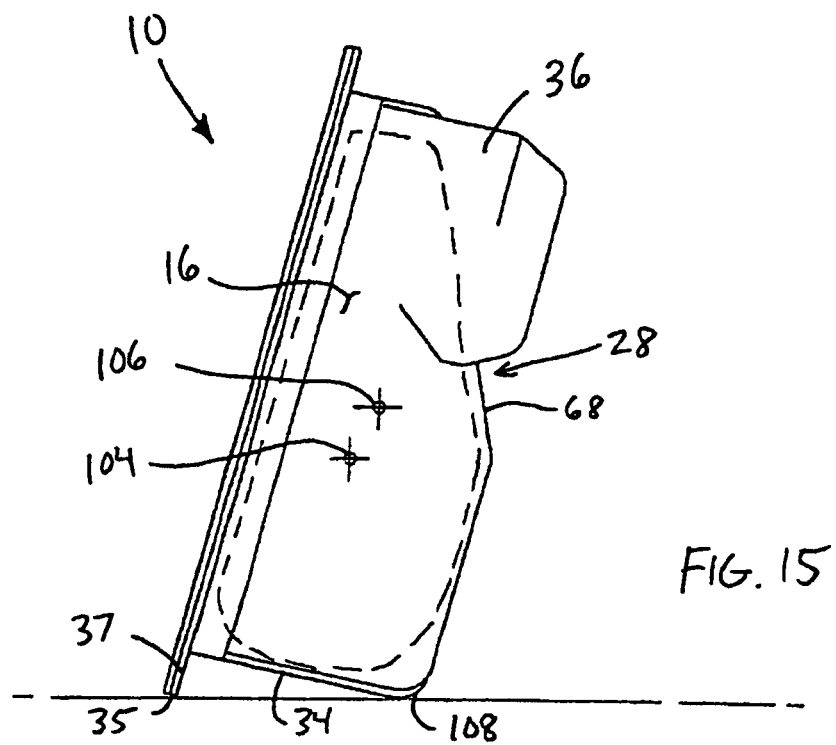
FIG. 15 is a schematic view of the food package including the rigid lid and containing the food product, illustrating the functionality of the ramp section of the rear side wall portion in lowering the center of gravity of the food package and the food product when the food package is in the vertical or display orientation of FIG. 1B.

As described above, the package is adapted to be self-standing in a generally vertical, display orientation with the bottom wall 22 of the meat compartment extending upwardly from a surface 108 on which the package is supported (see FIG. 15). As previously mentioned, the preferred package has the front side wall portion 34 of the compartment configured to extend substantially normal to the compartment bottom wall. The front side wall portion 34 extends for a predetermined distance so as to space the juncture between it and the bottom wall 22, and the front portion or front edge 35 of a transverse upper ridge portion 37 of the base member by a distance sufficient to allow them to cooperate to keep the package in its display orientation. Additionally, the predetermined distance is designed relative to the volume of the food product to be contained within the compartment. Herein, the display orientation is typically referred to as being vertical although it will be understood that this can include a slight rearward incline of the self-standing package herein. This vertical display orientation provides the benefit that the package may be displayed on the retailer's shelf such that consumers can easily view the product through the viewing windows of the cover or lid. Advantageously, special merchandisers are not required for display since the packages may simply be turned in a vertical orientation and placed on a shelf for display.

As illustrated in FIG. 4A, the compartment 14 is positioned toward the front of the base member 12 so that when the package 10 is pivoted up approximately ninety degrees from the horizontal orientation thereof to the vertical orientation, the center of gravity of the package loaded with relatively heavy, fluffed sliced meat, e.g. deli ham or turkey slices, is shifted downwardly to provide the package with stability in it self-standing, display orientation. To this end, the geometric center 99 of the rectangular bottom wall 22 is displaced toward the front of the base member 12 relative to the center 98 of the rectangular upper end of the package 10. With the preferred small size of the bottom wall 22 for meat fluffing purposes, the rear edge 96 of the compartment bottom wall 22 can be displaced forwardly of the package center 98, as well.

Figure 5:
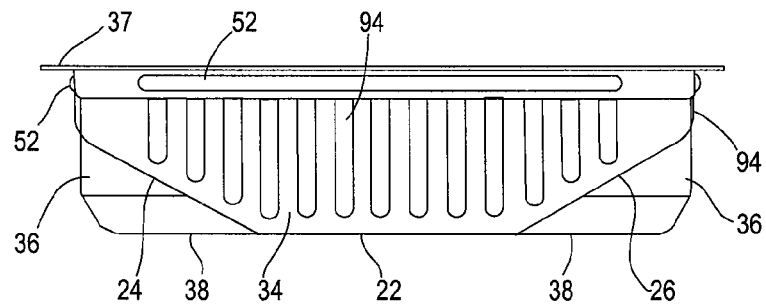
FIG. 5 is an elevational view taken along line 5-5 of FIG. 4A showing the alignment of the bottom wall with the bottoms of the foot portions for supporting the package in its horizontal orientation.

FIGS. 5 and 7 better illustrate the configuration of the inwardly tapering side wall portions 24 and 26 upstanding from the bottom wall 22. As best seen in the cross sectional view of FIG. 7, the upper section 60 of the side wall portion 24 extends generally vertically downward from the opening of the ridge 37 of the base member 12. The upper section 60 then transitions to a ramp section 62 which extends generally downward and inward at an oblique angle (e.g., angle $\theta_1$ relative to a vertical axis) toward the bottom wall 22. A bottom section 66 transitions the ramp section 62 to the bottom wall 22. Likewise, the upper section 60 of the side wall portion 26 extends generally vertically downward from the opening of the ridge 37 of the base member 12. The upper section 60 then transitions to a ramp section 64 which also extends generally downward and inward at an oblique angle (e.g., angle $\theta_1$) toward the bottom wall 22.

Again, the angled ramp sections 62 and 64 of the side wall portions 24 and 26 function act to push the meat slices inward from the sides toward the vertical center line of the compartment 14. Furthermore, the ramp sections 62 and 64 act to push or bias the meat slices upwardly in the compartment 14 as the volume of the compartment progressively enlarges toward the upper end of the compartment 14. This positions the food product closer to the lid and increases the viewability of the food product through the windows 30 of the lid 18. Additionally, these ramp sections 62 and 64 function to better contain the food product within the compartment in order to minimize movement of the product, thus, advantageously, better preserving the fluffed look of sliced food products. For example, the ramp sections 62 and 64 reduce the side-to-side movement of the food product within the compartment 14.

The vertically dropping upper sections 60 function to provide structural stability to the base member 12, which is important to minimize package abuse during distribution. The upper sections 60 also provide a volume within which the lid 18 will nest into. Additionally, as is described below, each upper section 60 includes a recess 52, which is part of a re-closing mechanism that is adapted to snap fit together with corresponding lugs 50 of the lid 18. As also illustrated in FIG. 7, the upper sections 60 include a horizontal ledge 100 such that the of the upper section 60 extends downward then inward the length of the horizontal ledge 100, then continues to extend downward until it further transitions to the appropriate ramp section 62, 64. The horizontal ledge 100 defines vertical support channels 94 for structural support and assisting in the gas flushing of the compartment as described below.

Figure 6:
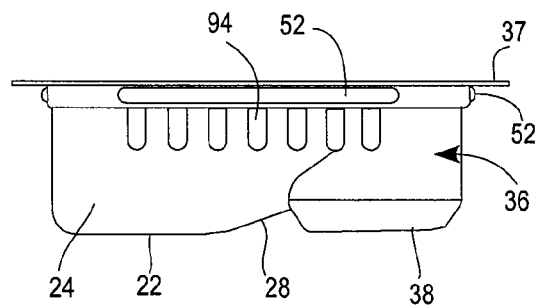
FIG. 6 is an end elevational view taken along line 6-6 of FIG. 4A illustrating the configuration of the angled rear side wall portion.
Figure 4B:
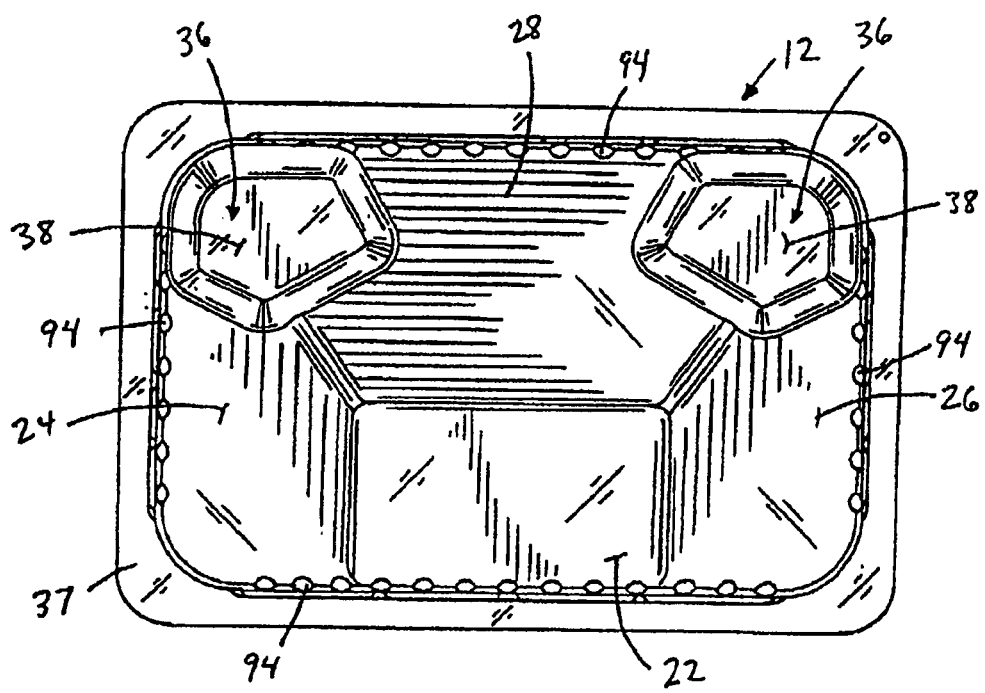
FIG. 4B is a bottom view of the base member of FIG. 4A illustrating a tripod support formed by the bottom wall and the foot portions.

FIGS. 6 and 8 better illustrate the configuration of the inwardly tapering rear side wall portion 28 and the front side wall portion 34 upstanding from the bottom wall 22. As best seen in the cross sectional view of FIG. 8, the upper section 60 of the rear side wall portion 28 extends generally vertically downward from the opening of the ridge 37 of the base member 12. The upper section 60 also includes a horizontal ledge 100 as described below and then transitions to a ramp section 68 which extends generally downward and inward at an oblique angle (e.g., angle $\theta_2$ relative to a vertical axis) toward the bottom wall 22. A bottom section 70 transitions the ramp section 68 to the bottom wall 22. Also, the front side wall portion 34 extends generally downward. It is noted that in alternative embodiments, the front side wall portion 34 may also extend inward at a slight angle, although not at as great and angle as the ramp sections 62, 64 and 68. Alternatively, the ramp section 62, 64 and 68 may extend the entire length of the respective side wall portion, or may not extend completely to the bottom wall 22, e.g., another vertical wall section transitions the respective ramp section to the bottom wall 22.

The ramp section 68 generally cooperates with the normal front side wall portion 34 to push the meat slices forwardly toward alignment with the center 99 of the bottom wall 22. Additionally, as illustrated in FIG. 15, this positioning of the compartment as well as the tapered configuration of the ramp section 68 of the rear side wall portion 28 shifts the weight of the meat forwardly in the compartment 14 so that the center-of-gravity of the package is lower when the package 10 is rotated to stand-up on edge in the display orientation of FIG. 1B. Thus, a more stable package 10 is provided that is less susceptible to toppling over.

The ramp section 68 of the rear side wall portion 28 acts to push or bias the meat slices upwardly in the compartment 14 as the volume of the compartment 14 progressively enlarges toward the upper end thereof, as has been mentioned. Again, when pivoted for display, this lifting action on the meat slices will cause the weight of the meat to be shifted forwardly in the vertically oriented package (see FIG. 15).

The ramp section 68 further functions to hold the food product contained within the compartment 14 upward toward the lid 18 and inward toward alignment with the center 99 of the bottom wall 22 (i.e., in a direction toward the front side wall portion 34) in order to better display the food product through the windows 30 of the lid 18. Additionally, the ramp section 68 also functions to better contain the food product within the compartment in order to minimize movement of the product during distribution and storage; thus, advantageously, better preserving the fluffed look of sliced food products. For example, the ramp section 68 reduces front-to-back movement of the food product within the compartment 14. The vertically dropping upper section 60 functions to provide structural stability to the base member 12 which is helpful to minimize package abuse during distribution, as well as provide a volume within which the lid 18 will nest into.

In preferred embodiments, the decline angle of ramp section 68 is greater than the decline angle of ramp sections 62 and 64 relative to the vertical axis, e.g., $\theta_2 > \theta_1$. In preferred embodiments, $\theta_1$ is an angle between about 55-75 degrees, most preferably about 62.5 degrees, while $\theta_2$ is an angle between about 65-75 degrees, most preferably about 69 degrees. The exact angles selected and dimensions of the various side walls will vary depending on the implementation and the food product to be contained therein. The exact angles selected and dimensions of the various side walls will vary depending on the implementation and the food product to be contained therein.

The taper of the ramp section 68 and the lack of such a taper on the front side wall portion 34 are such that the center of the bottom wall 99 is shifted forwardly in the package, as previously discussed. The rear side wall portion 28 can be tapered such that not only is the bottom wall 22 off-center, but so that its rear edge 96 is also disposed forwardly of the base center 98 (see FIG. 4A). In one form, the rear side wall portion 28 can be more gradually tapered than the tapered opposite side wall portions 24, 26, and it can be provided with a longer length in its tapering direction so as to position and shift the bottom wall 22 forwardly in the package.

Together, the side wall portions 24, 26, 28 and the front side wall portion 34 form a tapered compartment within which the food product is contained such that the side-to-side and front-to-back movement of the food product within the compartment is minimized. Additionally, the side wall portions 24, 26, 28 and the front side wall portion 34 provide a clean, angled aesthetic look to the food package 10. Overall, the ramp sections 62, 64, 68 of the side wall portions 24, 26, 28 reduce the volume of the compartment 14 that will contain the food product in comparison to a compartment forming a rectangular volume therein such that the same amount of food product will be better displayed when viewed through the window(s) 30 of the lid 18.

The package, and specifically the base member 12 thereof is also adapted to shift the center-of-gravity of its contents as described above for being oriented vertically for display purposes, while maintaining the stability of the packages in their horizontal orientation. More particularly, the base member 12 has wells or foot portions 36 formed at either rear corner that serve as feet for the base when horizontally disposed, e.g., stored in a distribution truck, retailer storage shelf or a consumer refrigerator. The space in each foot portion 36 is significantly less than that in the main compartment 14 in which the meat slices are received. As such, the size of the foot portions 36 should be reduced relative to the size of the compartment 14. Thus, any meat that may be located in the foot portions 36 is also kept to a minimum.

When the package is pivoted to its display orientation, the foot portions 36 will be toward the top of the package. Because the weight of the material used for the walls of the foot portions 36 is small relative to the weight of the food product, the foot portions 36 do not cause the package to be top heavy in the vertical position which otherwise can cause undesired instability and tipping problems. At the same time, the foot portions 36 are formed to approximately the same depth as the main compartment 14 so that their bottom walls 38 are aligned (preferably coplanar with) with that of the main compartment 14 to provide stable support for the base member 12 in its horizontal orientation.

The taper of the side wall portions 24, 26 of the main compartment 14 spaces the opposite side or end edges of the rectangular compartment bottom wall 22 inwardly from the corresponding side or ends of the base member 12 at the upper periphery thereof. Further, the tapered ramp section 68 of the rear side wall portion 28 spaces the compartment bottom wall 22 forwardly in the base member 12. Accordingly, as best viewed in FIG. 4B, the bottom wall 22 of the food compartment 14 is disposed intermediate the bottom walls 38 of the rear corner foot portions 36 and forwardly therefrom so that the three bottom walls 22, 38 are arranged in a triangular orientation relative to each other. This triangular spacing or arrangement of the bottom walls 22, 38 provides a secure tripod support for the base 12 in its horizontal position. Additionally, as illustrated in FIG. 16, the rear foot portions 36 are shaped to nest within the lid 18 of adjacent packages in a horizontal stack for reducing side-to-side movement of packages within a stack, while the front wall portion 34 nests into the lid 18 of adjacent packages in the horizontal stack together with the rear wells or foot portions 36 for reducing front-to-back movement of the packages within the stack.

Preferably, each foot portion 36 is formed as a small well in the rear corners of the base member 12 and formed generally at the junction of the rear side wall portion 28 and a respective adjacent side wall portion 24, 26. The foot portions 36 are designed having dimensions such that the food product does not generally sit within the well formed by the foot portion 36. If a substantial portion of the food product were to rest within the foot portion 36, the center of gravity of the food package 10 when standing up on-end (e.g., standing in the display orientation of FIG. 1B on edge 35 and the front side wall portion 34), the center of gravity of the food package 10 would be slightly higher than if the food product did not fit within the foot portions 36. Thus, by sizing the foot portions 36 relative to the food product such that a substantial portion of the food product does not fit within the volume formed by the foot portion 36, the stability of the package 10 in the display orientation is improved. As stated above, the purpose of the foot portions 36 is to aid in the stability of the food package 10 in the horizontal orientation of FIG. 1A without affecting the functionality of the tapered side wall portions 24, 26, 28. Additionally, the sizing of the foot portions 36 is designed to be small enough to limit the amount of food product that may fit within the foot portion, yet large enough to be easily and cost effectively produced, for example, using known thermoforming techniques. For example, the smaller the foot portion, the more material required to form a foot portion having a specified thickness. Thus, in preferred embodiments, processing considerations also affect the overall size of the foot portions 36.

As illustrated best in FIG. 4A, the foot portions 36 generally have several wall sections 74, 76, 78, 80, 82, 84, 86, 88, 90 and 92 that extend downwardly towards an irregularly shaped pentagonal base 38. Wall sections 74, 76 and 78 generally follow the dimensions of the opening 20 of the compartment. In other words, wall sections 74, 76 and 78 generally follow the outer edges of the rear side wall portion 28 and the respective side wall portion 24, 26, i.e., wall sections 74 are parallel to the upper section 60 of respective ones of side wall portions 24 and 26, while wall sections 78 are parallel to the upper section 60 of the rear side wall portion 28. Each of the wall sections 74, 76, 78, 80, 82, 84, 86, 88, 90 and 92 extend generally vertically downward toward the base 38 and then extend vertically and taper slightly in one or more sections at an oblique angle to the base 38.

It should be noted that many variations may be made to foot portions 36 consistent with the present invention. For example, the exact geometric shape of the foot portions 36 may be varied to suit the particular package and food product. Thus, the foot portions 36 may have a different number of wall sections that may be curved or straight and may have a differently shaped base 38. It should be noted that although in preferred embodiments, a respective foot portion 36 is formed in each of the rear corners of the base member 12, in other embodiments, a single foot portion positioned centrally along the rear side wall portion may be employed or another arrangement of multiple foot portions 36. Generally, whatever the specific configuration of the foot portion 36, the foot portion(s) 36 should be configured to provide support for one or more food packages in a horizontal orientation while not substantially reducing the functionality of the ramp section 68 of the rear side wall portion 28.

In other embodiments, the base 38 of the foot portion 36 may be continuous with the bottom wall 22, such that the bottom wall 22 extends towards the respective corners and is contiguous with the base 38; however, foot portions 36 separate from the bottom wall 22 are preferable since such alternative arrangement will shift the center of gravity of the food package 10 slightly upward when the food package is in the stand-up display orientation of FIG. 1B.

Turning to more of the details, another feature illustrated in FIGS. 1A-6 is that vertical channels 94 are formed in the upper sections 60 of the side wall portions 24, 26, 28, the front side wall portion 34, as well as within sections of the foot portions 36 (e.g., foot walls 74 and 78). These vertical extending channels 94 extend generally outward from the compartment 14 and run vertically along the respective wall sections.

They functional provide additional structural stability to the food package such that the food package will be better able to withstand top-to-bottom compression forces. This again serves to minimize package abuse during distribution. Minimizing package abuse is important to preserving the fluffed look of the sliced food product, since disturbance of the package dimensions through externally applied forces to the package surface will disturb the fluffed food product contained within and ultimately reduce the fluffed appearance of the product.

Additionally, since the food package 10 is preferably a gas-flushed package, the channels 94 function to assist evacuating air trapped along the sides and underneath the food product 16. That is, the channels 94 provide a space for air to flow, during the vacuum packing process, excess air underneath and to the side of the food product can more easily be evacuated from the package 10. Additionally, the channels 94 also provide a certain aesthetic look to the overall package design.

Figure 13:
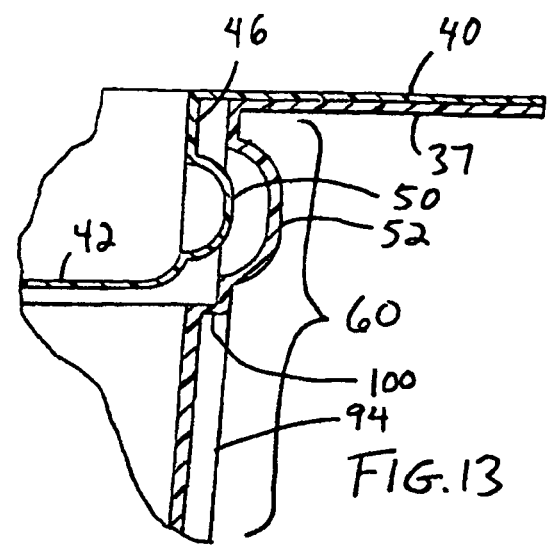
FIG. 13 is a cross sectional view of the re-closing mechanism formed in the lid walls of the lid and the upper sections of the various side wall portions of the base member according to one embodiment.

Furthermore, as illustrated in FIGS. 7, 8 and 13, the upper sections include horizontal ledges 100. The channels 94 begin at the horizontal ledges 100 such that the outer edge of the horizontal ledge defines the outer periphery of the channels 94 extending downward while the inner edge of the horizontal ledge defines the inner periphery of the channels 94 extending downward.

Referring next to FIGS. 9-12, further details of the lid of FIG. 2 will be described. As illustrated in FIGS. 9-12, the lid 18 appears without the label 32 affixed thereto. The lid 18 includes a lip or ridge portion 40 generally matching the geometry of the ridge portion 37 of the base member 12 and defining a periphery of the food package 10. The lid 18 further includes lid walls 46 that extend vertically downward a distance and terminate at a flat lid cover wall 42 so that walls 42, 46, 48 cooperate to form a plug portion of the lid 18. These lid walls 46 transition to each other at curved corner walls 48. The lid walls 46 are adapted to fit within a vertical drop section of the base member 12 formed by the upper sections 60 of the side wall portions 24, 26, 28 and the upper section of the front side wall portion 34. Thus, the ridge portion 40 of the lid 18 extends transverse to the vertical lid walls 46, 48 from the upper ends thereof for resting on the ridge portion 37 of the base member 12 with the lid cover wall 42 extending into the opening by approximately the distance of the lid walls 46. As further illustrated the ridge portion 40 is preferably in a separate parallel plane than the lid cover wall 42. The contacting ridge portions 37 and 40 prevent the lid cover wall 42 from extending any further into the volume of the compartment 14. As such, the outward facing surfaces of the lid walls 46 fit within the dimensions of the inward facing surfaces of the upper sections 60 of the side wall portions 24, 26, 28 and the upper section of the front side wall portion 34. Thus, the lid 18 is adapted to nest into position within the opening of the compartment 14.

Also provided are lugs 50 formed within the lid walls 46 that extend outward from the lid walls 46. These lugs 50 are adapted to fit within corresponding recesses 52 formed within the upper sections 60 of the side wall portions 24, 26, 28 and the upper section of the front side wall portion 34. The recesses 52 are channels that generally correspond to the geometry of the lugs 50 such that when the lid 18 is inserted into the opening 20 of the compartment, respective lugs 50 snap into the respective recesses 52 to re-close the package. In preferred embodiments, this re-closing mechanism provides an audible snap indicating that the package is closed. This alerts the consumer that the package is re-closed after the package has been unsealed; however, this closure mechanism does not hermetically re-seal the food product within the compartment. The lugs 50 and recesses 52 also provide some resistance to the unintended opening of the food package after it has been unsealed. For example, in preferred embodiments, the snap fit of the lugs 50 and recesses 52 are designed such that the food package 10 may be turned upside down and the lid 18 will not pop off due to the weight of the food product on the lid 18. As such, the consumer needs to apply a small amount of force to re-open the closed food package.

Referring briefly to FIG. 13, a cross sectional view of the re-closing mechanism according to one embodiment is illustrated. As illustrated, the lug 50 is adapted to snap into the recess 52 when the ridge portions 37 and 40 are flush. Since the outer dimension of the lug 50 extends slightly beyond the inner dimension of the upper section 60 of the side wall portion, both the upper section 60 and the lug 50/lid wall 46 give slightly with downward pressure on the lid 18 to snap the lug 50 into the recess 52. Notice that the horizontal ledge 100 of the upper section 60 and channel 94 are visible in FIG. 13 illustrating that the upper section 60 extends downward then inward the length of the horizontal ledge 100, then continues to extend downward until it further transitions to the appropriate ramp section (or alternatively extends vertically to the bottom wall for the front side wall portion 34).

Referring back to FIGS. 9-12, the lid 18 also includes a first sealing surface 54 on the bottom side of the ridge portion 40. Note that the first sealing surface 54 is illustrated through the generally transparent ridge portion 40 of the lid 18 in FIG. 10. This first sealing surface 54 extends about the periphery of the ridge portion 40 and is adapted to mate with a corresponding second sealing surface 56 formed on the top surface of the ridge portion 37 of the base member 12. The second sealing surface 56 of the base member 12 also extends about a periphery of the ridge portion 37 of the base member 12. In order to seal the lid 18 to base member 12, a heat sealant is applied to the first and second sealing surfaces 54 and 56, and once the lid is positioned within the opening 20 of the compartment 14, the sealant is heat activated; thus, forming a hermetic seal between the lid 18 and the base member 12 at the first and second sealing surfaces 54 and 56.

In order to unseal the package 10, tab portions 58 formed at a corner of the ridge portion 40 of the lid 18 and at a corner of the ridge portion 37 of the base member 12 are pulled apart. Corresponding bumps 59 are provided in the tab portion 58 of both the lid 18 and the base member 12. These bumps 59 are configured to maintain a separation distance between the tab portions 58 of the lid 18 and the base member 12 so that it is easier for the consumer to pull the tab portions 58 apart. It is noted that the alignment of the bumps 59 (also referred to as protrusions or indentations) of the lid 18 and the base member 12 is illustrated in FIG. 2. The tab portions 58 are positioned to overlap each other once the lid is sealed into the base member, with the bumps 59 aligned over the top of each other. At the tab corner, the first and second sealing surfaces 54 and 56 preferably extend to the edge of the corner; however, the heat sealant is not activated at the outer edge of the tab corner near the bumps 59, i.e., forming the tab portions 58. To unseal the package 10, the consumer simply pulls the tab portions 58 apart with sufficient force to separate the lid 18 and the base member 12. It is noted that the amount of force to unseal the package should be greater than the force to unseat the lugs 50 from within the recesses 50. Once unsealed, as described above, the lid 18 may be reclosed back into the opening of the base member 12, the lugs 50 and corresponding recesses 52 indicating that the package has been closed (although not hermetically resealed).

In another feature, the lid cover wall 42 includes flat support channels 44 that extending downward a slight distance, e.g., less than the thickness of the lid 18. These support channels 44 serve to strengthen the lid 18 and prevent deformation of the lid during the unsealing. Since the lid 18 is designed to be reclosable by the consumer once unsealed, the lid should be able to retain its shape once subjected to the normal opening force when the consumer unseals the package. The support channels 44 help to reduce the likelihood that the lid 18 and lugs 50 will be deformed during opening such that it may be adequately reclosed by the consumer in use. In preferred embodiments, the support channels are arranged such that the length of the support channel 44 extends along the lid cover wall 42 in a direction to resist the curvature of the lid during opening, e.g., the support channels 44 extend along the longer dimension of the rectangular shape of the lid 18.

Figure 14A:
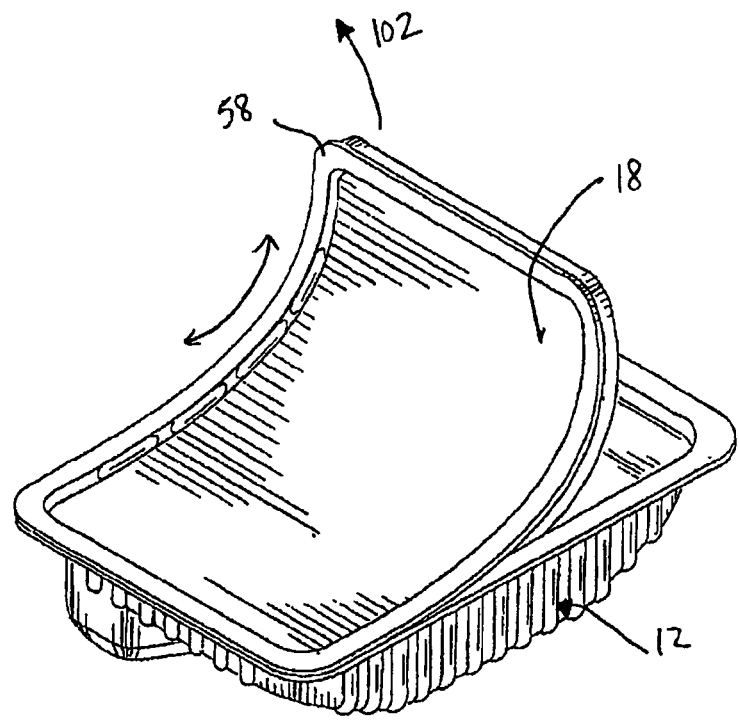
FIGS. 14A and 14B are schematic views of a food package described herein illustrating the deforming effect of the unsealing process on the lid with (FIG. 14B) and without (FIG. 14A) support channels formed in the lid.
Figure 14B:
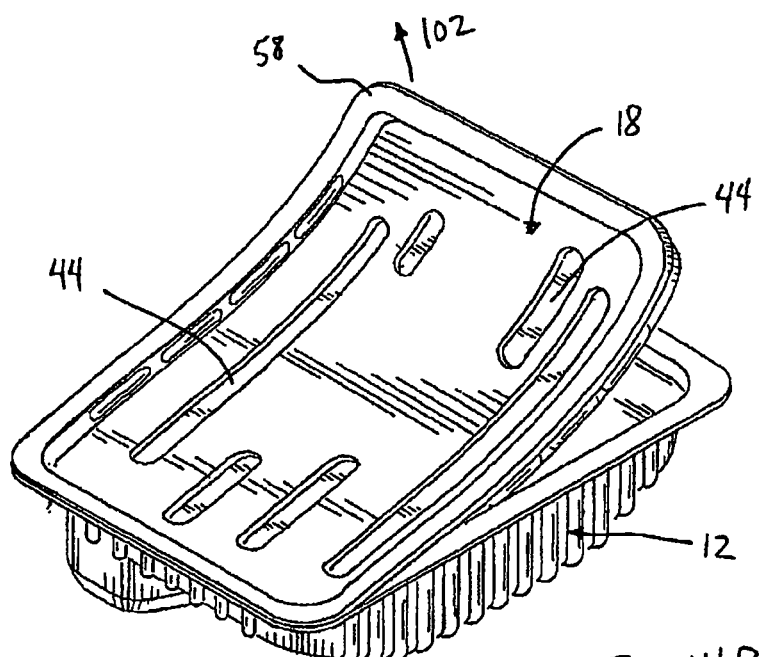

For example, in the illustration of FIG. 10 and the simplified illustrations of FIGS. 14A and 14B, a user will likely open the package by pulling the tab portions 58 apart and lifting the lid 18 relative to the base member 12, e.g., in the direction of arrow 102. As the lid unseals in a direction moving from the right side of the lid to the left side of the lid 18, without any such channels 44, the lid 18 itself may tend to bow in a curved manner (such as illustrated in FIG. 14A) and remain bowed after the unsealing is complete, thus, making it difficult to re-close properly. However, support channels 44 should help to provide structural stability in the lid to reduce this deforming effect, such as illustrated in FIG. 14B. Thus, in preferred embodiments, the channels 44 add to the structural stability of the lid and assist in maintaining the shape of the lid after unsealing. This increases the likelihood that the re-closing mechanism (e.g., lugs 50 and recesses 52) will work properly and for many openings and re-closings.

The support channels 44 are also arranged with the product label 32 in mind. For example, preferably the support channels 44 are positioned under the opaque portions of the label 32 and are not viewable through the window(s) 30 of the label 32 in position over the lid cover wall 42, such as illustrated in FIGS. 1A and 1B.

Referring next to FIG. 15, a simple side elevational view is shown illustrating the center of gravity 104 of the food package in the display orientation of FIG. 1B including a food product 16 having a rear side wall portion 28 as described herein in comparison to the center of gravity 106 if the ramp section 68 of the rear side wall portion 28 did not extend at an oblique angle towards the bottom wall 22. For example, if the rear side wall portion were similar to the front side wall portion 34, more of the product 16 would sit closer to the top of the package and slightly closer to the right (in FIG. 15); thus, the center of gravity 106 is higher and toward the bottom wall 22 of the package and the package is less stable, i.e., more susceptible to falling over.

The taper of the ramp section 68 of the rear side wall portion 28 generally cooperates with the normal front side wall portion 34 to push the meat slices forwardly toward alignment with the center of the bottom wall 22. As mentioned, this positioning of the compartment 14 as well as the tapered configuration of the compartment rear side wall shifts the weight of the meat forwardly in the compartment so that the center-of-gravity of the package is lower when the package is pivoted to stand on the ridge portion and the support surface 108 of its front side wall portion 34 for display.

Another effect that the tapered configuration of the side wall portions 24, 26, 28 provides is to push or bias the meat slices upwardly (in the horizontal orientation) in the compartment as the volume of the compartment progressively enlarges toward the upper end thereof, as has been mentioned. Again, when pivoted for display, this lifting action on the meat slices will cause the weight of the meat to be shifted forwardly (to the left in FIG. 15) in the vertically oriented package. Since in its generally vertical orientation, the package preferably is slightly tilted rearward to rest on the support surface 108, e.g., the corner junction of the front side wall portion 34 and the bottom wall 22, this forward weighting of the package further assists in stabilizing it for display. Thus, the forward position of the compartment and the taper of the compartment side wall portions cause the center-of-gravity 104 (in comparison to the center-of-gravity 106) of the vertically oriented package to be lowered and shifted toward the front of the package, so that the package is more resistant to tipping and falling over when pivoted to its display position. As such, the package 10 may be displayed in the display orientation on a retailer's shelf without the need for special merchandisers to hold the packages 10 in an upright position. It is further understood that other embodiments of the package may be configured to be held within merchandisers.

Referring next to FIG. 16, it is illustrated that the rear foot portions 36 and the front side wall portion 34 of each food package 10 are adapted to nest within the volume formed about the ridge portion 40 of the lid 18 of a food package 10 immediately underneath the food package in a stack 110 of packages 10. Thus, the base of the foot portion 36 rests on the corner portion of the lid cover wall 42 while the foot wall sections 74, 76 and 78 nest against the lid walls 46 and 48. Furthermore, the front side wall portion 34 nests against the front lid wall 46. As such, the tripod support of the bottom of the compartment (i.e., the two rear corner foot portions 36 and the bottom wall 22) nest within an adjacent lid 18 of the stack 110. This advantageously limits lateral movement, e.g., front-to-back movement and side-to-side movement, of the individual food packages 10 within the stack 110 and also provides for adequate support for the food packages of the stack 110 so that the stack does not tip over.

In manufacturing a food package as described herein, the lid 18 and the base member 12 are preferably thermoformed plastic. As is well known, one of ordinary skill in the art could use known thermoforming techniques to manufacture the lid and base member including all of the features as described herein. Additionally, in preferred embodiments, the lid and the base member are manufactured at the same time, then filled with the food product. The food package is then gas flushed and heat sealed as is known. One or more labels may then be affixed to the food package, such as illustrated in FIGS. 1A and 1B.

In preferred embodiments, the volume of the compartment 14 of the preferred package 10 is configured for approximately 9 ounces of client food product. Additionally, in the preferred form, the dimensions of the preferred base member 12 are as follows: the outer periphery is 199.5 mm by 134.5 mm; the opening 20 of the compartment 14 is 180.5 by 116.5 mm; the thickness of the channels 94 is 1 mm; the distance between the center of adjacent channels 94 is 11 mm; the distance covered by the channels 94 in each of the front side wall portion 34 and the rear side wall portion 28 is 132 mm; the width of the sealing surface 56 is 5 mm extending around the periphery of the ridge portion 37; the bottom wall 22 is 76.06 by 39.6 mm; the decline angle of ramp section 68 $\theta_2$ is 69.0 degrees; the decline angle of ramp sections 62, 64 $\theta_1$ is 62.5 degrees; the decline angle of the lower portion of foot walls 74, 76, 78, 80, 82, 84, 86, 88, 90, 92 is 30 degrees as they transition to the base 38; the height of the base member 12 is 44.45 mm; and the height from the bottom wall 22 to the top of the ledge 100 is 37.65 mm.

Additionally, in the preferred form, the dimensions of the preferred lid 18 are as follows: the outer periphery is 199.5 mm by 134.5 mm; the inner periphery defined by lid walls 46 (i.e., the outer periphery of the lid cover wall 42) is 177.7 by 115.5 mm; the height of the lid 18 (the distance from the top of the ridge portion 40 to the bottom of the lid cover wall 42) is 6.5 mm; the distance from the top of the ridge portion 40 to the center of a respective lug is 3.75 mm; the lugs 50 along the width of the lid 18 are 6 mm long; the lugs 50 along the length of the lid 18 are 24 mm long; the width of the sealing surface 54 is 5 mm extending around the periphery of the ridge portion 40; and the channels 44 are 10 mm wide and 1.5 mm thick; the lugs 50 are 1.3 mm deep.

It is noted that the above represents the dimensions of the package in its preferred form, although the exact angles selected and dimensions of the package 10 will vary depending on the implementation and the food product to be contained therein.

In an alternate embodiment of the food package 10, the base member 12 and the lid 18 are first formed as previously described above, such that the lid 18 covers the opening 20 of the compartment 14 of the base member 12 and is hermetically sealed to the base member 12. However, the lugs 150 and recesses 152 are not yet formed. Instead, aligned lugs 150 and recesses 152 are substantially simultaneously formed in the lid 18 and the base member 12 after the lid 18 has been positioned on the base member 12.

Forming the aligned lugs 150 and recesses 152 substantially simultaneously can result in increased separation forces as compared to separately-formed lugs and recesses, which can advantageously result in a lid 18 and base member 12 that require a greater separation force to reopen, thereby providing a more secure reclosable package. For example, separation force required to remove the lid 18 from the base member 12, may be greater than twice the weight of the food product contained in the compartment. More specifically, the separation force required to remove the lid 18 from the base member 12 can be increased by substantially simultaneously forming the lugs 150 and recesses 152 after positioning the lid 18 on the base member 12 resulting in lugs 150 and recesses 152 which can be deeper than conventional lugs and recesses and can be more closely sized to each other.

Conventionally formed lugs and recesses are limited as to their depth due to the methods used to form the lid and base member. The conventionally formed lugs and recesses are formed separately in the lid and the base member as its respective package components are being formed. The lid and base members are formed by drawing a sheet of package material into a mold cavity and conforming the shape of the sheet of package material to the interior of the mold cavity. The mold cavity includes a plurality of depressions for forming the lugs or recesses as the lid or base member is being formed. However, the depressions extend generally perpendicular to the direction of removal of the formed lid or base member from the mold cavity, and thus cause interference with the lid or base member as it is being removed from the mold cavity. As a result, the depths of the lugs and recesses are limited to an amount that reduces the interference during removal to acceptable levels. The shallower the depth of the lugs or recesses, the less interference between the lugs or recesses and their forming depressions in the mold cavity during removal of the lid or base member from the respective mold cavity.

Each of the aligned lugs 150 and recesses 152 have a separation force, which is the force required to remove the lug 150 from the aligned recess 152 when the lid 18 is separated from the base member 12. The plurality of aligned lugs 150 and 152 have a combined separation force, which is the total force required to separate all of the lugs 150 from their aligned recesses 152 when the lid 18 is removed from the base member 12. The combined separation force is dependent in part upon the number of aligned lugs and recesses 150 and 152, the position of the aligned lugs and recesses 150 and 152, the depths and lengths of the aligned lugs and recesses 150 and 152 and the thickness and type of the package material, and the forming tools and conditions for forming the aligned lugs and recesses 150 and 152.

Figure 17:
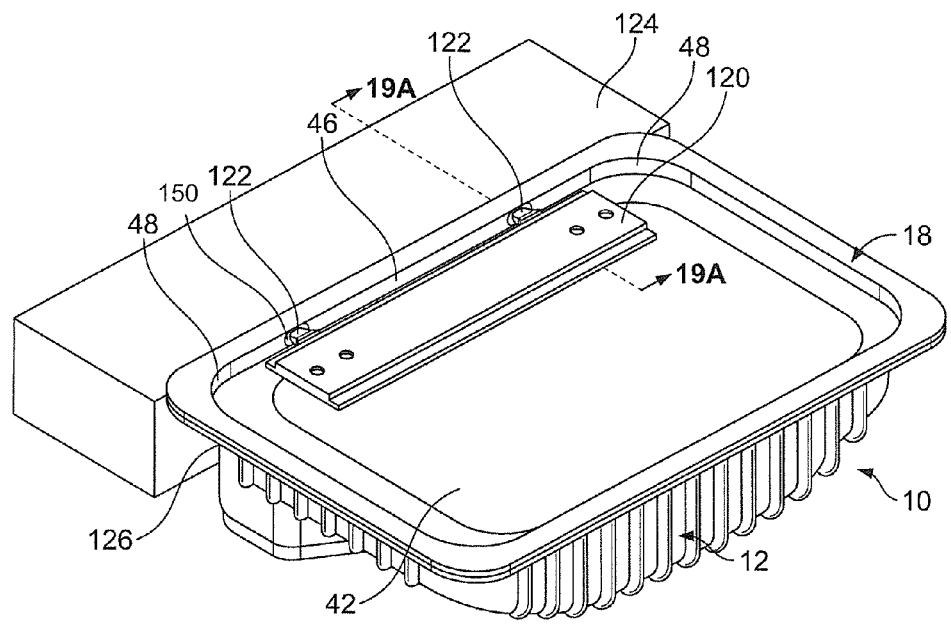
FIG. 17 is a perspective view of a food package described herein including an anvil and a rail used to substantially simultaneously form lugs and recesses in the package.
Figure 18:
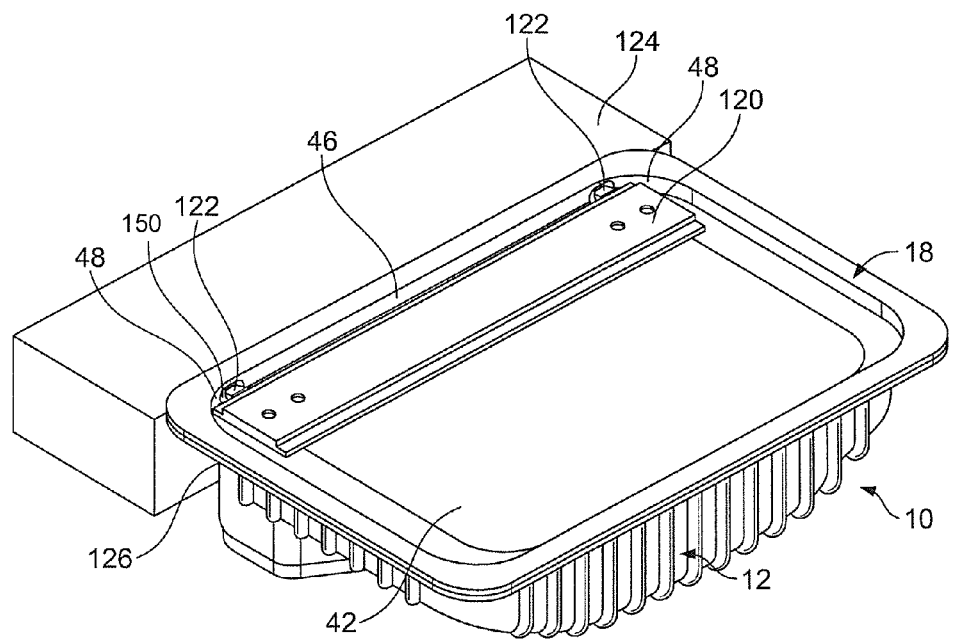
FIG. 18 is a perspective view of a food package described herein showing an alternative anvil and a rail used to substantially simultaneously form lugs and recesses in the package.

The package 10 may contain lugs 150 and recesses 152 on at least two of the four sides of the package 10. Preferably, but not necessarily, the lugs 150 and recesses 152 may be formed on only a pair of opposing sides, as shown in FIGS. 17 and 18. Furthermore, the tighter fit between the lugs 150 and recesses 152 results in fewer total lugs 150 and recesses 152 being needed. For example, at least one lug/recess combination per longitudinal side, and preferably at least two, may suffice. The shapes of the lugs 150 and recesses 152 may compliment each other and may further resemble the shape of the forming tool used, which forms the lugs 150 and recesses 152 together at the same time, as will be discussed in further detail below.

The lugs 150 and recesses 152 may be placed anywhere along the longitudinal side of the package, but preferably are placed at evenly spaced distances if more than one lug 150 and recess 152 is formed on each side. A lug 150 and recess 152 combination may also be positioned at least partially in the corner radius of the package 10. The lug 150 may extend partially into the corner radius by up to about 10 mm into the curved portion at the curved corner lid wall 48. By placing the lugs 150 and recesses 152 at least partially in the corners of the package 10, a greater separation force can be obtained, such as due to increased rigidity in the corners due to the presence of the lugs 150 and recesses 152.

As mentioned above, the depth of the aligned lugs 150 and recesses 152 when formed substantially simultaneously can be deeper than in conventional forming described in detail above. For instance, the lugs 150 may have a depth ranging between about 1.0 mm and about 3.0 mm and the recesses 152 may have a depth ranging between about 1.2 mm and about 3.2 mm when the average package material thickness is between about 0.4 mm and about 1.0 mm. Any package material may be used that is suitable for forming the package 10, and preferably polyester, polypropylene, high-impact polystyrene and Barex® may be used, and in particular, polyester may be used. Typically, the deeper the lugs 150 and recesses 152, the greater the separation force to separate those particular lugs, which can result in a package 10 which is more resistant to inadvertently being opened and provides a positive snapping when being reclosed to indicate a secure engagement between the lid 18 and the base member 12.

The package material thickness in those areas may be less than the rest of the package 10 following formation of the lugs and recesses 150 and 152. For example, the thickness of the package 10 inside the areas where the lugs 150 have been formed may vary from about 0.05 mm to about 0.18 mm and the thickness of the package 10 inside the area where the recesses 152 have been formed may be from about 0.13 mm to about 0.40 mm. Additionally, as the thickness of the package material within the lugs 150 and recesses 152 goes down, the force to reopen the package 10 will typically go up because the thinner the package material is the deeper the lugs 150 and recesses 152, which can increase the combined separation force.

Another variation of the package feature may also include the length of the lugs 150 and recesses 152. The length of both may vary from about 10 mm to about 40 mm, and may preferably be about 20 mm long.

Turning now to details of the formation of the aligned lugs and recesses 150 and 152, as can be seen in FIG. 17, the aligned lugs 150 and corresponding recesses 152 are formed substantially simultaneously using an anvil tool 122 and a rail or receiving member 124 having a plurality of depressions in the form of a continuous channel 132. The anvil 122 urges the portions of the lid 18 and base member 12 where the aligned lug 150 and recess 152 are to be formed into the channel 132 of the adjacent rail 124 to substantially simultaneously form the aligned lug 150 and recess 152. A preferred result of substantially simultaneously forming the aligned lugs 150 and recesses 152 is that they have a tighter, more complimentary fit between them. The closer fit between the lugs 150 and corresponding recesses 152 can result in a greater force to reopen the package 10 than if the lugs 150 and recesses 152 were formed individually from one another, thus providing better closure and reclosure of the package 10. The lugs 150 and recesses 152 may be positioned at least partially within the radius of the corners, as illustrated in FIG. 18.

Figure 23:
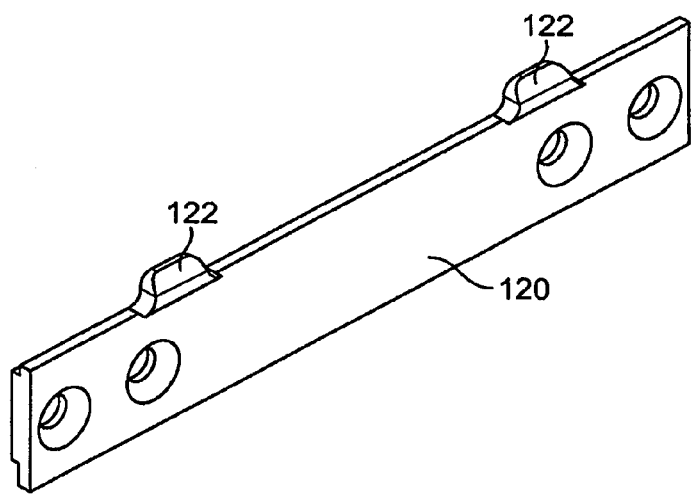
FIG. 23 is a perspective view of the anvil of FIG. 17.

An anvil support 120 may have one or more anvils 122 disposed thereon to form the aligned lugs 150 and corresponding recesses 152 in the already formed package 10, and preferably at least two anvils 122. One embodiment of the anvil support 120 is shown in FIG. 23, where the anvil support 120 is shown to contain two anvils 122 which would form two aligned lugs and recesses 150 and 152 per side. A separate anvil support 120 can be used to create the aligned lugs 150 and recesses 152 on each side of the package.

Figure 19A:
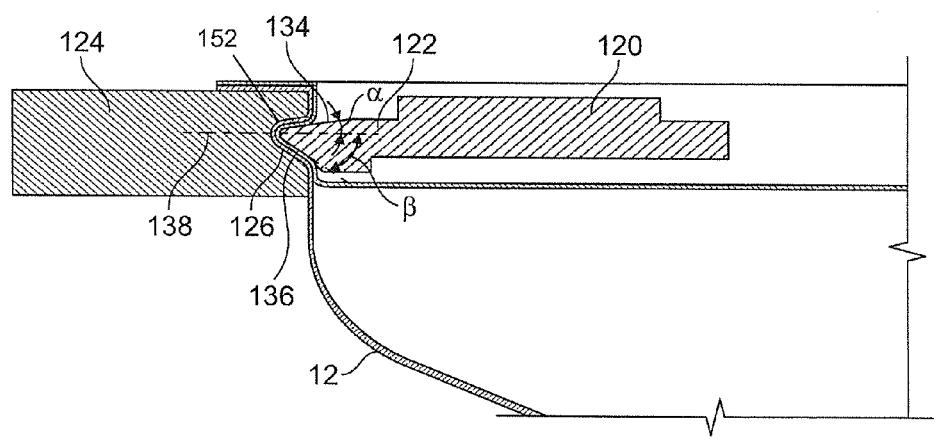
FIG. 19A is a cross-sectional view of the food package of FIG. 17 taken along line 19A-19A thereof showing the formation of the lugs and recesses by the anvil and channel of the rail.
Figure 19B:
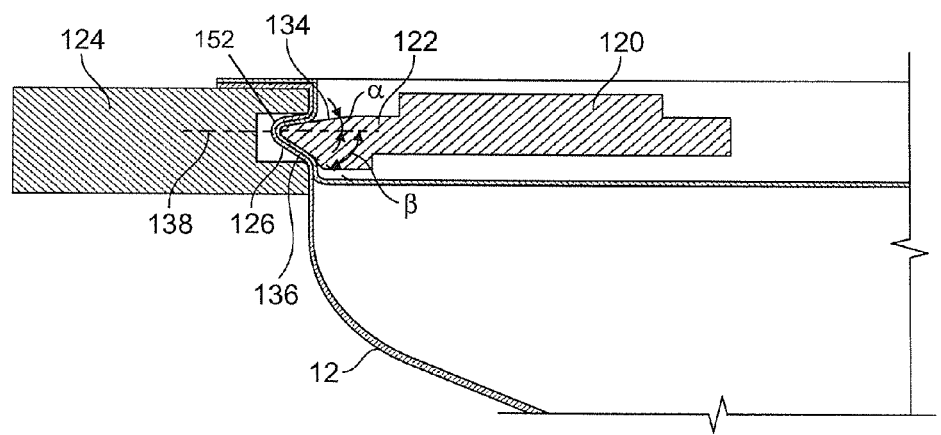
FIG. 19B is a cross-sectional view similar to FIG. 19A but showing an alternative channel.
Figure 20A:
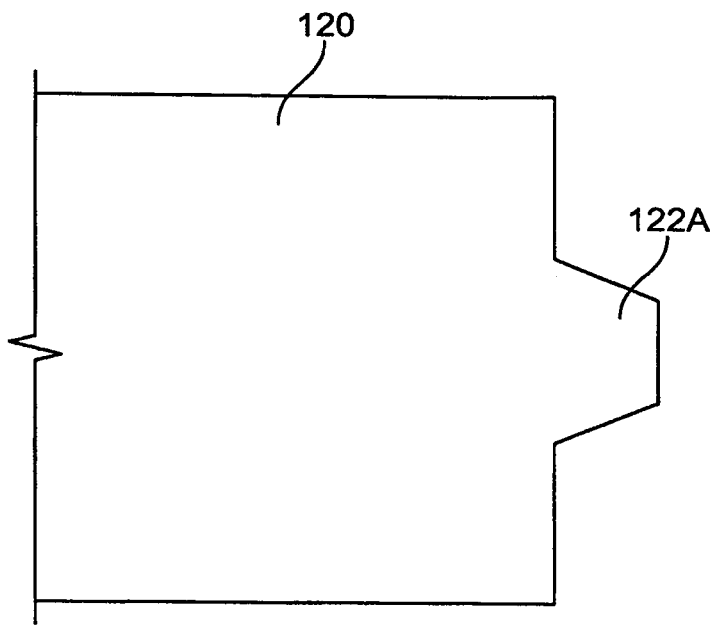
FIG. 20A is a plan view of an anvil showing a flattened V-shape protrusion of the anvil.
Figure 20B:
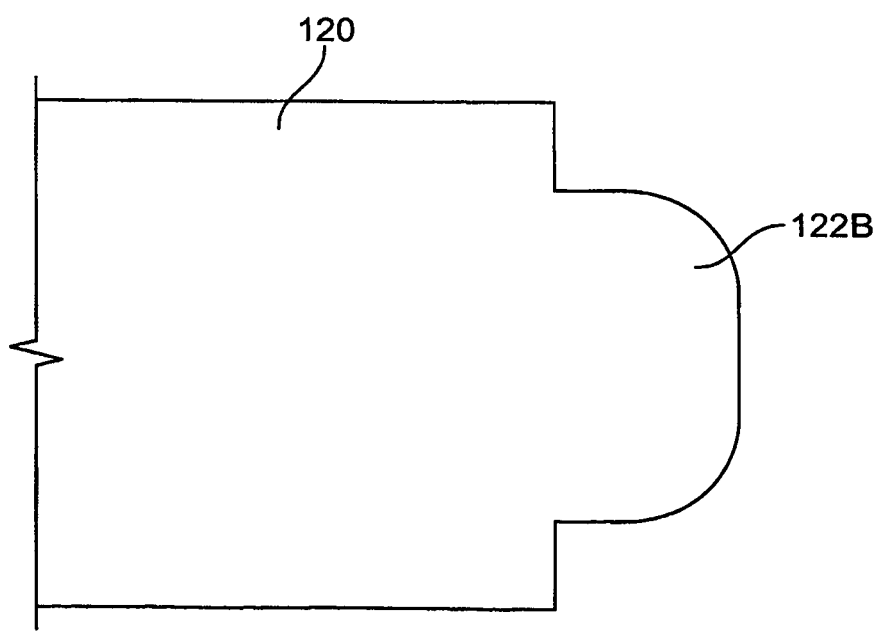
FIG. 20B is a plan view of an anvil showing a rounded shape protrusion of the anvil.

The anvils 122 along the anvil support 120 may be of various shapes and sizes selected to provide for adequate reclose functions with the shapes of the lugs 150 and recesses 152 generally corresponding to the shapes of the anvil 122. For example, possible anvil shapes may consist of substantially rounded protrusions, as illustrated in FIG. 20B, substantially square protrusions, or substantially flattened V-shape protrusions, as illustrated in FIG. 20A. In one example, the anvil 122 may extend outwardly from the anvil support 120 to a maximum extent of between about 0.5 mm and about 10 mm. In addition, the shapes of the anvils 122 may be asymmetric variations of the cross-sectional shapes mentioned above. For example, an asymmetric anvil may have a cross-section in a thickness direction that may be substantially perpendicular to a length of the anvil and having a pair of sloped surfaces 134 and 136 that are arranged at different angles relative to a horizontal plane 138 through their point of intersection, where the anvil has a length and a thickness with the length greater than the thickness, as illustrated in FIGS. 19A and 19B. The upper sloped surface 134 is at a lesser angle $\alpha$ compared to the angle $\beta$ of the lower sloped surface 136 such that the lower sloped surface 136 serves as a ramp to deflect the portion of the base member 12 adjacent the recess 152 as the lid 18 is being pressed into the opening 20 of the base member 12 to reclose the package 10. An audible sound is preferably made when the lugs 150 are snapped into the recesses 152. The upper sloped surface 134 has an angle $\alpha$ selected to require greater force to remove the lugs 150 from the recesses 152 as compared to the insertion force in order to provide a reclosable package 10 that is more secure against unintentional removal of the lid 18 from the base member 12.

The rail 124 is located against the package 10 exterior in order to provide a stable support during the formation of the lug/recess combination. The rail 124 contains a channel 132 that is shaped to receive the anvil 122 and thus aid in the formation of the lugs 150 and recesses 152. Various channel 132 shapes may be employed. As shown in FIG. 19A, one rail embodiment contains a channel 132 that is shaped similarly as the anvil 122 so that as the anvil 122 and package materials are pushed into the channel 132, they fit substantially flush within the channel 132. An alternate channel shape, depicted in FIG. 19B, does not exactly compliment the shape of the anvil 122, and may receive a number of different sized and shaped anvils 122 to permit varying depths of the lug 150 and recess 152 in a single package 10.

The anvil support 120 is placed into a cavity of the lid which is defined by the flat lid cover wall 42 of the lid 18 and the upstanding lid portions or walls, 46 and 48. The anvil support 120 is aligned with the channels 132 in the rails 124, and the anvils 122 of the anvil support 120 face towards the inner lid wall 46 and/or part of the curved corner lid wall 48 towards the rail 124, as shown in FIGS. 19A and 19B. The rails 124 are positioned along the outer side of the package 10 and contact the base member wall 126 from an exterior side. The rails 124 contain a channel into which the anvils 122 deform the portions of the lid 18 and base member 12. In forming the aligned lugs and recesses 150 and 152, the anvils 122 of the anvil support 120 are advanced towards the channel 132 in the rail 124 and comes into contact with the lid walls, 46 and/or 48, and the base member wall 126. The anvil 122 urges the package material of the lid 18 and base member 12 into channels 132 of the rails 124 and, in conjunction with the shape of the channels 132, forms the aligned lugs and recesses 150 and 152.

The anvil support 120, and thus the associated anvils 122 thereon, may be maintained at a higher temperature than the rail 124 during formation of the lugs 150 and recesses 152. For example, the anvil support 120 may be heated, and the rail 124 may be cooled. The anvil support 120 is maintained at a temperature which is selected to avoid sealing the package material of the lid 18 to the base member 12. For instance, when the package material is polyester having a glass transition temperature of about 173° F., the anvil support 120 may be maintained at a temperature of between about 120° F. to about 250° F., and preferably about 140° F. to about 185° F., and typical rail 124 cooling temperatures may be from about 40° F. to about 80° F. The dwell time of the anvil 122 at its maximum extent into the channel of the rail may be between approximately less than 1 second to about 3 seconds and at an applied pressure between about 29 psi and about 73 psi.

Figure 21:
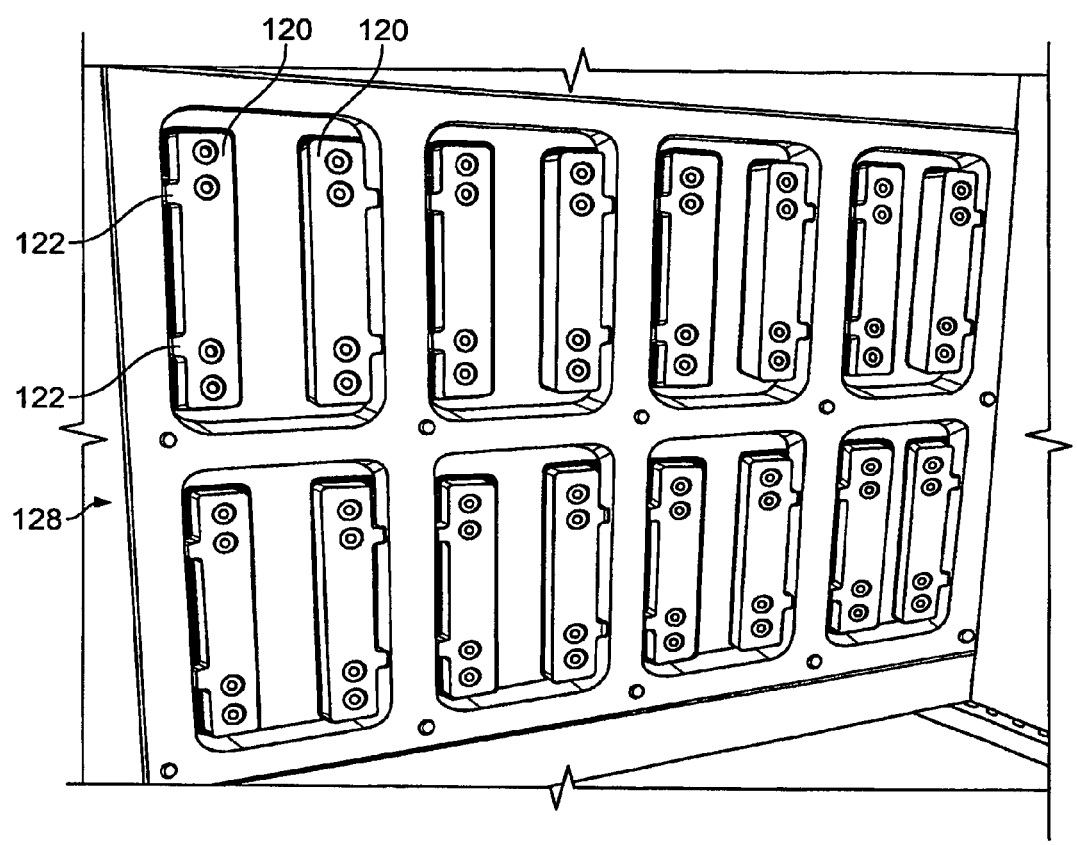
FIG. 21 is a perspective view of the underside of an anvil mechanism for production of the packages.
Figure 22:
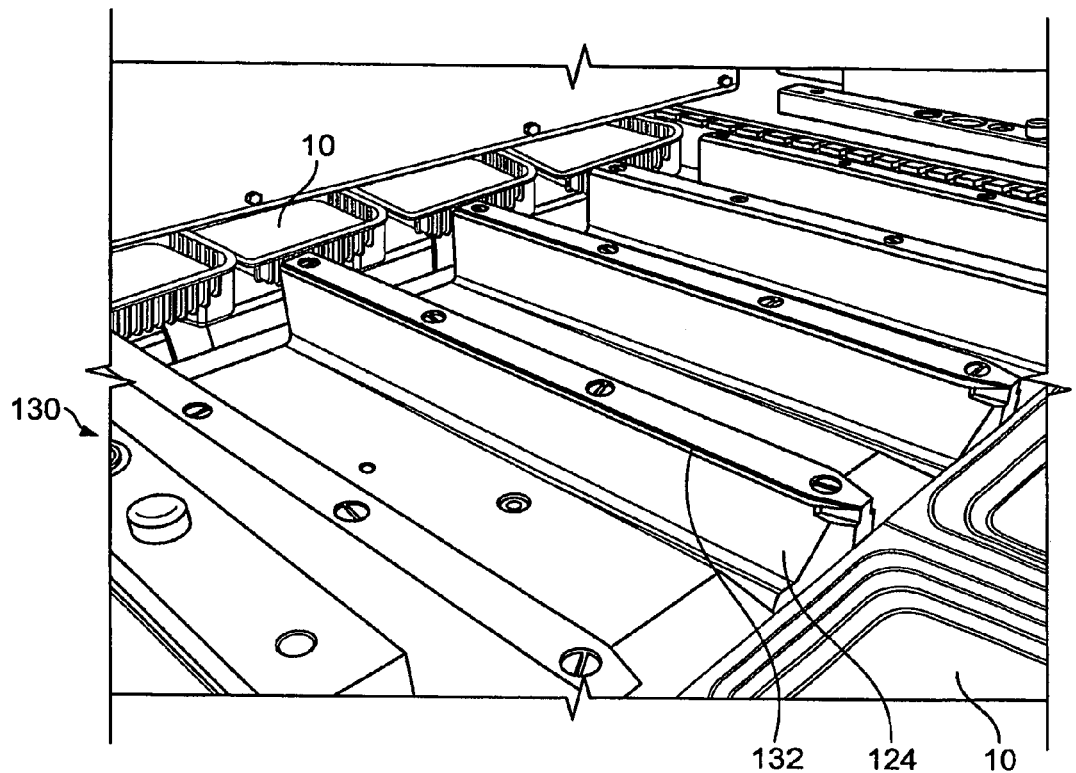
FIG. 22 is a perspective view of a rail mechanism for production of the packages.
Figure 24:
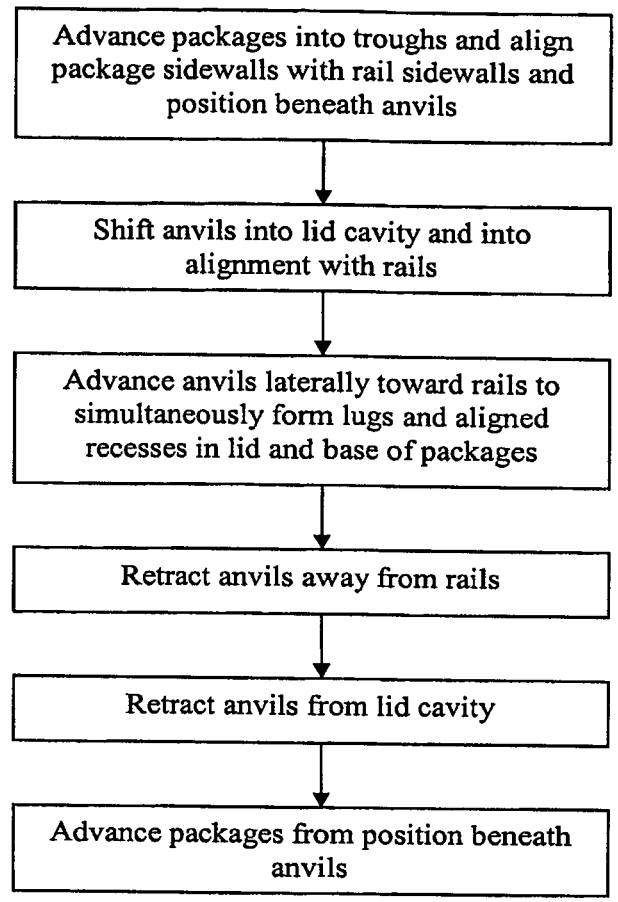
FIG. 24 is a flow diagram of the process steps involved in forming the lugs and recesses of the package.

Turning to the apparatus and methods used for forming the lugs 150 and recesses 152, and as set forth in the flow diagram of FIG. 24, the packages 10 are inserted into a rail apparatus or mechanism 130, shown in FIG. 22, in an upright position, by advancing the packages into troughs and aligning the package sidewalls with the rail sidewalls. The rail mechanism 130 may consist of continuous channels 132 along the length of the rail 124 for receiving the anvils 122 of the anvil supports 120. The packages 10 advance to a position beneath the anvil apparatus or mechanism 128. The anvil mechanism 128, of which the underside is shown in FIG. 21, contains a pair of anvil supports 120 for each package 10 that are actuated for substantially simultaneously forming all of the lugs 150 and recesses 152 in each of the packages 10. The anvil mechanism 128 contains an actuating mechanism (not shown) which shifts the anvil supports 120 into the cavity of the lid 18 of the package 10 and aligns the anvils 122 thereon with the channels 132 in the adjacent rails 124. Next, the anvil supports 120 advance toward the rails 124 and the attached anvils 122 force adjacent portions of the package sidewalls into the channels 132 of the rails 124 to substantially simultaneously form the lugs 150 in the lid 18 and the recesses 152 for receiving the lugs 150 in the base member 12. Once the aligned lugs and recesses 150 and 152 are formed, the anvil supports 120 retract away from the rails 124 and then are shifted out of the cavity of the lid 18. Finally, the packages 10 having aligned lugs and recesses 150 and 152 are advanced from beneath the anvil mechanism 128 and a next set of packages 10 is cycled through.

As set forth in the below examples, the substantially simultaneous formation of aligned lugs and recesses 150 and 152 can result in packages 10 having an average combined separation force (i.e., average reopen force) of the lid 18 from the base member 12 that is consistently greater than the combined separation force of conventional packages having separately-formed lugs and recesses. For example, an average reopen force for the substantially simultaneously formed lugs 150 and aligned recesses 152 may vary from about 2 to about 10 pounds.

Example 1

Reclosable food packages were made using the former technique of thermo-forming the packages and forming its lugs and recesses separately in the lid and base member. These packages had a total of ten lugs per package: three lug/recess combinations on each longitudinal side and two on each transverse (shorter) side. The packages were then initially opened and subsequently reclosed. Then the peak force needed to reopen the packages was measured in each of the four corners of the package. An average reopen force of all four corners of the former lug/recess packages was about 1.3 lbs of force.

Example 2

Reclosable packages were made using the new technology of forming lugs and recesses after the packages had been sealed (i.e. the lids were sealed to the base members). These reclosable packages were made with twelve lugs and recesses; six on each longitudinal side, none on the transverse sides. The lug/recess combinations were formed with the anvil at about 175° F., held at about 73 psi of pressure for approximately 2.5 seconds. The packages were similarly opened and then reclosed so that the force to reopen the packages could be measured, as in Example 1. The average reopen force was between about 2.2 lbs. and 2.8 lbs.

Example 3

Reclosable packages were made similar to Example 2 except that the anvil temperature was increased to about 212° F. The average reopen force was about 2.4 lbs.

Figure 25:
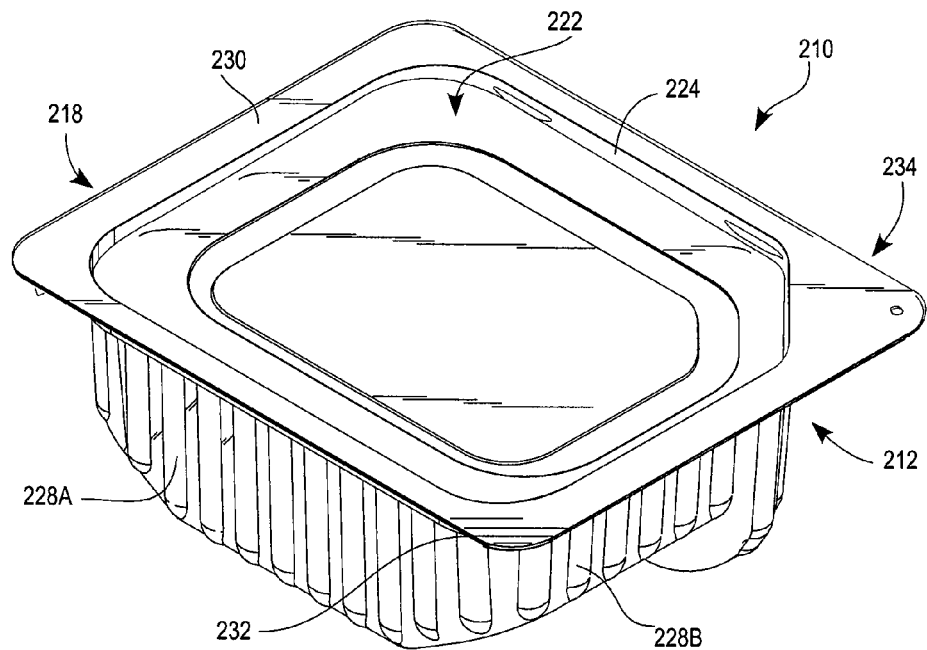
FIG. 25 is a perspective view of a food package in accordance with the present invention showing the package in a horizontal orientation.

Another embodiment of the invention is container 210 which includes a tray or base member 212 and a cover or lid 218, as shown in FIG. 25. The package 210 is similar in a number of ways to the packages of FIGS. 1-24 discussed above and generally includes a compartment 214 for receiving a food product (not shown). The compartment 214 includes a base or bottom wall 240, an opening 220 opposite the bottom wall 240, and a plurality of side wall portions 228 upstanding from the bottom wall 240. The lid 218 is hermetically sealed to the base member 212 to close the opening 220 of the base member 212. With reference to FIG. 25, the lid 218 comprises a cover wall 222 that covers the opening 220 of the base member 212. Rising upward from the cover wall 222 are a plurality of walls 224 that are configured to engage the side wall portions 228 of the base member 212. The walls 224 terminate at a ridge or lip 230 that extends perpendicularly to the walls 224. The lid 218 has a generally rectangular shape with an outer periphery as defined by the lip 230. Specifically, the lip 230 has a plurality of outer edges 232 that comprise a plurality of straight and curved edges which will be explained in greater detail below. Along the outer periphery of the lid 218 is a tab 234 that is sized and configured to aid a user in both the initial and subsequent opening of the package 210.

Figure 26:
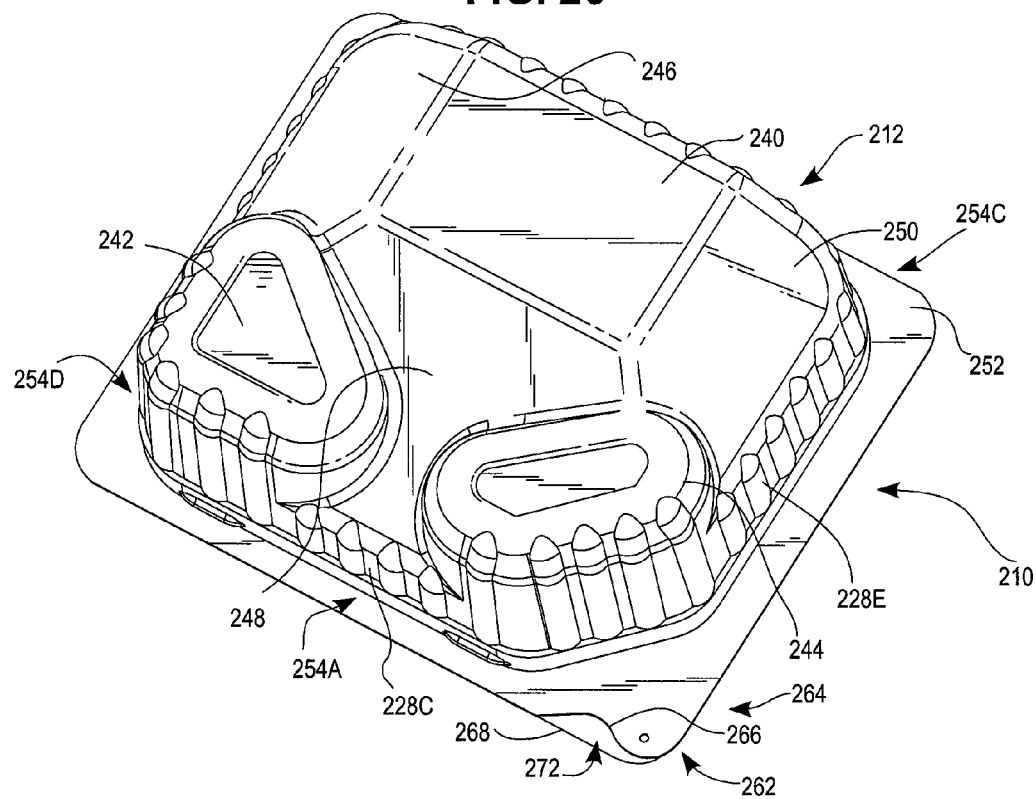
FIG. 26 is a perspective view of the food package of FIG. 25 showing an easy-open feature of the food package.

Turning to FIG. 26, a perspective view of the bottom of the package 210 is shown. The base member 212 has the bottom wall 240 and foot portions 242, 244 which provide a three-point base to support the package 210. The base member 212 has a base or bottom wall 240 that supports the package 210 in conjunction with foot portions 242, 244. Ramp portions 246, 248, 250 extend upward from the bottom wall 240 at an incline and form junctures with respective side wall portions 228. Like the lid 218, the base member 212 has a substantially rectangular ridge 252 that defines an outer periphery of the base member 212 and provides a plurality of gripping surfaces for a user to both handle and open the package 210. The ridge 252 includes four straight portions 254A-254D that extend along the major sides of the package 210. In the illustrated embodiment, the ridge 252 and the lip 230 form an easy open feature 262 at one corner of the package 210. The easy open feature 262 includes a gripping portion 264 of the ridge 252, the gripping portion 264 having an outer profile 266 that is defined by a plurality of edges. As shown in FIG. 26, the lid 218 has a straight edge 268 that is disposed outward from the outer profile 266 of the gripping portion 264. In this manner, the tab 234 of the lid 218 has a lower surface 270 with a portion 272 that is uncovered by the gripping portion 264 when the lid 218 is connected to the base member 212. By having the portion 272 uncovered by the gripping portion 264, a user may readily use his or her thumb to grasp the portion 272 and lift the tab 234 upward away from the gripping portion 264, which initiates separation of the lip 230 of the lid 218 from the ridge 252 of the base member 212. A user may continue pulling apart the tab 234 and the gripping portion 264 to complete opening of the package 210. Further, the spacing between the straight edge 268 of the lid 218 and the outer profile 266 of the gripping portion 264 limits the possibility of the edge 268 and the outer profile 266 tacking together during manufacture.

Figure 27:
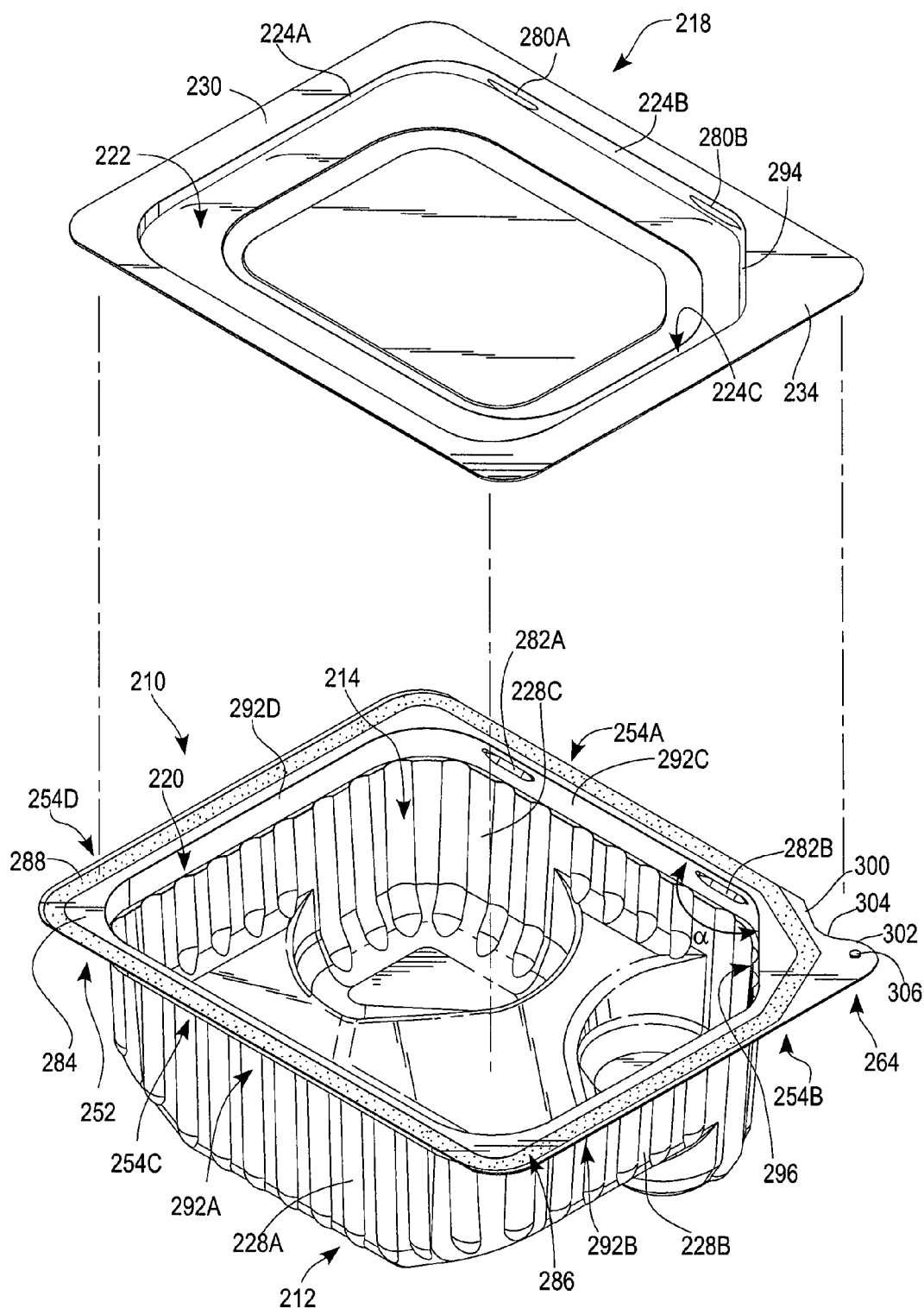
FIG. 27 is an exploded perspective view of the food package of FIG. 25 illustrating a base member and a lid for closing the base member.

FIG. 27 illustrates a perspective exploded view of the package 210 with the lid 218 removed from the base member 212. In one form, the lid 218 has lugs 280 formed therein which engage recesses 282 formed in the base member 212. Engagement between the lugs 280 and the recesses 282 provides a resealable engagement between the lid 218 and the base member 212, as discussed above. The ridge 252 of the base member 212 may include an upper surface 284 with a sealing area 286 extending around the entirety of the ridge 252. The sealing area 286 is between about 3 millimeters and about 6 millimeters in width, preferably about 5 millimeters. Further, the sealing area 286 may be configured to receive a heat sealant 288 that is heat activated to form a hermetic seal between the lid 218 and the base member 212. Specifically, to seal the lid 218 to the base member 212, the heat sealant 288 is first applied to the upper surface 284 of the ridge 252 as well as to a lower surface 290 of the lid 218. Once the lid 218 is positioned over the opening 220 of the compartment 214, the sealant 288 is compressed and heated, which forms a hermetic seal between the lid 218 and the base member 212 at the upper surface 284 of the ridge 252 and the lower surface 290 of the lid 218.

The base member 212 also includes upper sections 292 of the side wall portions 228. The upper sections 292 extend downward from the opening 220 of the base member 212 and are configured such that the walls 224 of the lid 218 nest within the upper sections of 292 of the base member 212. In one form, the lid walls 224 include a diagonal wall 294 that is complementary to an upper section 295 of a diagonal side wall portion 296 of the base member 212. The diagonal wall 294 nests against the upper section 295 of the diagonal side wall portion 296 when the lid 218 is connected to the base member 212. The diagonal side wall portion 296 extends at an angle γ of between about 125° and about 145°, preferably about 135°, to both of the side wall portions 228B, 228C. The diagonal wall 294 of the lid 218 preferably extends at similar angles to the walls 224B, 224C.

With continued reference to FIG. 27, the gripping portion 264 of the base member 212 may include a straight edge 300 that extends inward from the straight portion 254A of the base member ridge 252. The gripping portion 264 may further include a semicircular edge 302 that extends inward from the straight portion 254B about a first radius of curvature and a rounded edge 304 disposed between the straight edge 300 and the semicircular edge 302 such that the rounded edge connects the straight edge 300 and the semicircular edge 302. In one form, the rounded edge 304 has a second radius of curvature that is smaller than the first radius of curvature of the semicircular edge 302, as will be discussed in greater detail below.

Figure 28:
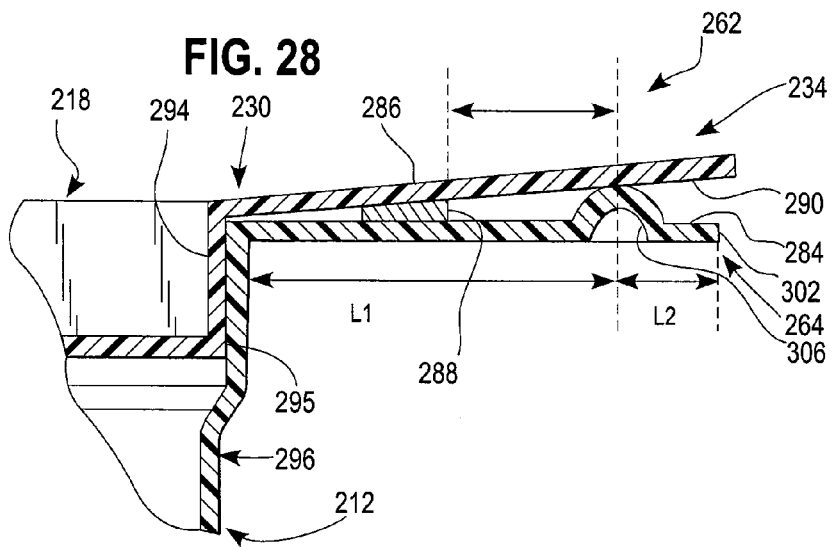
FIG. 28 is an enlarged portion of a side elevational view of the food package of FIG. 25 showing the easy-open feature.

Besides the plurality of edges 300, 302, and 304, the gripping portion 264 may also include a protuberance 306 that is raised above the upper surface 284 of the ridge 252 and provides a localized gap spacing between the gripping portion 264 and the tab 234. FIG. 28 illustrates an enlarged, cross sectional view of the package 210 and illustrates the easy open feature 262 with the protuberance 306. As shown in FIG. 28, the location of the protuberance 306 provides a localized gap spacing between the tab 234 and the gripping portion 264. This spacing facilitates pulling apart of the tab 234 and the gripping portion 264 to initially break the sealant 288 disposed on the upper surface 284 of the ridge 252 and the lower surface 290 of the lid 218. In the embodiment shown, the protuberance 306 is formed on the base member 212, though the protuberance 306 could instead be located on the tab 234 of the lid 218. The protuberance 306 may have a number of different shapes and configurations, such as the protuberances disclosed in U.S. Pat. No. 7,475,780 to Hinze et al., which issued on Jan. 13, 2009, the entirety of which is incorporated by reference as if set forth fully herein.

The dimensions of the protuberance 306 and the location of the protuberance 306 on the gripping portion 264 are selected such that a sufficient span of the localized gap is created, while the protuberance 306 is not so close to the sealing area 286 so as to cause the sealant 288 to inadvertently rupture, such as by exceeding the bond strength of the sealant 288. In the illustrated embodiment, the protuberance 306 has a diameter that is between about 1 millimeter and about 4 millimeters, preferably about 2 millimeters, and a height that is between about 0.5 millimeters and about 2 millimeters, preferably about 1 millimeter. The center of the protuberance 306 may be separated from the sealant 288 by a distance L that is between about 6 millimeters and about 10 millimeters, preferably about 8 millimeters, as measured generally normal to the diagonal side wall portion 296. The center of the protuberance 306 is also separated from the upper section 295 of the diagonal side wall portion 296 by a distance L1 that is between about 12 millimeters and about 18 millimeters, preferably about 15 millimeters. Conversely, the center of the protuberance 306 is separated from the semicircular edge 302 by a distance L2 that is between about 2 millimeters and about 6 millimeters, preferably about 4 millimeters. Thus, the distance between the center of the protuberance 306 and the sealant 288 is between about one to five times the distance between the center of the protuberance 306 and the semicircular edge 302. In a preferred form, the distance between the center of the protuberance 306 and the sealant 288 is about twice the distance between the center of the protuberance 306 and the semicircular edge 302. Such a configuration may provide sufficient initial separation between the tab 234 and the gripping portion 264 without causing unintentional rupture of the sealant 288.

Figure 29:
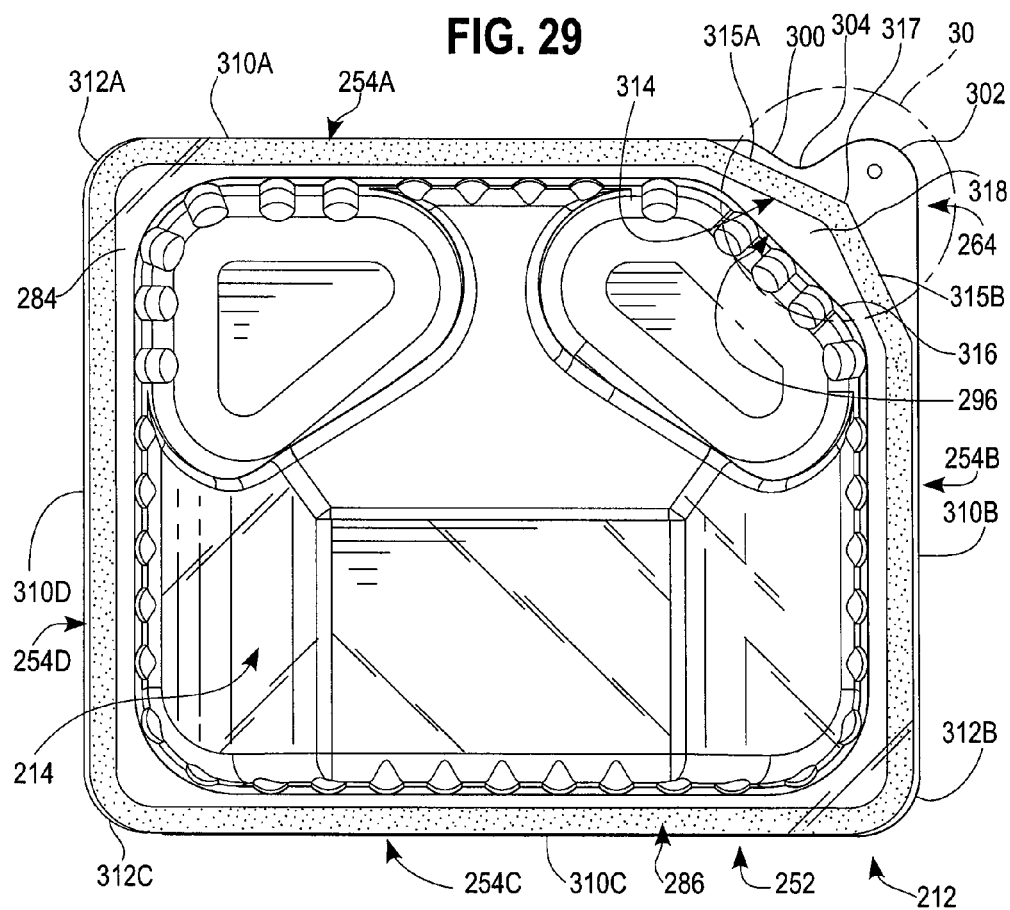
FIG. 29 is a plan view of the base member of FIG. 27 illustrating an outer profile of a gripping portion of the base member.

As shown in FIG. 29, the base member 212 has straight portions 254A-254D which form an outer periphery of the base member ridge 252. The straight portions 254A-254D have associated straight edges 310A-310D that are connected by curved edges 312A-312C. The sealing area 286 of the base member ridge 252 may be disposed in close proximity to the edges 310A-310D and 312A-312C around substantially the entirety of the ridge 252. The sealing area 286 may also include a chevron 314 disposed on the gripping portion 264, the chevron 314 having a pair of straight portions 315A, 315B that intersect at a point 317. In one form, a diagonal edge 316 connects the diagonal side wall portion 296 of the base member 212 and the upper surface 284 of the ridge 252. A spacing surface 318 is positioned between the diagonal edge 316 and the chevron 314 of the sealing area 286 to extend the gripping portion 264 away from the diagonal side wall portion 296 of base member 212 such that the gripping portion 264 provides sufficient space for a user to grasp the gripping portion 264. A countervailing consideration is the placement of the chevron 314 on the gripping portion 264. Specifically, the closer the chevron 314 is located relative to the outer profile 266 of the gripping portion 264, the less space the user will have to grasp and open the package 210 when the lid 218 is initially sealed to the base member 212 at sealing area 286. The embodiment of FIG. 29 illustrates a preferred configuration of the gripping portion 264 wherein the spacing surface 318 is large enough to extend the gripping portion 264 away from the diagonal side wall portion 296, while the chevron 314 is disposed sufficiently inward of the outer profile 266 to provide space for a user to separate the tab 234 of the lid 218 and the gripping portion 264 of the base member 212.

Figure 30:
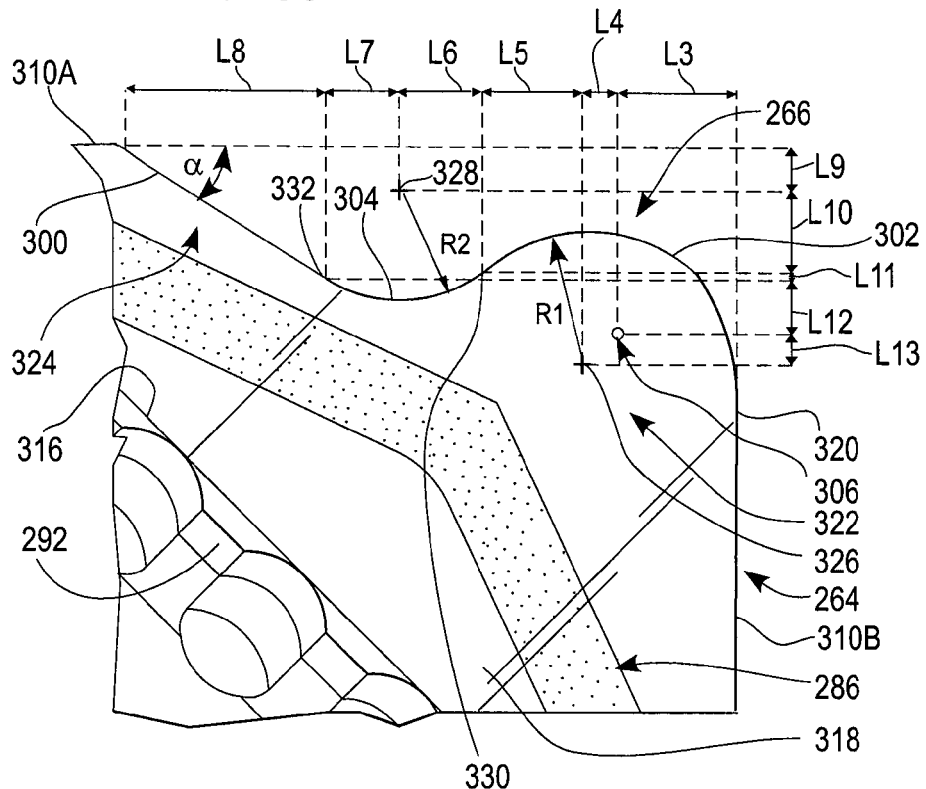
FIG. 30 is an enlarged plan view of a section of the base member within circle 30 of FIG. 29 which shows a plurality of edges defining the outer profile of the gripping portion.
Figure 31:
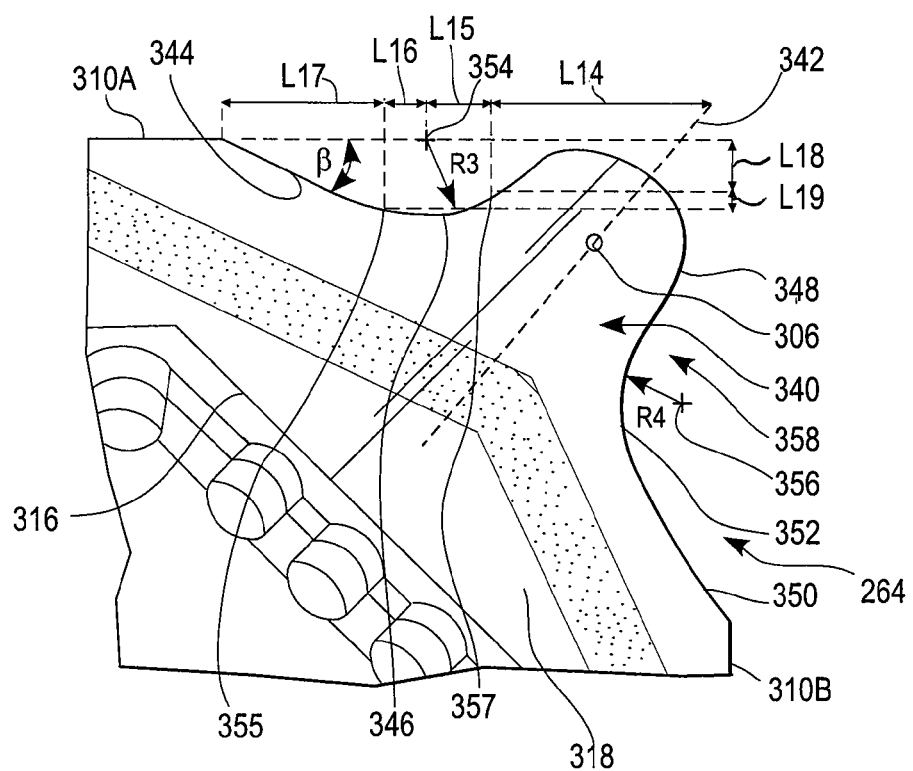
FIG. 31 is an enlarged plan view similar to FIG. 30 illustrating an alternative embodiment of the gripping portion of the base member.

FIGS. 30 and 31 illustrate different embodiments of the gripping portion 264 which provide the user with increased ability to separate the lid 218 from the base member 212. In particular, FIG. 30 is an enlarged view of base member 212 within circle 30 of FIG. 29. In the embodiment shown, the straight edge 300 of the gripping portion 264 extends inward from the straight edge 310A of the straight portion 254A at an angle α which is between about 25° and about 35°, preferably about 32°. The semicircular edge 302 extends inward from the straight edge 310B of straight portion 254B and transitions from the straight edge 310B at point 320. The curved edge 304 connects the straight edge 300 with the semicircular edge 302 and, in combination with the semicircular edge 302, forms a shape which is approximately sinusoidal. The curved edge 304 and the semicircular edge 302 define a projecting member 322 that is sized to permit a user to grasp the projecting member 322 between an index finger and thumb. Conversely, the straight edge 300 and the curved edge 304 partially define a body section 324 of the gripping portion 264.

With respect to the dimensions of the gripping portion 264, the semicircular edge 302 has a radius R1 that extends a distance of about 7 millimeters to about 11 millimeters, preferably about 9 millimeters, from an origin or point 326 of the projecting section 322. The curved edge 304 has a radius R2 that extends from an origin or point 328 toward the outer profile 266 of the gripping portion 264. The radius R2 is between about 5 millimeters and about 8 millimeters, preferably about 6 millimeters, and is preferably shorter than the radius R1. In the illustrated embodiment, the outer profile 266 changes between the curvatures of the curved edge 304 and the semicircular edge 302 at a point 330. Likewise, the outer profile 266 changes from the straight edge 300 to the curvature of the curved edge 304 at point 332. The preferred relative dimensions of the outer profile 266 are presented in the table below. The measurements L3-L13 have ranges that are about ±1 millimeter from the preferred measurement.

TABLE 1

| Dimensions of the base member gripping portion of FIG. 30 | | | | | | | | | | | |
|---|---|---|---|---|---|---|---|---|---|---|---|
| Measurement | L3 | L4 | L5 | L6 | L7 | L8 | L9 | L10 | L11 | L12 | L13 |
| Length (mm) | 8 | 2 | 6 | 5 | 5 | 11 | 3 | 4 | 1 | 4 | 2 |

In the illustrated embodiment, the ratio of the lengths of R1 and R2 for the gripping portion 264 is between about 7:8 and about 11:5, and is preferably about 9:6. The relative sizing between R1 and R2 provides an outer profile 266 that is relatively unaffected by variation during mass production. Specifically, the undulating nature of the outer profile 266 may expose the uncovered portion 272 of the tab lower surface 270 even if the position of the outer profile 266 on the base member 212 varies a few millimeters during production. In another aspect of the embodiment of FIG. 30, the protuberance 306 is separated from the origin or point 326 of the radius R1 a distance that is between about one-eighth and about two-thirds the length of the radius R1, preferably less than about one-third the length of the radius R1. This positioning accommodates variation in the placement of the protuberance 306 on the gripping portion 264 during mass production. Further, this positioning places the protuberance 306 sufficiently close to the outer profile 266 to establish an initial gap spacing between the tab 234 and the gripping portion 264 adjacent the outer profile 266 such that a user may easily separate the tab 234 and the gripping portion 264.

An alternative embodiment of the gripping portion 264 of the base member 212 is shown in FIG. 31. This embodiment generally comprises a peninsula 340 that is symmetrical about an axis 342 and has cutouts disposed on both sides of the peninsula 340. The peninsula 340 has a straight edge 344 that extends inward from the straight edge 310A at an angle β, which may be between about 25° and about 35°, and is preferably about 28°. The straight edge 344 extends inward and connects with a curved edge 346 at a point 355. The curved edge 346 has a radius R3, which may be between about 5 millimeters and about 8 millimeters, preferably about 6 millimeters. At a point 357, the curved edge 346 changes to a rounded edge 348 that defines an outermost portion of the peninsula 340. The configuration of the gripping portion 264 is symmetrical across axis 342, with a straight edge 350 extending inward from the straight edge 310B and connecting with a curved edge 352. The curved edge 352 has a radius R4 that originates at point 356 and connects to the rounded edge 348, the radius R4 having a length that is substantially identical to the radius R3. The preferred relative dimensions of one side of the gripping portion 264 are presented in the table below. The measurements L14-L19 have ranges that are about ±1 millimeter from the preferred measurement.

TABLE 2

Dimensions of the base member gripping portion of FIG. 31

| Measurement | L14 | L15 | L16 | L17 | L18 | L19 |
|---|---|---|---|---|---|---|
| Length (mm) | 17 | 5 | 3 | 12 | 4 | 1 |

The cutouts on the sides of the peninsula 340 are sized and positioned to create an uncovered portion of the tab lower surface 270 in a manner similar to the outer profile 266. However, the edges 344, 346, 348, 350, 352, define an outer profile 358 of the gripping portion 264 that exposes a larger surface area of the tab lower surface 270 than does the outer profile 266 of the embodiment of the gripping portion 264 shown in FIG. 30.

Figure 32:
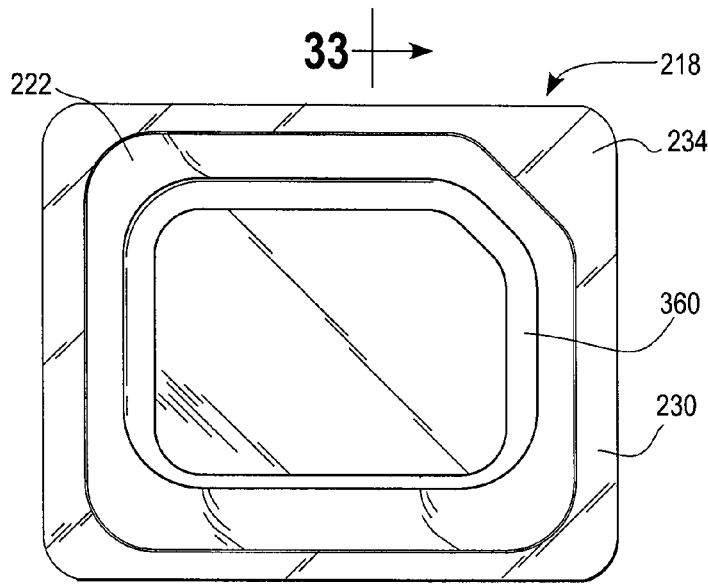
FIG. 32 is a plan view of the lid of FIG. 27.
Figure 33:
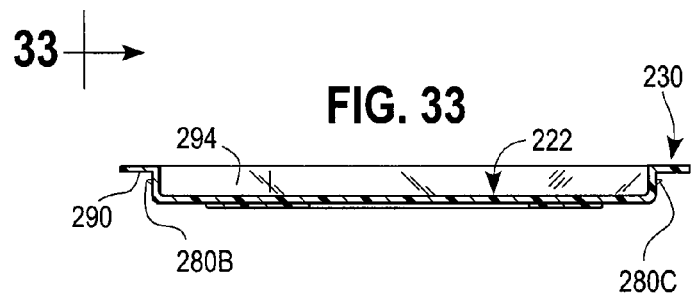
FIG. 33 is a cross-sectional view taken along line 33-33 of FIG. 32.
Figure 34:
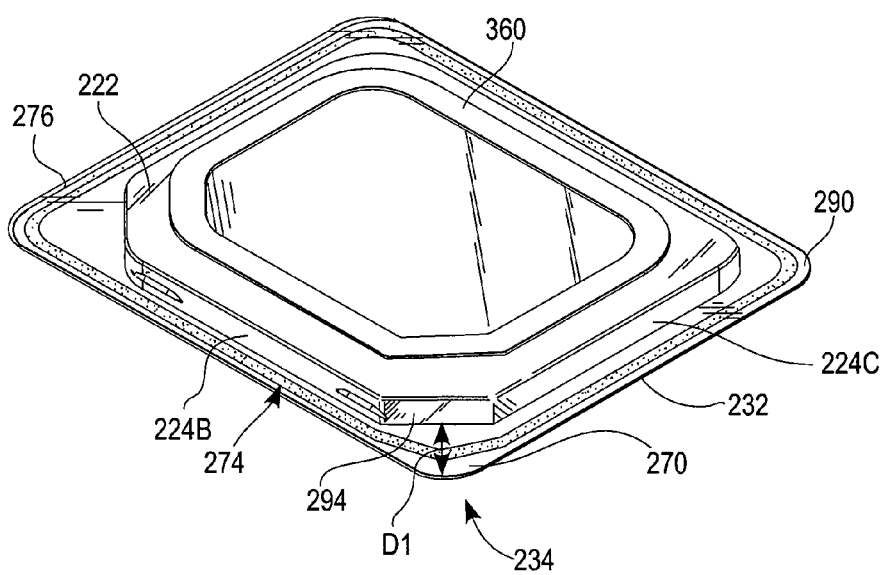
FIG. 34 is a perspective view of the lid of FIG. 27 illustrating a lip, a tab portion of the lip, a cover wall, and walls extending between the cover wall and the lip.

As shown in FIG. 32, the lid 218 may include features which add to the rigidity of the lid 218 as well as enhance the ability of a user to separate the lid 218 from the base member 212. In particular, the lid 218 may have flat support channels 360 that extend downward from the cover wall 222 and strengthen the lid 218 in a manner similar to channels 44 discussed above. As shown in FIGS. 33 and 34, the lip 230 of the lid 218 extends generally perpendicular to the walls 224 such that the lower surface 290 of the lip 230 is in confronting relation with the upper surface 284 of the ridge 252 when the lid 218 is connected to the base member 212. Further, the lip 230 extends outward from the walls 224 a distance that is greatest adjacent the diagonal wall 294, as indicated by distance D1 in FIG. 34. By having the diagonal wall 294, the area of the tab 234 may be greater than if the walls 224 formed a right angle adjacent the tab 234. This maximizes the available gripping surfaces of the tab 234 when the lid 218 is connected to the base member 212. The lip 230 of the lid 218 may also include a sealing area 274 that overlaps the sealing area 286 of the ridge 252 of the base member 212 when the lid 218 is connected to the base member 212. The sealing area 274 may be substantially identical to the sealing area 286 of the ridge 252, with a width of between about 3 millimeters to about 6 millimeters, preferably about 5 millimeters. The sealing area 274 may be joined directly with the sealing area 286, or the sealing area 274 may have a heat-activated sealant 276 disposed thereon.

Figure 35:
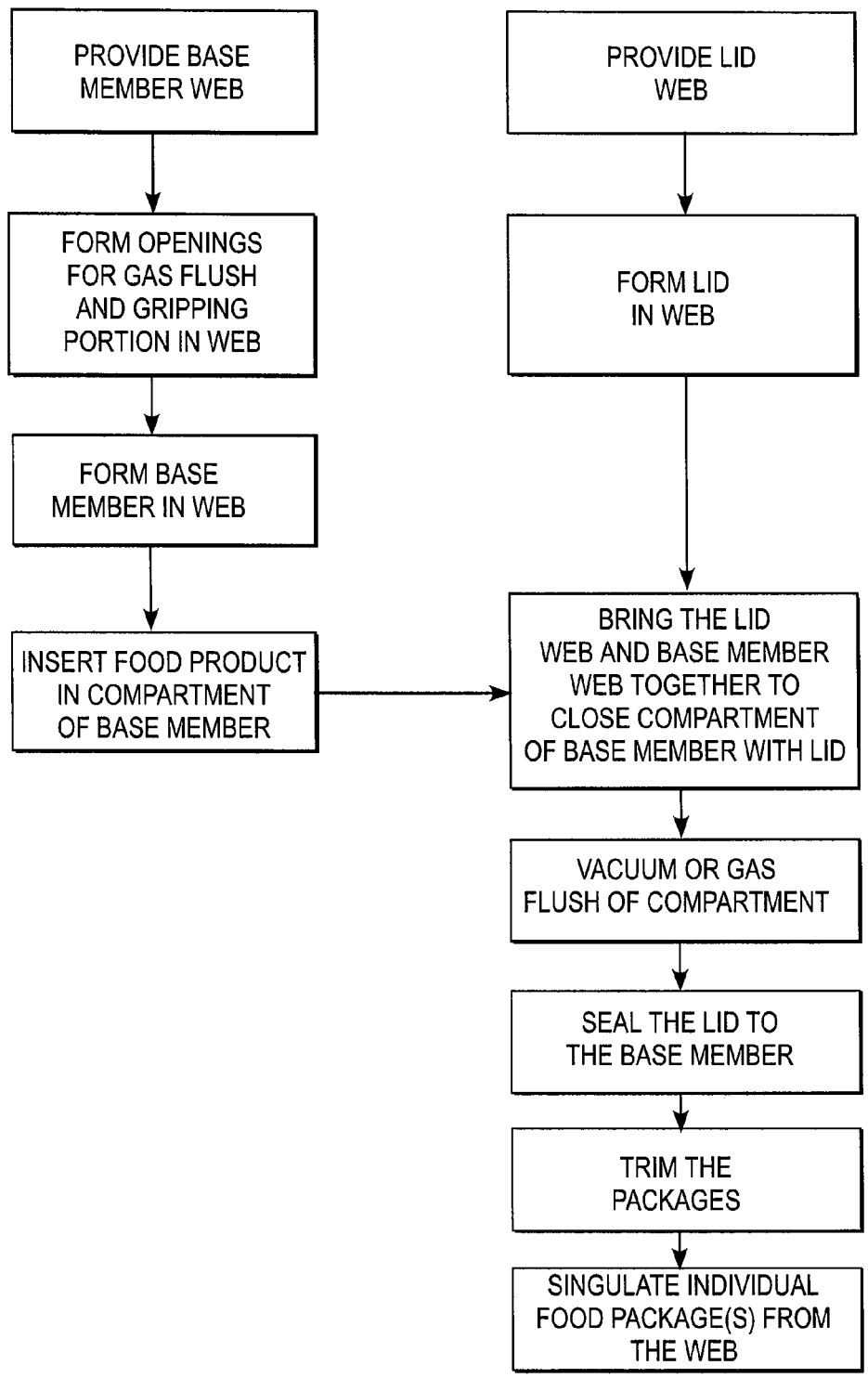
FIG. 35 is a flow diagram of the process steps involved in assembling the package of FIG. 25.
Figure 36:
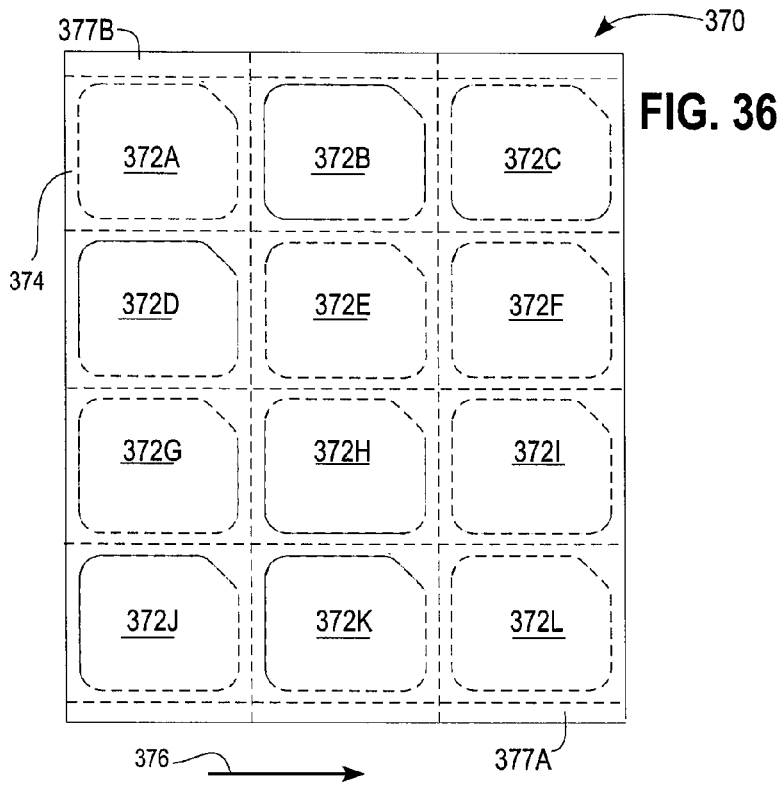
FIG. 36 is a plan view of a web of material for a number of base members.

Turning to the apparatus and methods used for forming the package 210 in the flow diagram of FIG. 35, the base member 212 and lid 218 may be separately manufactured from thermoformable multi-layer webs, which may be supplied as roll stock and run on a form-fill-seal machine, or the like. The roll stock for the base member 212 is initially cut into unformed webs such as the web 370, as shown in FIG. 36. The web 370 may comprise a plurality of individual base member sections 372A-372L that may be organized in rows and columns. Each section 372 may include an unformed ridge area 374 which is later shaped into ridge 252 of the base member 212. In the embodiment illustrated in FIG. 36, the web 370 is configured to be advanced through the form-fill-seal machine in direction 376 with the web 370 having clamping portions 377A, 377B extending along the sides of the web 370. Clamping portions 377A, 377B provide space for groups of openings 378A, 378B which are formed in the clamping portions 377A, 377B and are used for gas flushing of the package 210, as will be discussed below.

Figure 37:
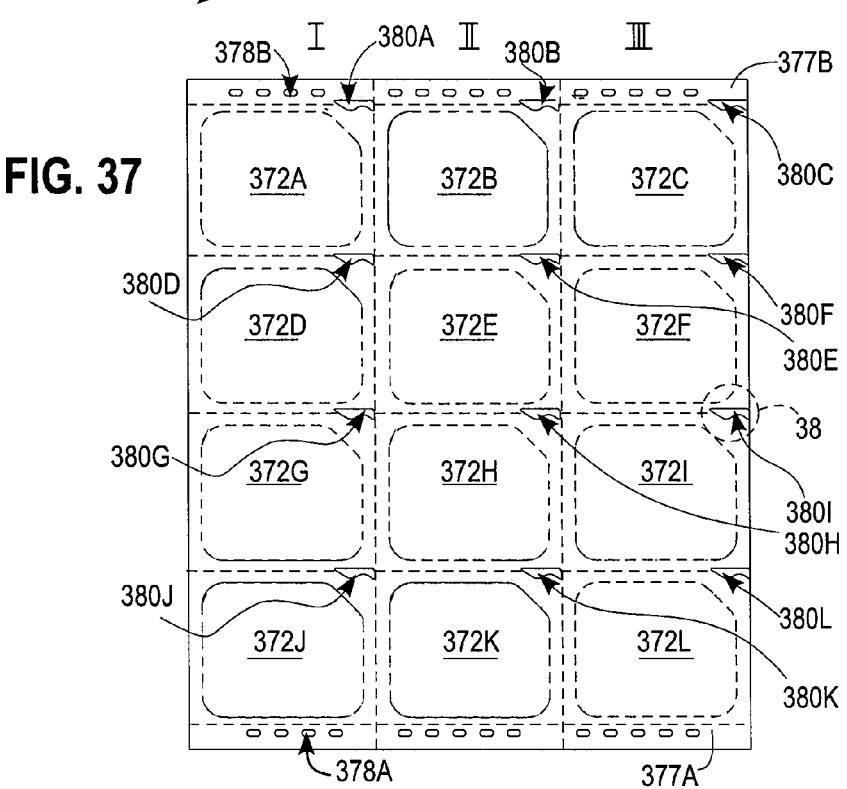
FIG. 37 is a plan view of the web of material of FIG. 36 after cutouts and gas flush openings have been formed in the web of material.

The unformed base member web 370 is then advanced to a stage where openings 378A, 378B and cutouts 380A-380L are formed in the web 370, as shown in FIG. 37. Each base member section 372 has a cutout 380 which partially defines the outer profile 266 of the gripping portion 264 once the individual section 372 has been cut or trimmed from the web 370. In one form, the cutouts 380 are uniformly located at the upper right hand corner of the individual base member sections 372A-372L. Further, the openings 378A, 378B are generally aligned along the length of the clamping portions 377A, 377B and are separated in this embodiment into groups of four or five. In the embodiment shown, the groups of openings 378A, 378B are separated between columns I, II, and III of the unformed base member web 370. In this form, the opposed openings 378A, 378B that are associated with each column I, II, or III are utilized to vacuum or gas flush the associated packages of that column.

Figure 38A:
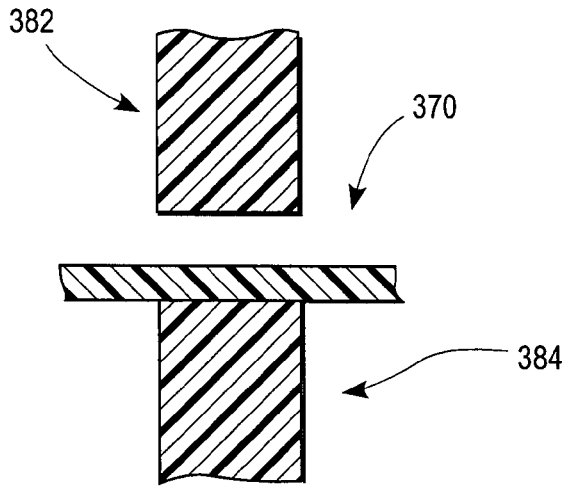
FIGS. 38A-38C are a series of enlarged cross-sectional views of a section of the base member web within circle 38 of FIG. 37 illustrating a pair of matched punches forming a cutout in the base member web.
Figure 38B:
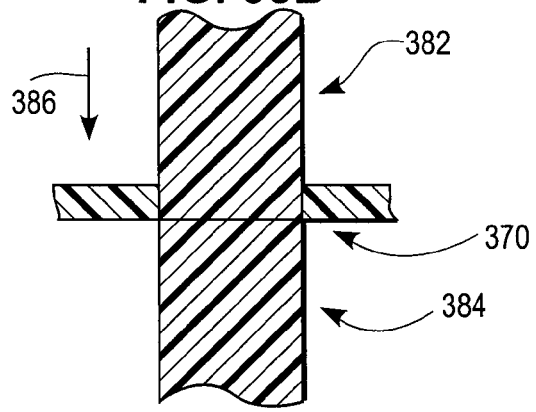
Figure 38C:
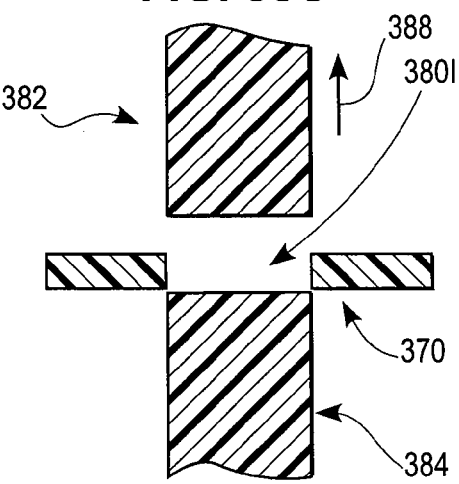

FIG. 38A-38C are a series of enlarged cross-sectional views of the web 370 within circle 38 of FIG. 37 which generally show an exemplary process of forming the cutout 380I in the individual base member section 372I. In the approach shown, a matched metal punch is used to remove cutout 380I. Specifically, unformed base member web 370 is advanced into a position where the desired cutout 380I is aligned between male punch 382 and female punch 384. Female punch 384 may be closely positioned adjacent the underside of the unformed base member 370. The male punch 382 is then advanced in direction 386 downward into contact with the female punch 384, which removes material from the unformed base member web 370. As shown in FIG. 38C, once the cutout 380I has been cut into the unformed base member web 370, the male punch 382 is retracted in direction 388 away from the female punch 384. The material removed during the cutout forming process is preferably vacuumed away from the web 370, which limits the opportunity for the removed material to enter the food compartment 214 during manufacture. In one approach, the cutouts 380 and the openings 378 may be simultaneously formed using a pneumatically actuated manifold that forms all of the cutouts 380 and openings 378 in the web 370 at one time. The removed material is then vacuumed from the web 370 before the web 370 is advanced and individual base members 212 are formed in the base member sections 372A-372L.

Figure 39:
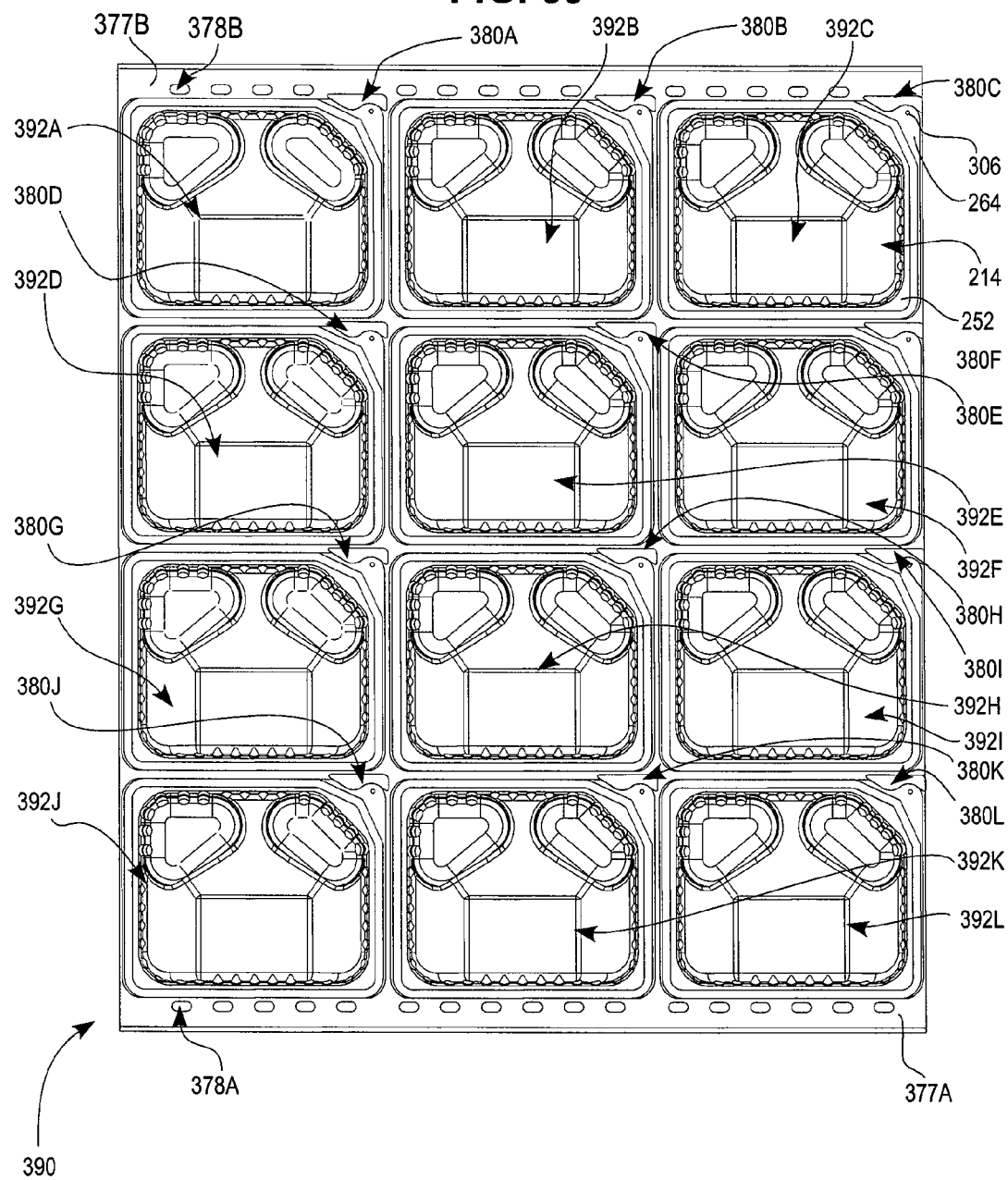
FIG. 39 is a plan view of the base member web of FIG. 37 after the base members have been formed in the web.

The next step in producing package 210 involves forming the individual base members 212 in the unformed base member web 370 to produce a formed base member web 390, as shown in FIG. 39. To produce a number of base members 392A-392L that are not yet cut from the web of material, heaters are disposed above and below the unformed base member web 370 to produce localized heating in areas of the web 370 that will be shaped using a combination of vacuum, air pressure, and forming plugs. After forming, the formed base member web 390 will have a plurality of uncut, formed base members 392 that each include a compartment 214, a ridge 252, a gripping portion 264, and a protuberance 306. A food product may be inserted into the compartment 214 before the formed base member web 390 is attached to a lid web, as will be discussed below.

FIG. 40 illustrates an unformed lid web 400 made from roll stock material in a size that is similar to the unformed base member web 370. Like the unformed base member web 370, the unformed lid web 400 has clamping portions 402A, 402B at opposed sides of the web 400, and the web 400 is configured to be advanced in direction 404. The unformed lid web 400 has sections 406A-406L that are similar in size and orientation to the individual base member sections 372A-372L of the unformed base member web 370. However, unlike the unformed base member web 370, there are no openings 378 or cutouts 380 formed in the unformed lid web 400. There are no openings 378 because the clamping portions 402A, 402B of the web 400 overlie the clamping portions 377A, 377B of the formed base member web 390 to form a chamber between the formed webs of the lid and base member, as will be discussed below. Further, there are no cutouts 380 in the unformed lid web 400 because the tab 234 extends outward beyond the outer profile 266 of the gripping portion 264, as shown in FIG. 26.

Figure 42:
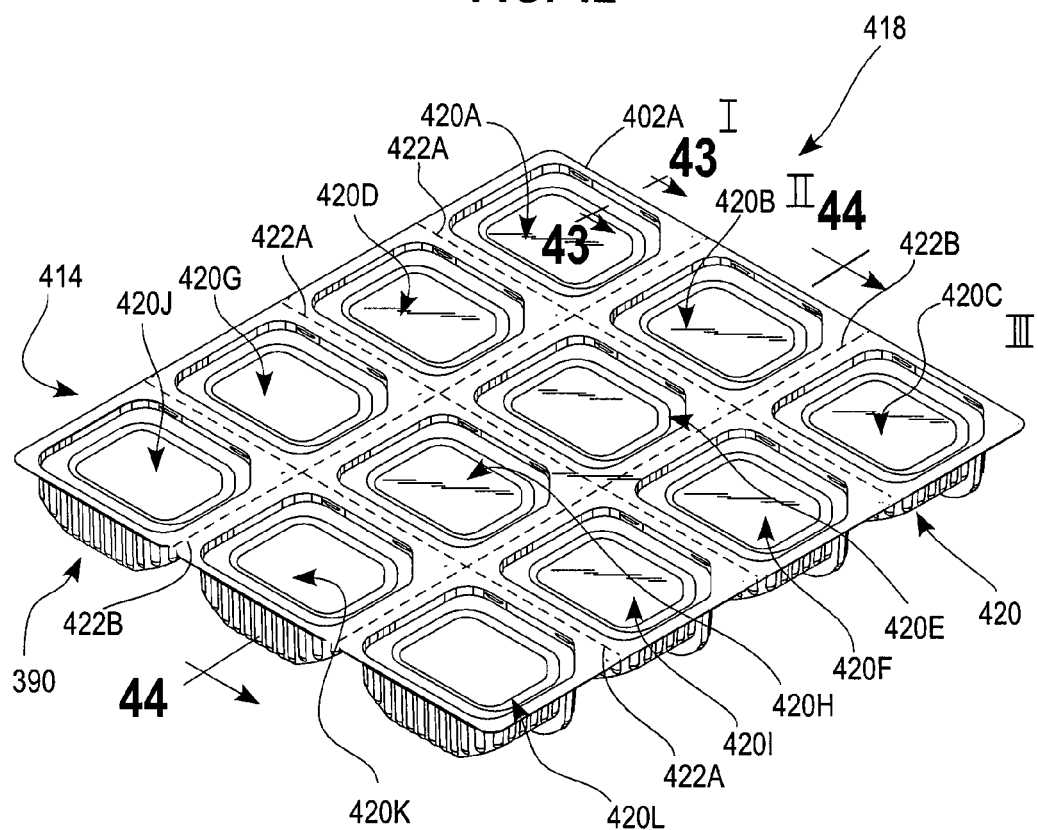
FIG. 42 is a perspective view of an assembly comprising the formed base member web of FIG. 39 and the formed lid web of FIG. 41.

The web 400 is shaped into the formed lid web 414 using a combination of vacuum, air pressure, and forming plugs. The formed lid web 414 comprises a plurality of uncut, formed lids 416A-416L, as shown in FIG. 41. The formed lids 416A-416L each include the cover wall 222, the plurality of walls 224 upstanding from the cover wall 222, and the lip 230 which extends generally perpendicular to the plurality of walls 224 and surrounds the cover wall 222. After forming, the lid web 414 is brought together with the formed base member web 390 such that the cover walls 222 are inserted into the openings 220 of the compartments 214 to close the compartments 214. As shown in FIG. 42, bringing the formed lid web 414 into connection with the formed base member web 390 creates an assembly 418 of formed lid and base member webs. At this stage, the assembly 418 comprises a plurality of individual packages 420A-420L that each contain a food product and are to be cut along dashed lines 422A, 422B.

The food compartment 214 of the individual packages 420A-420L may optionally have a vacuum or gas flush applied prior to sealing the lid 218 to the base member 212. FIGS. 43A-43C present an exemplary gas flushing procedure taken across line 43-43 in FIG. 42. Specifically, a gas flushing nozzle 430 is aligned with an opening 432 of the openings 378B in the formed base member web 390. Next, a clamping force is exerted in directions 434, 436 which compresses the lid clamping portion 402B together with the base member clamping portion 377B, as shown in FIG. 43B. With the clamping portions 402B, 377B held together, the gas portion nozzle 430 is inserted in direction 438 into the opening 432 such that the nozzle 430 projects into the space between the formed based member web 390 and the formed lid web 414, as shown in FIG. 43C. In one approach, the nozzle 430 is configured to provide an airtight seal with the formed base member web 390 such that the nozzle 430 forms an airtight seal around the periphery of opening 432. Moreover, the engagement between the clamping portions 377A, 377B and clamping portions 402B, 402A, in combination with the engagement of nozzles within the openings 378A, 378B, forms a series of compartments aligned across the columns I, II, and III of the assembly 418 which may be gas flushed by the nozzles associated with that column. Once the gas flush or vacuum has been applied to the assembly 418, the formed base member web 390 may be sealed to the formed lid web 414.

Figure 44:
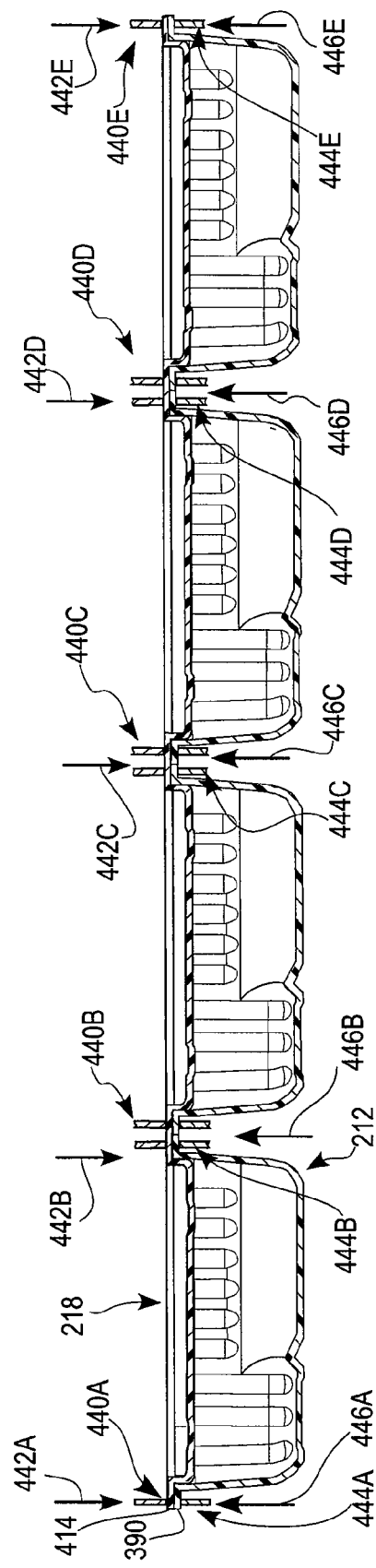
FIG. 44 is a cross sectional view taken across line 44-44 of FIG. 42 showing the formed lid web being sealed to the formed base member web.

FIG. 44 illustrates one approach to sealing the formed base member web 390 to the formed lid web 414 and is taken across line 44-44 of FIG. 42. In particular, upper heated sealing bars 440 are driven in direction 442 while lower heated sealing bars 444 are driven in direction 446 to compress and seal the sealing area 286 of the base member 212 against the sealing area 274 of the lid 218 for each of the individual packages 420. The sealing bars 444, 446 may activate a sealant disposed on the sealing areas 274, 286 or may partially weld the lid 218 to the base member 212. This process may be performed simultaneously across the entire assembly 418 so that the formed base member web 390 and the formed lid web 414 are sealed together without reintroducing air into the individual packages 420.

Returning to FIG. 42, the formed and filled food packages 420 are then trimmed generally along vertical dashed lines 422B to form a portion of the outermost profile of the individual packages 420. The trimming stage may separate the assembly 418 into smaller assemblies of assembled packages 420, such as assemblies of four packages 420 along the columns I, II, and III. A label may be applied to the food packages 420 prior to trimming or after trimming. The packages 420 may then be further trimmed into individual packages at a singulation station. The singulation station may use slitter knives to finalize the outermost profile of the packages 420 by trimming generally along the horizontal dashed lines 422A of the assembly 418. After singulation, the packages 420 are ready to be shipped to distributors.

At the trimming and singulation stages, sharp cutting edges are pressed upwardly against the bottom surfaces of the base member ridges 252 to shape or trim the outermost profile of the packages 420. The trimming process may cause a phenomenon known as shear extrusion, where the edge material of the base member 212 extrudes upward over the edge material of the lid 218. Shear extrusion may produce undesirable tacking between the base member 212 and the lid 218 which inhibits a user from separating the tab 234 of the lid 218 from the gripping portion 264 of the base member 212. As discussed above, the protuberance 306 reduces tacking between the tab 234 and the gripping portion 264 by creating an initial gap spacing therebetween. In this way, the gap spacing partially separates the tab 234 and the gripping portion 264 and restricts the edge material of the base member 212 from extruding upward over the edge material of the lid 218. The initial gap spacing makes it easier for a user to separate the tab 234 and the gripping portion 264 to open the package 420, whether initially or after the sealant 288 has been broken. Further, the outer profile 266 of the gripping portion 264 is separated from the straight edge 268 of the tab 234 by a distance that limits the risk of the straight edge 268 tacking to the outer profile 266 during trimming. Accordingly, a user may readily separate the tab 234 of the lid 218 from the gripping portion 264 of the base member 212 without being obstructed by tacking between the edges of the tab 234 and the gripping portion 264.

In one approach, the singulation stage forms the straight edge 268 of the lid 218 and the straight edge 310A of the base member 212 (see FIGS. 26 and 29). The straight edge 268 and the straight edge 310A are substantially aligned along the outermost periphery of the package 420. Because the straight edge 300 of the gripping portion 264 extends inward from the straight portion 254A of the base member 212, the straight edge 268 of the lid 218 is longer than the straight edge 310A of the base member 212. The difference in edge lengths contributes to the separation between the edges of the tab 234 and of the lid 218 and the gripping portion 264 of the base member 212, which improves the ease of opening as discussed above.

While the invention herein disclosed has been described by means of specific embodiments and applications thereof, numerous modifications and variations could be made thereto by those skilled in the art without departing from the scope of the invention set forth in the claims, and thus the various features may be utilized with other container shapes than those described herein.

What is claimed is:

1. A food package for containing a food product, the package comprising:
   a base member having a bottom wall and a plurality of side walls upstanding from the bottom wall that define an opening of the base member opposite the bottom wall, the plurality of side walls including a pair of side walls that extend generally perpendicular to one another, the side walls each having an upper section that extends substantially vertically downward from the opening, the base member having a ridge and a gripping portion thereof, the ridge extending outward from the plurality of side walls about the opening and defining an outer periphery of the base member, the ridge having a pair of straight portions extending outward from the pair of side walls and substantially straight peripheral edges of the ridge straight portions that extend generally perpendicular to one another;

a lid having a cover wall for covering the opening of the base member, the lid having a plurality of walls that extend upward a distance from the cover wall and terminate at a lip, the cover wall and the plurality of walls being sized to fit within the opening of the base member, the plurality of walls of the lid nesting within the upper section of the base member side walls with the lid connected to the base member, the lip of the lid having a tab with upper and lower surfaces, the tab of the lid covering the gripping portion of the base member with the lid connected to the base member, the tab having a pair of substantially straight edges that are generally perpendicular to each other and are connected by a corner, the tab straight edges being aligned with the straight peripheral edges of the base member ridge with the lid connected to the base member;

the gripping portion of the base member ridge having a plurality of edges which define an outer profile of the gripping portion, the plurality of edges comprising a substantially straight edge that extends inward from the straight peripheral edge of one of the pair of straight portions of the ridge, a semicircular edge that extends inward from the straight peripheral edge of the other of the pair of straight portions of the ridge about a first radius of curvature, and a rounded edge disposed between the inwardly extending straight edge and the semicircular edge of the gripping portion such that the rounded edge connects the inwardly extending straight edge and the semicircular edge, the rounded edge having a second radius of curvature;

a portion of the lower surface of the lid tab that is uncovered by the gripping portion of the base member with the lid connected to the base member, the uncovered portion of the tab lower surface being disposed outward from the outer profile of the gripping portion such that the tab of the lid may be readily separated from the gripping portion of the base member;

a generally straight diagonal side wall of the plurality of base member side walls that connects the pair of side walls and extends at an angle relative to each of the pair of side walls;

an enlarged region of the base member ridge intermediate the straight portions thereof and adjacent the generally straight diagonal side wall of the base member, the enlarged region of the base member ridge including the gripping portion and the plurality of edges thereof which define the outer profile of the gripping portion.

2. The food package of claim 1 wherein the lid is generally rectangular and the corner includes a rounded edge, with one of the straight edges and the rounded edge of the lid tab each having a portion that is disposed outward from the outer profile of the base member gripping portion.

3. The food package of claim 1 wherein the ridge of the base member has a sealing area surrounding the opening of the base member and the lip of the lid has a sealing area surrounding the plurality of walls of the lid, the sealing areas of the ridge and the lip being in overlapping relation when the lid is connected to the base member.

4. The food package of claim 3 further comprising a seal between the sealing areas of the ridge of the base member and the lip of the lid which provides a substantially hermetic seal of the food package when the lid is connected to the base member.

5. The food package of claim 1 further comprising a sealing area of the enlarged region of the ridge of the base member, the sealing area having a straight portion that generally extends along the straight edge of the gripping portion.

6. The food package of claim 1 wherein the first radius of curvature of the semicircular edge is approximately nine millimeters and the second radius of curvature of the rounded edge is approximately six millimeters.

7. The food package of claim 1 wherein the gripping portion of the base member has a protuberance adjacent the semicircular edge that provides a localized gap spacing between the tab of the lid and the gripping portion of the base member.

8. The food package of claim 7 wherein the protuberance is spaced from the semicircular edge of the gripping portion by a distance that is less than the radius of curvature of the semicircular edge.

9. The food package of claim 1 further comprising a plurality of aligned lugs and recesses on the walls of the lid and the upper sections of the base member side walls, the lugs and recesses engaging to generally secure the lid relative to the base member when the lid is connected to the base member.

10. The food package of claim 1 in combination with a food product contained within the food package.

11. The food package of claim 1 wherein the straight peripheral edge of the one straight portion of the base member ridge and the straight edge of the lid tab aligned therewith are formed by cutting the lip of the lid and the ridge of the base member with the lid connected to the base member.

12. The food package of claim 1 wherein the lid tab corner includes a curved edge; and
a crest of the base member gripping portion semicircular edge disposed along a radial line of the base member ridge gripping portion extending substantially perpendicular to the straight peripheral edge of the one of the pair of the straight portions of the base member ridge so that the crest is disposed inward from the lid tab curved edge with the lid connected to the base member, the radial line extending between the rounded edge of the gripping portion and the straight edge of the other of the pair of straight portions of the base member ridge.

13. The food package of claim 1 wherein the second radius of curvature of the rounded edge of the base member gripping portion is smaller than the first radius of curvature of the semicircular edge.

14. A method of assembling a package, the method comprising:
providing a web of material for a base member and a web of material for a lid, the base member web including a ridge that defines an outer periphery of the base member, the ridge having a pair of straight portions that extend generally perpendicular to one another;
forming a gripping portion in the ridge of the base member by removing material from only the base member web, the gripping portion having a plurality of edges which define an outer profile of the gripping portion, the plurality of edges comprising a substantially straight edge that extends inward from one of the pair of straight portions of the ridge, a semicircular edge that extends inward from the other of the pair of straight portions of the ridge about a first radius of curvature, and a rounded edge disposed between the straight edge and the semicircular edge such that the rounded edge connects the straight edge and the semicircular edge, the rounded edge having a second radius of curvature;

shaping a compartment of the base member in the base member web using a different operation than the operation used to remove material from the base member web and form the ridge gripping portion, the compartment having a bottom wall, an opening opposite the bottom wall, and a plurality of side walls upstanding from the bottom wall, wherein each of the side walls has an upper section that extends vertically downward from the ridge about the opening;

the lid web including a lip that defines an outer periphery of the lid, the lip having a tab with upper and lower surfaces;

shaping a plurality of walls of the lid that extend downward a distance from the lip and terminate at a cover wall, the plurality of walls and cover wall being sized to fit within the opening of the compartment;

bringing the base member web and the lid web together so that the cover wall of the lid closes the opening of the compartment of the base member and the plurality of walls of the lid nest with the upper section of the sidewall portions of the compartment, and the tab of the lid overlaps the gripping portion of the base member formed before bringing the base member web and the lid web together with a portion of the lower surface of the tab being uncovered by the gripping portion, the uncovered portion of the tab lower surface being disposed outward from the outer profile of the gripping portion; and cutting the base member web and the lid web after the base member web and the lid web have been brought together to form a pair of aligned, straight peripheral edges of the tab of the lid and one of the straight portions of the base member ridge with a section of the straight peripheral edge of the lid tab being disposed outward of the outer profile of the base member gripping portion.

15. The method of claim 14 wherein forming the gripping portion in the ridge of the base member comprises shifting a male punch and a female punch together and removing a portion of the ridge of the base member to shape the plurality of edges of the gripping portion.

16. The method of claim 15 further comprising simultaneously shifting a second male punch and a second female punch together and removing a portion of the base member web to form an opening outside of the ridge of the base member.

17. The method of claim 16 further comprising clamping opposed portions of the base member web and the lid web after the webs have been brought together; and inserting a nozzle through the opening of the base member web and using a vacuum or a gas flush to evacuate substantially all of the air from the compartment of the base member.

18. The method of claim 14 wherein bringing the base member web and the lid web together comprises aligning a diagonal side wall of the base member with a complimentary wall of the lid and nesting the complimentary wall of the lid against an upper section of the diagonal side wall of the base member.

19. The method of claim 14 further comprising removing the base member from the base member web of material by cutting through the material and forming another straight peripheral edge of the ridge of the base member that is perpendicular to the other straight peripheral edge of the ridge of the base member, one of the straight peripheral edges of the base member forming a juncture with the inwardly extending straight edge of the gripping portion, and the other of the straight peripheral edges of the base member forming a juncture with the semicircular edge of the gripping portion.

20. The method of claim 14 further comprising forming a hermetic seal between the lid and the base member.

21. The method of claim 14 further comprising forming a protuberance in the gripping portion of the ridge of the base member.

22. The method of claim 14 further comprising placing a food product within the compartment of the base member before bringing the base member web and the lid web together.

23. The method of claim 14 wherein the base member gripping portion semicircular edge includes a crest disposed along a radial line of the base member gripping portion extending substantially perpendicular to the one of the pair of straight portions of the base member ridge, the radial line extending between the rounded edge of the gripping portion and the other of the pair of straight portions of the base member ridge, and the method further includes:

cutting the lid web after the base member web and the lid web have been brought together to form a curved edge of the lid tab disposed outward from the crest of the base member semicircular edge.

24. The method of claim 14 wherein forming the gripping portion in the ridge of the base member by removing material from only the base member web includes forming the gripping portion such that the second radius of curvature of the gripping portion rounded edge is smaller than the radius of curvature of the semicircular edge.

25. A food package for containing a food product, the package comprising:

a base member having a bottom wall and a plurality of side walls upstanding from the bottom wall that define an opening of the base member opposite the bottom wall, the plurality of side walls including a pair of side walls that extend generally perpendicular to one another, the side walls each having an upper section that extends substantially vertically downward from the opening, the base member having a ridge and a gripping portion thereof, the ridge extending outward from the plurality of side walls about the opening and defining an outer periphery of the base member, the ridge having a pair of straight portions extending outward from the pair of side walls and substantially straight peripheral edges of the ridge straight portions that extend generally perpendicular to one another;

a lid having a cover wall for covering the opening of the base member, the lid having a plurality of walls that extend upward a distance from the cover wall and terminate at a lip, the cover wall and the plurality of walls being sized to fit within the opening of the base member, the plurality of walls of the lid nesting within the upper section of the base member side walls with the lid connected to the base member, the lip of the lid having a tab with upper and lower surfaces, the tab of the lid overlapping the gripping portion of the base member with the lid connected to the base member, the tab having a pair of substantially straight edges that are generally perpendicular to each other and are connected by a corner, the tab straight edges being aligned with the straight peripheral edges of the base member ridge with the lid connected to the base member;

the gripping portion of the base member ridge having a plurality of edges which define an outer profile of the gripping portion, the plurality of edges comprising a substantially straight edge that extends inward from the straight peripheral edge of one of the pair of straight portions of the ridge, a semicircular edge that extends inward from the straight peripheral edge of the other of the pair of straight portions of the ridge about a first radius of curvature, and a rounded edge disposed between the inwardly extending straight edge and the semicircular edge of the gripping portion such that the rounded edge connects the inwardly extending straight edge and the semicircular edge, the rounded edge having a second radius of curvature;

a sealing area surrounding the opening of the base member;

a protuberance of the base member upstanding from the gripping portion, the protuberance having a center separated from the sealing area by a first distance and separated from the semicircular edge by a second distance, the first distance being between about equal to about five times the length of the second distance;

a generally straight diagonal side wall of the plurality of base member side walls connecting the pair of side walls and extending at an angle relative to each of the pair of side walls; and an enlarged region of the base member ridge intermediate the straight portions thereof and adjacent the generally straight diagonal side wall of the base member, the enlarged region of the base member ridge including the gripping portion and the plurality of edges thereof which define the outer profile of the gripping portion.

26. The food package of claim 25 wherein the first radius of curvature is between about 1.0 and about 2.2 times longer than the second radius of curvature.

27. The food package of claim 25 wherein the first radius of curvature has an origin and the center of the protuberance is separated from the origin by a distance that is between about one-eighth and about two-thirds the length of the first radius of curvature.

28. The food package of claim 25 wherein a portion of the lower surface of the lid tab is uncovered by the gripping portion of the base member with the lid connected to the base member, the uncovered portion of the tab lower surface being disposed outward from the outer profile of the gripping portion such that the tab of the lid may be readily separated from the gripping portion of the base member.

29. The food package of claim 25 wherein the lid is generally rectangular and the corner includes a rounded edge, with one of the straight edges and the rounded edge each having a portion that is disposed outward from the outer profile of the base member gripping portion.

30. The food package of claim 25 wherein the straight peripheral edge of the one straight portion of the base member ridge and the straight edge of the lid tab aligned therewith are formed by cutting the lip of the lid and the ridge of the base member with the lid connected to the base member.

31. The food package of claim 25 wherein the lid tab corner includes a curved edge; and a crest of the base member gripping portion semicircular edge disposed along a radial line of the base member ridge gripping portion extending substantially perpendicular to the straight peripheral edge of the one of the pair of the straight portions of the base member ridge so that the crest is disposed inward from the lid tab curved edge with the lid connected to the base member, the radial line extending between the rounded edge of the gripping portion and the straight edge of the other of the pair of straight portions of the base member ridge.

32. The food package of claim 25 wherein the second radius of curvature of the rounded edge of the base member gripping portion is smaller than or about equal to the first radius of curvature of the semicircular edge.

33. A method of assembling a package, the method comprising:

providing a web of material for a base member and a web of material for a lid;

forming a cutout in the web of material for the base member by removing material from only the base member web, the base member web including a ridge that defines an outer periphery of the base member and a pair of straight portions of the ridge that extend generally perpendicular to one another, the cutout at least partially defining an outer profile of a gripping portion of the ridge;

shaping a compartment of the base member in the base member web using a different operation than the operation used to remove material from the base member web and form the cutout, the compartment having a bottom wall, an opening opposite the bottom wall, and a plurality of side walls upstanding from the bottom wall, wherein each of the side walls has an upper section that extends vertically downward from the ridge about the opening;

shaping a cover wall in the web of material for the lid, the lid web including a lip that surrounds the cover wall and defines an outer periphery of the lid, the lip having a tab with upper and lower surfaces;

bringing the base member web and the lid web together so that the cover wall of the lid closes the opening of the compartment of the base member and the tab of the lid overlaps the gripping portion of the base member formed before bringing the base member web and the lid web together with a portion of the lower surface of the tab being uncovered by the gripping portion, the uncovered portion of the tab lower surface being disposed outward from the outer profile of the gripping portion;

cutting the base member web and the lid web after the base member web and the lid web have been brought together to form a pair of aligned, straight peripheral edges of the tab of the lid and one of the straight portions of the base member ridge with a section of the straight peripheral edge of the lid tab being disposed outward of the outer profile of the base member gripping portion.

34. The method of claim 33 wherein forming the straight peripheral edge of the lip of the lid includes forming the straight peripheral edge of the lip to be longer than the straight peripheral edge of the base member ridge.

35. The method of claim 33 wherein forming the cutout in the base member web includes forming a plurality of edges of the outer profile of the gripping portion, the plurality of edges comprising a straight edge that extends inward from one of the pair of straight portions of the ridge and a semicircular edge that extends inward from the other of the pair of straight portions of the ridge.

36. The method of claim 35 further comprising trimming material from the base member web by forming another straight peripheral edge of the base member ridge that is perpendicular to the other straight peripheral edge, one of the straight peripheral edges of the base member forming a juncture with the inwardly extending straight edge of the gripping portion, and the other of the straight peripheral edges of the base member forming a juncture with the semicircular edge of the gripping portion.

37. The method of claim 33 wherein forming the cutout in the base member web comprises shifting a male punch and a female punch together and removing a portion of the ridge of the base member to shape the outer profile of the gripping portion.

38. The method of claim 33 wherein forming a cutout in the web of material for the base member includes forming a substantially straight edge of the base member gripping portion extending inward from one of the pair of straight portions of the base member ridge, forming a semicircular edge of the base member gripping portion extending inward from the other of the pair of straight portions of the base member ridge, and forming a rounded edge disposed between the substantially straight edge and the semicircular edge of the base member gripping portion,
- the semicircular edge of the gripping portion includes a crest disposed along a radial line of the base member ridge gripping portion extending substantially perpendicular to the straight edge of the one of the pair of straight portions of the base member ridge, the radial line extending between the rounded edge of the gripping portion and the other of the pair of straight portions of the base member ridge, and the method further includes:
- cutting the lid web after the base member web and the lid web have been brought together to form a curved corner edge of the lid tab disposed outward from the crest of the semicircular edge of the base member gripping portion.

\* \* \* \* \*